US008574710B2

(12) United States Patent
Coffey et al.

(10) Patent No.: US 8,574,710 B2
(45) Date of Patent: Nov. 5, 2013

(54) ANTI-REFLECTIVE COATINGS COMPRISING ORDERED LAYERS OF NANOWIRES AND METHODS OF MAKING AND USING THE SAME

(75) Inventors: David Christopher Coffey, Boulder, CO (US); Brian T. Mayers, Somerville, MA (US); Joseph M. McLellan, Quincy, MA (US)

(73) Assignee: Nano Terra Inc., Cambridge, MA (US)

( * ) Notice: Subject to any disclaimer, the term of this patent is extended or adjusted under 35 U.S.C. 154(b) by 672 days.

(21) Appl. No.: 12/578,219

(22) Filed: Oct. 13, 2009

(65) Prior Publication Data

US 2010/0112373 A1 May 6, 2010

Related U.S. Application Data

(60) Provisional application No. 61/104,438, filed on Oct. 10, 2008.

(51) Int. Cl.
*B32B 7/00* (2006.01)
*B32B 7/02* (2006.01)
*B32B 33/00* (2006.01)
*B05D 5/00* (2006.01)

(52) U.S. Cl.
USPC ........ 428/304.4; 359/359; 359/360; 359/566; 359/586; 428/113; 428/426; 428/432; 428/608; 428/913

(58) Field of Classification Search
USPC .............. 428/292.1, 293.7, 294, 95.4, 297.1, 428/297.4, 298.1, 300.7, 426, 432, 608; 977/834, 762; 359/359, 360, 586
See application file for complete search history.

(56) References Cited

U.S. PATENT DOCUMENTS

| | | | |
|---|---|---|---|
| 2007/0074316 A1* | 3/2007 | Alden et al. ................ | 977/762 |
| 2009/0052029 A1* | 2/2009 | Dai et al. ................... | 359/486 |
| 2009/0081429 A1* | 3/2009 | Lee et al. ................... | 428/212 |
| 2009/0142558 A1* | 6/2009 | Jiao et al. ................... | 428/206 |
| 2010/0040589 A1* | 2/2010 | Spetz-Holmgren et al. .................... | 424/93.21 |
| 2010/0259823 A1* | 10/2010 | Xi et al. ..................... | 359/585 |
| 2011/0019277 A1* | 1/2011 | Sager et al. ................. | 359/580 |
| 2011/0120554 A1* | 5/2011 | Chhajed et al. ............ | 428/292.1 |

OTHER PUBLICATIONS

Huang et al., "Directed Assembly of One-Dimensional Nanostructures into Functional Networks," Jan. 26, 2001, Science, vol. 291, pp. 630-633.*
Whang et al., "Large Scale Hierarchical Organization of Nanowire Arrays for Integrated Nanosystems," Aug. 5, 2003, American Chemical Society, Nano Letters, vol. 3, No. 9, pp. 1255-1259.*

* cited by examiner

*Primary Examiner* — David Sample
*Assistant Examiner* — Nicholas W Jordan
(74) *Attorney, Agent, or Firm* — Fay Kaplun & Marcin, LLP

(57) ABSTRACT

A composition includes a substrate (a) including a surface and (b) a multi-layer coating of nanowires positioned on at least a portion of the surface. The coating includes three or more laminar layers of nanowires and a bottom layer of nanowires affixed to the surface and a top-most layer of nanowires. A nanowire within a laminar layer is oriented substantially parallel to another nanowire within the same laminar layer. Nanowires within adjacent laminar layers are not substantially parallel to one another. The top-most layer of nanowires has a refractive index of about 5% to about 70% of the refractive index of the bottom layer of nanowires, and the refractive index of the three or more laminar layers of nanowires is decreases by about 10% or more per laminar layer from the bottom layer of nanowires to the top-most layer of nanowires.

19 Claims, 16 Drawing Sheets

↓ 410

↓ 420

Repeat deposition steps
to provide a multi-layer coating

FIG. 11
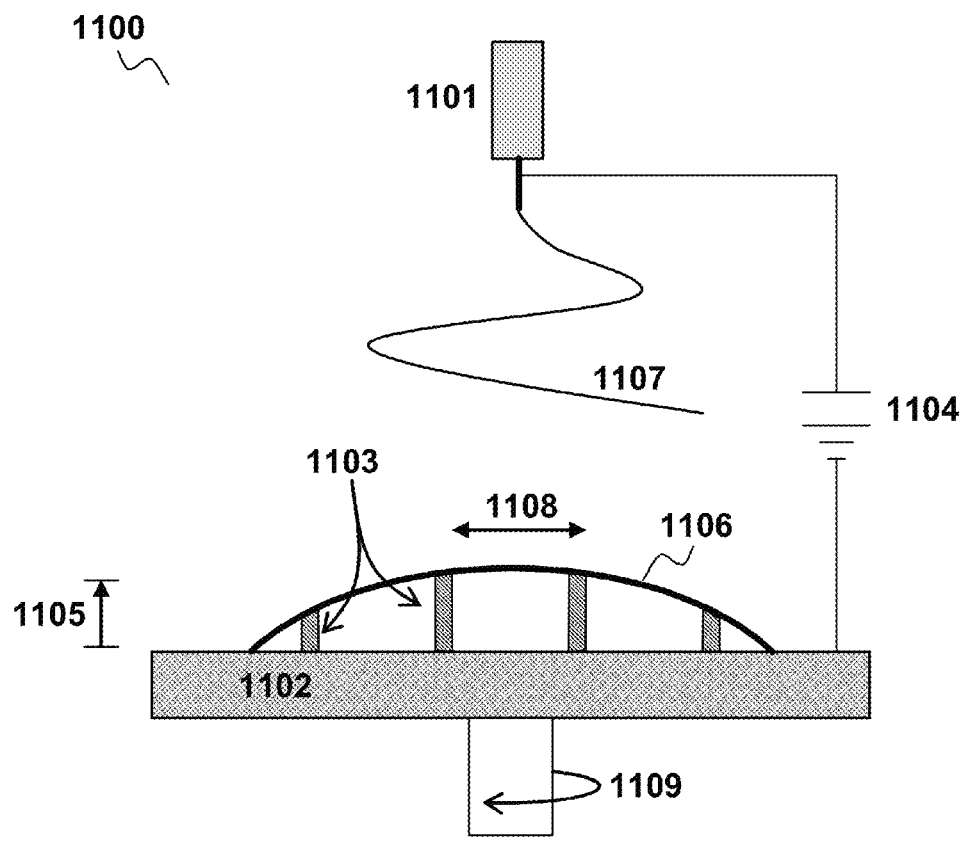
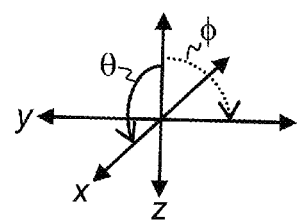

ANTI-REFLECTIVE COATINGS COMPRISING ORDERED LAYERS OF NANOWIRES AND METHODS OF MAKING AND USING THE SAME

CROSS-REFERENCE TO RELATED APPLICATIONS

This application claims the benefit of the filing date of U.S. Appl. No. 61/104,438, filed Oct. 10, 2008, which is incorporated herein by reference in its entirety.

STATEMENT OF GOVERNMENT RIGHTS

This invention was made with Government support under Contract Number NBCH1080008 awarded by the United States Department of the Interior, Contract Number W31P4Q09C0023 awarded by the United States Army, and Contract Number W31P4Q10C0199 awarded by the United States Army. The Government has certain rights in this invention.

BACKGROUND OF THE INVENTION

1. Field of the Invention

The present invention is directed to anti-reflective coatings, methods for making the anti-reflective coatings, and products prepared by the methods.

2. Background

Optical reflections occur when light passes from one medium to a second medium when the refractive index ("n") of the two media differs. Thus when light passes from air (n=1) to glass (n=1.5) there are reflections. Reflections can be minimized or eliminated by gradually grading the index of refraction from a first material to a second material. In theory, for a single-layer coating on glass in air, the optimum material has a refractive index of n=1.23. While most layered coatings can exhibit small differences in the refractive index between materials or between layers of a coating, multi-layer films can reduce this problem. However, few solid materials are known having a refractive index, n<1.2; and few robust materials are known having a refractive index, n<1.3. Thus, all presently known thin layer coatings suffer from an abrupt decrease in refractive index at the coating-air interface that gives rise to reflection of electromagnetic radiation from the top-most surface of the substrate.

One method to minimize reflection from a surface is to include single- and multi-layer thin films that incorporate destructive interference. However, destructive interference does not work well for incoming light not perpendicular to the surface.

A second theoretical solution to providing anti-reflection is to provide a porous nanostructured laminar Gradient Refractive Index ("laminar GRIN") coating in which the porosity of a coating material is controlled on the nanometer scale to achieve refractive index values from n=1.0 to about n=1.4. For example, a glass material having a refractive index, n=1.5, that is made 80% porous will have a refractive index, n=1.1, so long as the length scale of the porosity within the porous glass material is small enough to avoid light scattering. In an ideal system, the refractive index would be controllably decreased from n=1.5 to n=1.0 by controllably increasing the volume fraction of air within the material. However, ideal laminar GRIN structures have yet to be made using thin, solid films.

The natural world is also replete with examples of anti-reflective structures. For example, the surface of a moth eye is covered with domes having a height and radius of about 150 nm to 250 nm, which provide excellent antireflective properties across the visible spectrum.

The fabrication of nanostructured films that are similar to an ideal theoretical or a naturally occurring anti-reflective coating has proved exceedingly difficult. For example, top-down manufacturing of GRIN, "moth-eye" structures have been demonstrated with only limited efficacy, largely because standard lithography processes either lack the necessary resolution or are ill-suited for creating vertically tailored structures. Holographic lithography has proven more versatile at creating GRIN structures, but these techniques are expensive and still limited in their resolution, which decreases the bandwidth of the anti-reflective coatings.

A second approach to fabricating GRIN nanostructures is by growth methods. For example, porous nanowire films, porous glass films, and porous polymer films can be prepared by depositing a binary mixture and subsequently removing one component. However, the formation of a film with varying porosity has proven difficult to control, while the formation of multi-layer structures with decreasing porosity typically suffers from collapse due to high porosity and low mechanical integrity of the outer layer(s) of the film.

BRIEF SUMMARY OF THE INVENTION

What is needed is a method to deposit films having a tunable refractive index gradient, and a transparent coating material that can be manufactured using a straightforward manufacturing method that has improved durability and anti-reflective properties.

The present invention provides surfaces resistant to the reflection of electromagnetic radiation therefrom. These anti-reflective surfaces can be used in traditional electronic devices, as well as in industrial building and architectural applications, health care applications, and the military and decorative arts. The anti-reflective coatings of the present invention can be prepared efficiently utilizing a low-cost fabrication process.

The present invention is directed to a composition, comprising: a substrate including a surface, and a multi-layer coating of nanowires positioned on at least a portion of the surface, the coating comprising three or more laminar layers of nanowires, including a bottom layer of nanowires affixed to the surface, and a top-most layer of nanowires, wherein a nanowire within a laminar layer is oriented substantially parallel to another nanowire within the same laminar layer, nanowires within adjacent laminar layers are not substantially parallel to one another, the top-most layer of nanowires has a refractive index of about 5% to about 70% of a refractive index of the bottom layer of nanowires, and the refractive index of the three or more laminar layers of nanowires decreases by about 10% or more per laminar layer from the bottom layer of nanowires to the top-most layer of nanowires.

In some embodiments, a bottom layer of nanowires has a refractive index of about 30% to about 100% of a refractive index of the substrate, a top-most layer of nanowires has a refractive index of about 1% to about 40% of the refractive index of the substrate, and the refractive index of the three or more laminar layers decreases by about 15% or more per layer from the bottom layer of nanowires to the top-most layer of nanowires.

In some embodiments, the refractive index of the three or more laminar layers of nanowires decreases alinearly from the bottom layer of nanowires to the top-most layer of nanowires.

In some embodiments, the refractive index of the three or more laminar layers of nanowires decreases linearly from the bottom layer of nanowires to the top-most layer of nanowires.

In some embodiments, a thickness of a laminar layer within the multi-layer coating of nanowires is approximately the diameter of a nanowire present within the laminar layer.

In some embodiments, nanowires within adjacent laminar layers of the multi-layer coating are substantially orthogonal to one another.

In some embodiments, adjacent nanowires within a laminar layer are spaced about evenly apart relative to one another, and wherein a spacing separating adjacent nanowires within a laminar layer is about 30% or less than an average length of the nanowires.

In some embodiments, the nanowires have an average length of about 200 nm to about 5 mm and an average diameter of about 1 nm to about 10 $\mu$m, or the nanowires have an average length of about 200 nm to about 5 mm and an average diameter of about 5 nm to about 1 $\mu$m.

In some embodiments, the nanowires of at least the bottom layer of the multi-layer coating have substantially the same composition as the substrate.

In some embodiments, all of the nanowires present within the multi-layer coating have approximately the same composition.

In some embodiments, the nanowires within the multi-layer coating are not functionalized or derivatized.

In some embodiments, a coating further comprises a molecular or polymeric matrix surrounding the multi-layer coating of nanowires, wherein at least a portion of the top-most layer of nanowires is exposed.

In some embodiments, a portion of the surface having the anti-reflective multi-layer coating of nanowires thereon reflects about 50% or less of an electromagnetic radiation having at least one wavelength of about 180 nm to about 30 $\mu$m compared to an uncoated portion of the surface.

In some embodiments, a portion of the substrate having the multi-layer coating of nanowires thereon has a resistance to crack propagation that is about 3 times or more than a portion of the substrate surface that lacks the multi-layer coating of nanowires.

The present invention is also directed to a composition, comprising: a metallic substrate including a surface, and an anti-reflective multi-layer mat of nanowires positioned on at least a portion of the surface, the multi-layer mat comprising three or more laminar layers of nanowires and including a bottom layer of nanowires affixed to the surface and a top-most layer of metallic nanowires, wherein the top-most layer of nanowires has a refractive index of about 5% to about 70% of a refractive index of the bottom layer of nanowires, and wherein the refractive index of the three or more laminar layers decreases by about 10% or more per layer from the bottom layer of nanowires to the top-most layer of nanowires.

In some embodiments, the substrate and the metallic nanowires comprise at least one metal that can be the same or different selected from: a transition metal, a Group 13 metal, a Group 14 metal, a Group 15 metal, an oxide thereof, or a combination thereof.

In some embodiments, a thickness of a laminar layer within the mat of metallic nanowires is about ten times or less an average diameter of a nanowire present within the laminar layer.

In some embodiments, the metallic nanowires within the multi-layer mat are bound to the substrate and each other via metal-metal bonds.

In some embodiments, a portion of the metallic substrate having the multi-layer mat of nanowires thereon has a resistance to crack propagation that is about 3 times or more than a portion of the metallic substrate surface that lacks the multi-layer mat of nanowires.

In some embodiments, the substrate having a multilayer mat or coating of nanowires thereon has a retro-reflectance at 633 nm that is at least 50% less than a retro-reflectance at 633 nm from an uncoated substrate that lacks the multilayer coating of nanowires. In some embodiments, the substrate having the multilayer mat or coating of nanowires thereon has a retro-reflectance at one or more wavelengths from about 400 nm to about 12 $\mu$m that is at least 50% less than a retro-reflectance from an uncoated substrate that lacks the multi-layer mat of nanowires at the same one or more wavelengths.

The present invention is also directed to a composition, comprising: a substrate including a surface, and anti-reflective multi-layer coating positioned on at least a portion of the surface, the coating comprising three or more laminar layers, each layer comprising a matrix incorporating a different degree of porosity compared to the other layers in the coating, wherein a bottom layer of the coating is affixed to the surface, wherein the bottom layer has a refractive index of about 60% to about 100% of a refractive index of the substrate, wherein a top-most layer of the coating has a refractive index of about 1% to about 40% of the refractive index of the substrate, and wherein the refractive index of the three or more laminar layers decreases by about 10% or more per layer from the bottom layer of the coating to the top-most layer of the coating.

In some embodiments, a portion of the surface having the anti-reflective multi-layer coating thereon reflects about 50% or less of an electromagnetic radiation having at least one wavelength of about 180 nm to about 30 $\mu$m compared to an uncoated portion of the surface.

In some embodiments, the anti-reflective multi-layer coating comprises a multitude of pores having a diameter of about 1 nm to about 100 nm.

In some embodiments, the matrix comprises one or more polymers selected from: a polystyrene, a polysiloxane, a polyacrylate, a polyvinylpyrrolidone, a polycarbonate, a polyalkyleneglycol, a substituted variant thereof, or a combination thereof.

The present invention is also directed to a device, comprising: a substrate including a surface; and an anti-reflective multi-layer coating of nanowires positioned on the surface, the coating comprising three or more laminar layers of nanowires and including a bottom layer of nanowires affixed to the surface, wherein a nanowire within a laminar layer is oriented substantially parallel to another nanowire within the same laminar layer; wherein nanowires within different laminar layers are not parallel to one another; and the bottom layer of nanowires has a refractive index of about 30% or more than a refractive index of a top-most layer of nanowires.

In some embodiments, the device is chosen from: a display device, an optical device, a solar cell, a sensor, a cellular device, an avionic device, a nautical device, a projectile device, and combinations thereof.

The present invention is also directed to a process for preparing an anti-reflective multi-layer nanowire coating on at least a portion of a surface of a substrate, the process comprising:

disposing on the surface a first laminar layer of nanowires, wherein the first laminar layer has a refractive index about 60% to about 100% of a refractive index of the substrate;

affixing the first laminar layer of nanowires to the surface;

disposing a second laminar layer of nanowires onto the first laminar layer of nanowires;

affixing the second laminar layer of nanowires to the first laminar layer of nanowires;

disposing at least a third laminar layer of nanowires onto the second laminar layer of nanowires; and affixing the third laminar layer of nanowires to the second laminar layer of nanowires; wherein the second laminar layer of nanowires has a refractive index less than the refractive index of the first laminar layer of nanowires, and wherein the third laminar layer of nanowires has a refractive index less than the refractive index of the second laminar layer of nanowires.

In some embodiments, the process further comprises activating the surface.

In some embodiments, the process further comprises:

aligning the nanowires within the first laminar layer to orient the nanowires substantially parallel to one another;

aligning the nanowires within the second laminar layer to orient the nanowires within the second laminar layer substantially parallel to one another, wherein the nanowires within the second laminar layer are not parallel to the nanowires within the first laminar layer; and aligning the nanowires within the third laminar layer to orient the nanowires within the third laminar layer substantially parallel to one another, wherein the nanowires within the third laminar layer are not parallel to the nanowires within the second laminar layer.

In some embodiments, the process further comprises disposing a fourth laminar layer of nanowires onto the third laminar layer of nanowires, wherein the fourth laminar layer of nanowires has a refractive index less than the refractive index of the third laminar layer of nanowires.

In some embodiments, the process further comprises aligning the nanowires within the fourth laminar layer to orient the nanowires within the fourth laminar layer substantially parallel to one another, wherein the nanowires within the fourth laminar layer are not parallel to the nanowires within the third laminar layer In some embodiments, the aligning comprises at least one of: applying a mechanical force to the nanowires, applying a magnetic field to the nanowires, applying an electric field to the nanowires, applying a fluid gradient to the nanowires, and combinations thereof.

In some embodiments, the affixing comprises at least one of: sintering, covalently bonding, cross-linking, melting, calcining, encapsulating in a polymeric or molecular matrix, or a combination thereof.

The present invention is also directed to a process for preparing an anti-reflective multi-layer coating on at least a portion of a surface of a substrate, the process comprising:

printing on the surface a first laminar layer comprising a first polymer and an optional second polymer;

printing on the first laminar layer a second laminar layer comprising the first polymer and the second polymer, wherein the second laminar layer is substantially free from solvent, and the second polymer is present in the second layer in a higher concentration than the first layer;

printing on the second laminar layer a third laminar layer comprising the first polymer and the second polymer, wherein the third laminar layer is substantially free from solvent, and the second polymer is present in the third layer in a higher concentration than the second layer;

optionally exposing the first laminar layer to conditions suitable for removing the second polymer from the first laminar layer while retaining the first polymer within the first laminar layer;

exposing the second laminar layer to conditions suitable for removing the second polymer from the second laminar layer while retaining the first polymer within the second laminar layer; and exposing the third laminar layer to conditions suitable for removing the second polymer from the third laminar layer while retaining the first polymer within the third laminar layer to provide an anti-reflective multi-layer coating having a refractive index gradient.

In some embodiments, the optionally exposing is performed simultaneous with the exposing the second laminar layer and the exposing the third laminar layer.

In some embodiments, the optionally exposing is performed prior to the printing on the first laminar layer a second laminar layer; and the exposing the second laminar layer is performed prior to printing on the second laminar layer a third laminar layer.

In some embodiments, the exposing comprises a process selected from: heating the laminar layer, irradiating the laminar layer with electromagnetic radiation, irradiating the laminar layer with an electron beam, exposing to a selective solvent, pyrrolizing, exposing the laminar layer to a plasma, and combinations thereof.

In some embodiments, the printing comprises:

coating an elastomeric stamp with a composition comprising a pre-determined amount of the first polymer, the optional second polymer, and a solvent to provide a coated stamp;

phase separating the polymers on the coated stamp;

removing the solvent from the composition; and contacting the coated stamp with the surface under conditions sufficient to transfer the composition from the coated stamp to the surface.

The present invention is also directed to a product prepared by the above processes. Non-limiting examples of products include an antenna, a mirror, a window, a watch glass, a dome, a cone, a lens, and combinations thereof.

In some embodiments, the processes of the present invention separate the growth and/or formation of a nanostructure from the deposition procedure. Thus, a wide variety of nanowires, nanoparticles, or binary films thereof can be utilized.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 11 provides a cross-sectional schematic representation of a deposition apparatus suitable for disposing aligned nanowires on a curved substrate via electrospinning.

Figure 1:
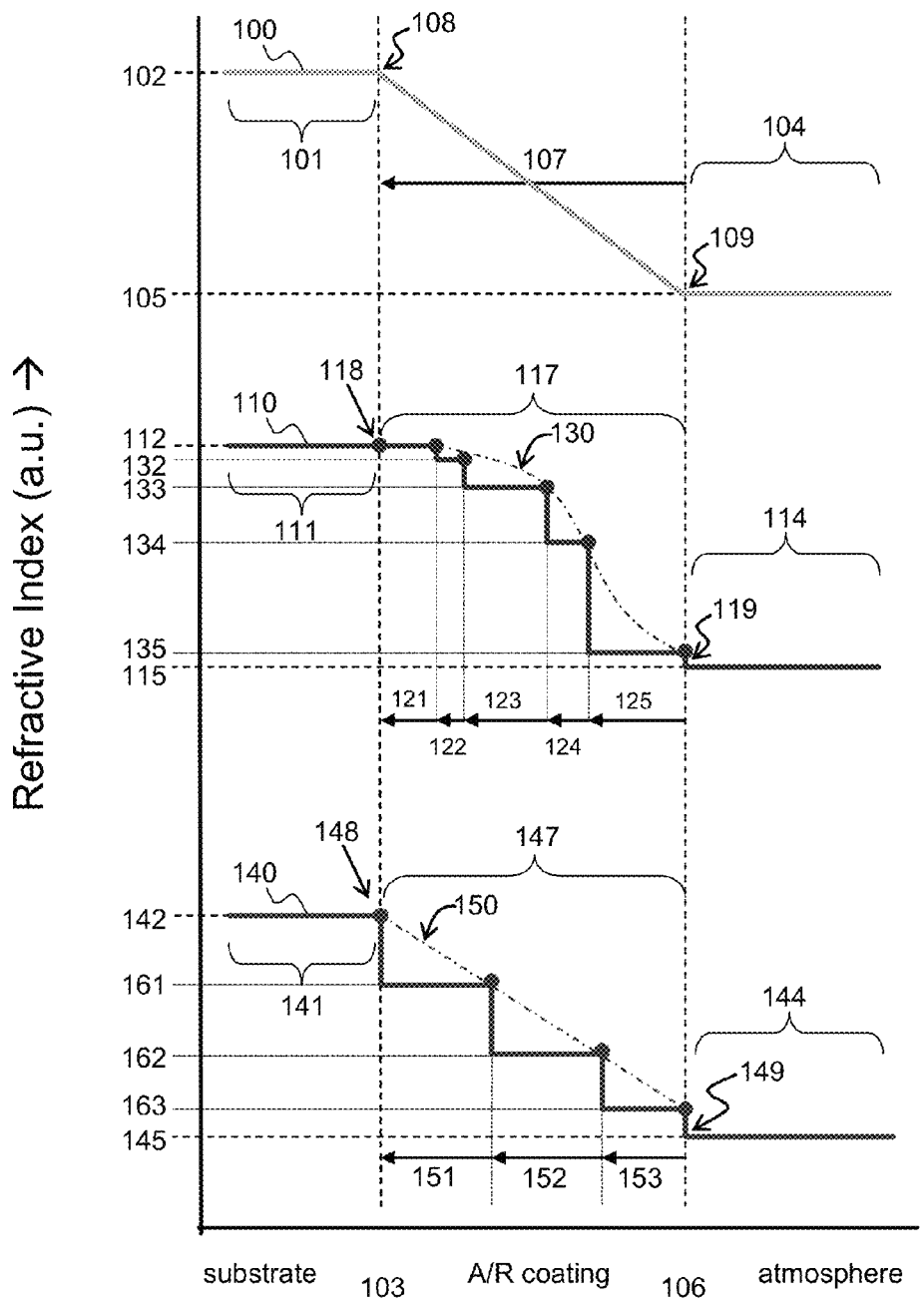
FIGS. 1A-1C provide a graphical representation of refractive index versus coating depth or thickness for an ideal laminar gradient refractive index coating, and laminar gradient refractive index coatings of the present invention.

One or more embodiments of the present invention will now be described with reference to the accompanying drawings. In the drawings, like reference numbers can indicate identical or functionally similar elements. Additionally, the left-most digit(s) of a reference number can identify the drawing in which the reference number first appears.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

References to spatial descriptions (e.g., "above," "below," "up," "down," "top," "bottom," etc.) made herein are for purposes of description and illustration only, and should be interpreted as non-limiting upon the stamps, substrates, coatings, methods, and products of any method of the present invention, which can be spatially arranged in any orientation or manner.

Nanowires

The present invention refers to nanowire coatings, methods to prepare the coatings, and products prepared therefrom. As used herein, a "nanowire" refers to an elongated conductive or semiconductive material (or other material described herein) that includes at least one cross sectional dimension of about 500 nm of less, about 100 nm or less, or about 50 nm or less, and has an aspect ratio (length:width) of about 10 or more, about 50 or more, about 100 or more, or about 1,000 or more. As used herein, the term "nanowire" is interchangeable with the terms "nanorod," "nanotube," "nanoribbon," "nanofiber," and the like, and combinations thereof. Thus, nanowires for use with the present invention are not limited to objects having a tubular or cylindrical shape, but can also include tubes and/or cylinders having a circular, ellipsoidal or irregular cross section, as well as cones, rods, ribbons, and the like.

As used herein, the term "nanotube" refers to a cylindrical structure having a hollow, filled, or partially filled tube-portion. Thus, as used herein, "nanowires" can include carbon nanotubes and nanotubes comprising conductive and/or semiconductive organic and/or inorganic materials.

As used herein, the term "nanoribbon" refers to a flat, laminar, curled, spiral and/or elongated structure comprising at least one of an insulating material, a semiconductive material, a conductive material, or a combination thereof.

As used herein, the term "nanorod" refers to any elongated conductive or semiconductive material (or other material described herein) similar to a nanowire, but having an aspect ratio (length:width) less than that of a nanowire.

As used herein, the term "nanofiber" refers to an elongated conductive or semiconductive material (or other material described herein) similar to a nanowire, but having an aspect ration (length:width) greater than that of a nanowire. In some embodiments, a nanofiber has a length of about 1 mm to about 1 m, about 1 mm to about 500 mm, about 1 mm to about 100 mm, about 1 mm to about 50 mm, or about 1 mm to about 10 mm.

As used herein, an "aspect ratio" is the length of a first axis of a nanostructure divided by the average of the lengths of the second and third axes of the nanostructure, where the second and third axes are the two axes whose lengths are most nearly equal to each other. For example, the aspect ratio for a perfect rod would be the length of its long axis divided by the diameter of a cross-section perpendicular to (normal to) the long axis.

In some embodiments, a nanowire is porous. As used herein, "porous" and "porosity" are interchangeable and refer to a structure comprising void space. Nanowires for use with the present invention can have a porosity of about 1% to about 65% by volume, about 5% to about 60% by volume, about 10% to about 50% by volume, about 15% to about 40% by volume, or about 20% to about 30% by volume.

In some embodiments, the nanowires have an average length of about 200 nm to about 1 m, about 200 nm to about 500 mm, about 200 nm to about 100 mm, about 200 nm to about 10 mm, about 200 nm to about 1 mm, about 200 nm to about 200 µm, about 200 nm to about 50 µm, about 200 nm to about 10 µm, about 500 nm to about 50 mm, about 500 nm to about 10 mm, about 500 nm to about 1 mm, about 500 nm to about 500 µm, about 500 nm to about 50 µm, about 500 nm to about 10 µm, about 1 µm to about 100 mm, about 1 µm to about 10 mm, about 1 µm to about 1 mm, about 1 µm to about 500 µm, or about 1 µm to about 100 µm.

In some embodiments, the nanowires have an average diameter of about 5 nm to about 20 µm, about 5 nm to about 10 µm, about 5 nm to about 1 µm, about 5 nm to about 500 nm, about 5 nm to about 250 nm, about 5 nm to about 100 nm, about 5 nm to about 75 nm, about 5 nm to about 50 nm, about 5 nm to about 25 nm, about 10 nm to about 10 µm, about 10 nm to about 1 µm, about 10 nm to about 750 nm, about 10 nm to about 500 nm, about 10 nm to about 250 nm, about 10 nm to about 100 nm, about 10 nm to about 75 nm, about 10 nm to about 50 nm, about 25 nm to about 10 µm, about 25 nm to about 1 µm, about 25 nm to about 750 nm, about 25 nm to about 500 nm, about 25 nm to about 250 nm, about 25 nm to about 100 nm, about 50 nm to about 10 µm, about 50 nm to about 1 µm, about 50 nm to about 750 nm, about 50 nm to about 500 nm, about 50 nm to about 250 nm, about 50 nm to about 100 nm, about 100 nm to about 10 µm, about 100 nm to about 1 µm, about 100 nm to about 750 nm, about 100 nm to about 500 nm, about 100 nm to about 250 nm, about 500 nm to about 10 µm, about 500 nm to about 1 µm, or about 500 nm to about 750 nm.

In some embodiments, a deposited array of nanowires comprises nanowires having an average diameter of about 100 nm to about 5 µm, about 500 nm to about 5 µm, or about 1 µm to about 5 µm. The deposited array of nanowires can be optionally annealed, calcined, or otherwise post-treated to provide an array of nanowires comprising nanowires having an average diameter of about 50 nm to about 500 nm, about 100 nm to about 500 nm, or about 300 nm to about 500 nm.

The diameter (e.g., thickness and/or width) of nanowires can be varied to provide enhanced anti-reflection for different wavelengths or ranges of wavelengths in the electromagnetic spectrum. Not being bound by any particular theory, for a wavelength range, $\lambda_1$-$\lambda_2$, wherein $\lambda_1$ is the lowest wavelength of radiation for which anti-reflection is sought and $\lambda_2$ is the longest wavelength of radiation for which anti-reflection is sought, the diameter of a nanowire within a coating of the present invention can be about $0.10(\lambda_1)$ to about $0.25(\lambda_1)$, and the total thickness of the multi-layer coating can be about $0.25(\lambda_2)$ or more.

Nanowires for use with the present invention can be rigid or flexible. In some embodiments, a nanowire can undergo plastic deformation such that conformal contact can be made between a flexible nanowire and a curved or non-planar substrate.

In some embodiments, a nanowire for use with the present invention comprises a metal selected from: gold, nickel, palladium, iridium, cobalt, chromium, aluminum, titanium, tin, and the like, an alloy thereof, a polymer, a conductive polymer, a ceramic, a composite thereof, and combinations thereof. Other presently known and later developed conductive or semiconductive materials can also be employed.

In some embodiments, a nanowire for use with the present invention comprises a material selected from: an aluminum oxide (e.g., $Al_2O_3$), a zirconium oxide (e.g., $ZrO_2$), a titanium oxide (e.g., $TiO_2$), a yttrium oxide (e.g., $Y_2O_3$), a zinc oxide (e.g., ZnO), a zinc sulfide (e.g., ZnS), a germanium oxide, (e.g., GeO, $GeO_2$, and the like), copper oxide (e.g., $Cu_2O$, and the like), silver oxide (e.g., AgO), carbon, an indium tin oxide, a suboxide thereof, and combinations thereof.

In some embodiments, a nanowire suitable for use with the present invention is a $ZrO_2$ nanowire having a mean diameter of about 150 nm to about 600 nm. In some embodiments, a nanowire suitable for use with the present invention is a GeO nanowire having a mean diameter of about 50 nm to about 200 nm. In some embodiments, a nanowire suitable for use with the present invention is a $TiO_2$ nanowire having a mean diameter of about 50 nm to about 200 nm. In some embodiments, a nanowire suitable for use with the present invention is a ZnO nanowire having a mean diameter of about 50 nm to about 500 nm.

In some embodiments, the nanowires of at least the bottom layer of the coating have substantially the same composition of the substrate.

In some embodiments, a nanowire absorbs electromagnetic radiation having at least one wavelength of about 180 nm to about 30 µm. Thus, in some embodiments a coating of the present invention does not substantially reflect or transmit at least one wavelength of about 180 nm to about 30 µm. In some embodiments, a nanowire is substantially transparent to electromagnetic radiation having at least one wavelength of about 180 nm to about 30 µm. Thus, in some embodiments a coating of the present invention effectively transmits at least one wavelength of about 180 nm to about 30 µm.

In some embodiments, all of the nanowires present within a multi-layer coating have approximately the same composition. In some embodiments, all of the nanowires present within a laminar layer of a coating of the present invention have substantially the same composition. In some embodiments, nanowires in different layers of a coating of the present invention have compositions that differ from one another, or that differ substantially from one another.

In some embodiments, the nanowires within a multi-layer coating of the present invention are not functionalized and/or derivatized. In some embodiments, nanowires with a coating of the present invention are functionalized and/or derivatized. As used herein, "functionalized" and "derivatized" refer to the attachment of a chemical group, ligand, species, moiety, and the like to a nanowire, coating layer, or surface of a coating of the present invention. In some embodiments, nanowires, layers and/or coatings are derivatized with a molecular species as described herein, or an oligomer, a dendrimer, a polymer, a nanoparticle, or a metal complex thereof, wherein a molecular species is present as a repeat unit in an oligomer, dendrimer, polymer, or nanoparticle, or as a ligand in a metal complex.

Not being bound by any particular theory, functionalization and derivatization can be achieved via a covalent bonding interaction, an ionic bonding interaction, a hydrogen bonding interaction, a non-bonding interaction, an intercalation interaction, physical entanglement, a chiral interaction, a magnetic interaction, and combinations thereof. Derivatization and functionalization can be performed to increase an adhesive interaction with a substrate, increase the solubility of nanowires in a solvent, increase the hydrophobicity of a coating, increase the hydrophilicity of a coating, and combinations thereof.

A molecular species, oligomer, dendrimer, polymer, nanoparticle, and metal complex suitable for use with the present invention can be functionalized with one of the following groups to facilitate an association with a substrate: hydroxyl, alkoxyl, thiol, alkylthio, silyl, alkylsilyl, alkylsilenyl, siloxyl, primary amino, secondary amino, tertiary amino, carbonyl, alkylcarbonyl, aminocarbonyl, carbonylamino, carboxy, and combinations thereof.

In some embodiments, the nanowires and/or coatings are hydrophobic. In some embodiments, a nanowire or coating can be derivatized with a hydrophobic functional group. As used herein, "hydrophobic" refers to coatings that have a tendency to repel water, are resistant to water and/or cannot be wetted by water. For example, in some embodiments water deposited on a hydrophobic coating of the present invention forms a droplet having a contact angle of about 90° to about 180°. In some embodiments, water deposited onto a hydrophobic coating of the present invention forms a minimum contact angle of about 90°, about 100°, about 110°, about 120°, about 130°, about 140°, about 150°, or about 160°.

In some embodiments, a hydrophobic molecular species comprises an optionally substituted $C_1$-$C_{60}$ alkyl, an optionally substituted $C_2$-$C_{60}$ alkenyl, an optionally substituted $C_2$-$C_{60}$ alkynyl, an optionally substituted $C_6$-$C_{60}$ aryl, an optionally substituted $C_6$-$C_{60}$ aralkyl, an optionally substituted $C_6$-$C_{60}$ heteroaryl, and combinations thereof, wherein these groups can be linear or branched. Optional substituents for hydrophobic molecular species include, but are not limited to, a halo and perhalo (i.e., wherein halo is any one of: fluorine, chlorine, bromine, iodine, and combinations thereof), alkylsilyl, siloxyl, tertiary amino, and combinations thereof.

In some embodiments, an optionally substituted hydrophobic molecular species is chosen from a $C_1$-$C_{60}$ fluoroalkyl, a $C_1$-$C_{60}$ perfluoroalkyl, and combinations thereof.

Functional groups suitable for imparting hydrophilicity to a nanowire and/or coating of the present invention include, but are not limited to, hydroxyl, alkoxyl, thiol, thioalkyl, silyl, alkylsilyl, alkylsilenyl, siloxyl, primary amino, secondary amino, tertiary amino, carbonyl, alkylcarbonyl, aminocarbonyl, carbonylamino, carboxy, alkylenedioxy, and combinations thereof. Not being bound by any particular theory, alkylsilyl, alkylsilenyl, siloxyl, primary amino, secondary amino, tertiary amino, alkylcarbonyl, aminocarbonyl, carbonylamino, and carboxy functional groups can also impart hydrophobicity to a surface depending on the presence and length of an —R group attached to the functional group, wherein R is, e.g., alkyl, alkenyl, alkynyl, and the like, wherein increasing the number of carbon atoms present in R increases the hydrophobicity of a coating layer.

As used herein, "alkyl," by itself or as part of another group, refers to straight and branched chain hydrocarbons of up to 60 carbon atoms, such as, but not limited to, octyl, decyl, dodecyl, hexadecyl, and octadecyl.

As used herein, "alkenyl," by itself or as part of another group, refers to a straight and branched chain hydrocarbons of up to 60 carbon atoms, wherein there is at least one double bond between two of the carbon atoms in the chain, and wherein the double bond can be in either of the cis or trans configurations, including, but not limited to, 2-octenyl, 1-dodecenyl, 1-8-hexadecenyl, 8-hexadecenyl, and 1-octadecenyl.

As used herein, "alkynyl," by itself or as part of another group, refers to straight and branched chain hydrocarbons of up to 60 carbon atoms, wherein there is at least one triple bond between two of the carbon atoms in the chain, including, but not limited to, 1-octynyl and 2-dodecynyl.

As used herein, "aryl," by itself or as part of another group, refers to cyclic, fused cyclic, and multi-cyclic aromatic hydrocarbons containing up to 60 carbons in the ring portion. Typical examples include phenyl, naphthyl, anthracenyl, fluorenyl, tetracenyl, pentacenyl, hexacenyl, perylenyl, terylenyl, quaterylenyl, coronenyl, fullerenyl and buckminsterfullerenyl.

As used herein, "aralkyl" or "arylalkyl," by itself or as part of another group, refers to alkyl groups as defined above having at least one aryl substituent, such as benzyl, phenylethyl, and 2-naphthylmethyl. Similarly, the term "alkylaryl," as used herein by itself or as part of another group, refers to an aryl group, as defined above, having an alkyl substituent, as defined above.

As used herein, "heteroaryl," by itself or as part of another group, refers to cyclic, fused cyclic and multicyclic aromatic groups containing up to 30 atoms in the ring portions, wherein the atoms in the ring(s), in addition to carbon, include at least one heteroatom. The term "heteroatom" is used herein to mean an oxygen atom ("O"), a sulfur atom ("S") or a nitrogen atom ("N"). Additionally, the term heteroaryl also includes N-oxides of heteroaryl species that containing a nitrogen atom in the ring. Typical examples include pyrrolyl, pyridyl, pyridyl N-oxide, thiophenyl, and furanyl.

Any one of the above groups can be further substituted with at least one of the following substituents: hydroxyl, alkoxyl, thiol, alkylthio, silyl, alkylsilyl, alkylsilenyl, siloxyl, primary amino, secondary amino, tertiary amino, carbonyl, alkylcarbonyl, aminocarbonyl, carbonylamino, carboxy, halo, perhalo, alkylenedioxy, and combinations thereof.

As used herein, "hydroxyl," by itself or as part of another group, refers to an (—OH) moiety.

As used herein, "alkoxyl," by itself or as part of another group, refers to one or more alkoxyl (—OR) moieties, wherein R is selected from the alkyl, alkenyl, alkynyl, aryl, aralkyl, and heteroaryl groups described above.

As used herein, "thiol," by itself or as part of another group, refers to an (—SH) moiety.

As used herein, "alkylthio," refers to an (—SR) moieties, wherein R is selected from the alkyl, alkenyl, alkynyl, aryl, aralkyl, and heteroaryl groups described above.

As used herein, "silyl," by itself or as part of another group, refers to an (—SiH$_3$) moiety.

As used herein, "alkylsilyl," by itself or as part of another group, refers to an (—Si(R)$_x$H$_y$) moiety, wherein $1 \leq x \leq 3$ and $y = 3-x$, and wherein R is independently selected from the alkyl, alkenyl, alkynyl, aryl, aralkyl, and heteroaryl groups described above.

As used herein, "alkylsilenyl," by itself or as part of another group, refers to a (—Si(=R)H) moiety, wherein R is selected from the alkyl, alkenyl, alkynyl, aryl, aralkyl, and heteroaryl groups described above.

As used herein, "siloxyl," by itself or as part of another group, refers to a (—Si(OR)$_x$R$^1_y$) moiety, wherein $1 \leq x \leq 3$ and $y = 3-x$, wherein R and R$^1$ are independently selected from hydrogen and the alkyl, alkenyl, alkynyl, aryl, aralkyl, and heteroaryl groups described above.

As used herein, "primary amino," by itself or as part of another group, refers to an (—NH$_2$) moiety.

As used herein, "secondary amino," by itself or as part of another group, refers to an (—NRH) moiety, wherein R is selected from the alkyl, alkenyl, alkynyl, aryl, aralkyl, and heteroaryl groups described above.

As used herein, "tertiary amino," by itself or as part of another group, refers to an (—NRR$^1$) moiety, wherein R and R$^1$ are independently selected from the alkyl, alkenyl, alkynyl, aryl, aralkyl, and heteroaryl groups described above.

As used herein, "carbonyl," by itself or as part of another group, refers to a (C=O) moiety.

As used herein, "alkylcarbonyl," by itself or as part of another group, refers to a (—C(=O)R) moiety, wherein R is independently selected from hydrogen and the alkyl, alkenyl, alkynyl, aryl, aralkyl, and heteroaryl groups described above.

As used herein, "aminocarbonyl," by itself or as part of another group, refers to a (—C(=O)NRR$^1$) moiety, wherein R and R$^1$ are independently selected from hydrogen and the alkyl, alkenyl, alkynyl, aryl, aralkyl, and heteroaryl groups described above.

As used herein, "carbonylamino," by itself or as part of another group, refers to a (—N(R)C(=O)R$^1$) moiety, wherein R and R$^1$ are independently selected from hydrogen and the alkyl, alkenyl, alkynyl, aryl, aralkyl, and heteroaryl groups described above.

As used herein, "carboxy," by itself or as part of another group, refers to a (—COOR) moiety, wherein R is independently selected from hydrogen and the alkyl, alkenyl, alkynyl, aryl, aralkyl, and heteroaryl groups described above.

As used herein, "alkylenedioxy," by itself or as part of another group, refers to a ring and is especially $C_{1-4}$ alkylenedioxy. Alkylenedioxy groups can optionally be substituted with halogen (especially fluorine). Typical examples include methylenedioxy (—OCH$_2$O—) or difluoromethylenedioxy (—OCF$_2$O—).

As used herein, "halo," by itself or as part of another group, refers to any of the above alkyl, alkenyl, alkynyl, aryl, aralkyl, and heteroaryl groups wherein one or more hydrogens thereof are substituted by one or more fluorine, chlorine, bromine, or iodine atoms.

As used herein, "perhalo," by itself or as part of another group, refers to any of the above alkyl, alkenyl, alkynyl, aryl, aralkyl, and heteroaryl groups wherein all of the hydrogens thereof are substituted by fluorine, chlorine, bromine, or iodine atoms.

In some embodiments, a nanowire coating or layer of the present invention can be fluorinated after deposition with a fluorine atom and/or a fluorinated moiety. As used herein, a "fluorinated moiety" refers to a molecule, particulate, polymer, oligomer, or precursor that contains a bond to fluorine and can be used to derivatize a nanowire, a layer, and/or a coating of the present invention. In some embodiments, a fluorinated moiety comprises a C—F bond and/or an Si—F bond. For example, in some embodiments, an outer surface of a multi-layer coating can be fluorinated (e.g., by exposure to $F_2$, $SiF_4$, $SF_6$, a fluorinated alkyl and/or alkoxy silane, and the like, as well as other fluorination processes that would be apparent to a person of ordinary skill in the art of surface fluorination) to provide a fluorinated surface. Alternatively, nanowires used to prepare a coating of the present invention can be fluorinated prior to formation of the coating such that fluorinated groups are present throughout the coating.

Further nanowire compositions suitable for use with the present invention are described in U.S. Patent Publication Nos. 2002/0094450 A1, 2002/0175408 A1, 2006/0019472 A1, 2007/0120095 A1, and 2007/0281156 A1, each of which is incorporated herein by reference in its entirety.

Substrates and Articles for Use with the Anti-Reflective Coatings

The anti-reflective coatings of the present invention are formed on a substrate or article. Substrates suitable for patterning by the methods of the present invention are not particularly limited by size, composition or geometry. For example, the present invention is suitable for patterning planar, multi-planar or tiered, non-planar, flat, curved, spherical, rigid, flexible, symmetric, and asymmetric substrates, and any combination thereof. The methods are also not limited by surface roughness or surface waviness, and are equally applicable to smooth, rough and wavy substrates, and substrates exhibiting heterogeneous surface morphology (i.e., substrates having varying degrees of smoothness, roughness and/or waviness).

As used herein, a substrate is "planar" if, after accounting for random variations in the height of a substrate (e.g., surface roughness, waviness, etc.), four points on the surface of the substrate lie in approximately the same plane. Planar substrates can include, but are not limited to, windows, embedded circuits, laminar sheets, and the like. Planar substrates can include flat variants of the above having holes there through.

As used herein, a substrate is "non-planar" if, after accounting for random variations in the height of a substrate (e.g., surface roughness, waviness, etc.), four or more points on the surface of the substrate do not lie in the same plane. Non-planar substrates can include, but are not limited to, gratings, substrates comprising multiple different planar areas (i.e., "multi-planar" substrates), substrates having a tiered geometry, and combinations thereof. Non-planar substrates can comprise flat and/or curved areas.

As used herein, a substrate is "curved" when the radius of curvature of a substrate is non-zero over a distance of 100 µm or more, or 1 mm or more, across the surface of a substrate.

As used herein, a substrate is "rigid" when the plane, curvature, and/or geometry of a substrate cannot be easily distorted. Rigid substrates can undergo temperature-induced distortions due to thermal expansion, or become flexible at temperatures above a glass transition, melting point, and the like.

The plane, curvature, and/or geometry of a flexible substrate can be distorted flexed, and/or undergo elastic or plastic deformation, bending, compression, twisting, and the like in response to applied external force, stress, strain and/or torsion. Typically, a flexible substrate can be moved between flat and curved geometries. Flexible substrates suitable for use with the present invention include, but are not limited to, polymers (e.g., plastics), woven fibers, thin films, metal foils, composites thereof, laminates thereof, and combinations thereof. In some embodiments, a flexible substrate can be patterned using the methods of the present invention in a reel-to-reel manner.

Substrates for use with the present invention are not particularly limited by composition. Substrates suitable for use with the present invention include materials chosen from metals, crystalline materials (e.g., monocrystalline, polycrystalline, and partially crystalline materials), amorphous materials, conductors, semiconductors, insulators, optics, painted substrates, fibers, glasses, ceramics, zeolites, plastics, thermosetting and thermoplastic materials (e.g., optionally doped: polyacrylates, polycarbonates, polyurethanes, polystyrenes, cellulosic polymers, polyolefins, polyamides, polyimides, resins, polyesters, polyphenylenes, and the like), films, thin films, foils, plastics, polymers, wood, fibers, minerals, biomaterials, living tissue, bone, alloys thereof, composites thereof, laminates thereof, porous variants thereof, doped variants thereof, and combinations thereof.

In some embodiments, the substrates are transparent, translucent, or opaque to visible, UV, and/or infrared light). In some embodiments, a substrate is black, and an optically absorbing nanowire coating of the present invention is applied thereto to provide a "perfectly" black article or object. In some embodiments, a substrate for use with the present invention is substantially transparent in the wavelength range of about 450 nm to about 900 nm, or about 8 µm to about 13 µm.

In some embodiments, at least a portion of a substrate is conductive or semiconductive. As used herein, "conductive" and "semiconductive" materials include species, compounds, polymers, films, coatings, substrates, and the like capable of transporting or carrying electrical charge. Generally, the charge transport properties of a semiconductive material can be modified based upon an external stimulus such as, but not limited to, an electrical field, a magnetic field, a temperature change, a pressure change, exposure to radiation, and combinations thereof. In some embodiments, a conductive or semiconductive material has an electron or hole mobility of about $10^{-6}$ $cm^2/V \cdot s$ or more, about $10^{-5}$ $cm^2/V \cdot s$ or more, about $10^{-4}$ $cm^2/V \cdot s$ or more, about $10^{-3}$ $cm^2/V \cdot s$ or more, about 0.01 $cm^2/V \cdot s$ or more, or about 0.1 $cm^2/V \cdot s$ or more. Electrically conductive and semiconductive materials include, but are not limited to, metals, alloys, thin films, crystalline materials, amorphous materials, polymers, laminates, foils, plastics, and combinations thereof.

In some embodiments, the substrate comprises a semiconductor such as, but not limited to: crystalline silicon, polycrystalline silicon, amorphous silicon, p-doped silicon, n-doped silicon, silicon oxide, silicon germanium, germanium, gallium arsenide, gallium arsenide phosphide, indium tin oxide, and combinations thereof.

In some embodiments, the substrate comprises a glass such as, but not limited to, undoped silica glass ($SiO_2$), fluorinated silica glass, borosilicate glass, borophosphorosilicate glass, organosilicate glass, porous organosilicate glass, and combinations thereof.

In some embodiments, the substrate comprises a ceramic such as, but not limited to, zinc sulfide ($ZnS_x$), boron phosphide ($BP_x$), gallium phosphide ($GaP_x$), silicon carbide ($SiC_x$), hydrogenated silicon carbide ($H:SiC_x$), silicon nitride ($SiN_x$), silicon carbonitride ($SiC_xN_y$), silicon oxynitride ($SiO_xN_y$), silicon oxycarbide ($SiO_xC_y$), silicon carbon-oxynitride ($SiC_xO_yN_z$), alumina ($Al_xO_y$), germania ($Ge_xO_y$), hydrogenated variants thereof, doped variants (e.g., n-doped and p-doped variants) thereof, and combinations thereof (where x, y, and z can vary independently from about 0.1 to about 5, about 0.1 to about 3, about 0.2 to about 2, or about 0.5 to about 1). In some embodiments, a ceramic substrate has a native oxide and/or a deposited oxide layer thereon.

In some embodiments, the substrate comprises a metal such as, but not limited to, germanium, copper, nickel, cobalt, chromium, titanium, niobium, molybdenum, rhodium, palladium, silver, cadmium, indium, tantalum, tungsten, iridium, platinum, gold, and combinations thereof. In some embodiments, a metal substrate has a native oxide and/or a deposited oxide layer thereon.

In some embodiments, a substrate is selected from the group consisting of: ZnS, silicon, sapphire, germanium, and combinations thereof.

In some embodiments, the substrate comprises a flexible material, such as, but not limited to: a plastic, a composite, a laminate, a thin film, a metal foil, and combinations thereof.

The methods and structures of the present invention are suitable for application in electrical systems, optical systems, consumer electronics, industrial electronics, automobiles, military applications, wireless systems, space applications, and any other applications in which anti-reflective coatings are required or desirable.

The present invention is also directed to articles, objects and devices comprising the multi-layer coatings of the present invention. Exemplary articles, objects and devices comprising the substrates on which the anti-reflective and protective nanowire coatings of the present invention can be applied include, but are not limited to, windows; mirrors; radar domes (e.g., missile domes, radar enclosures, and the like); communications devices; optical elements (e.g, optical elements for use in eyeglasses, cameras, binoculars, telescopes, night-vision goggles, range-finding sights, IR viewers, and the like); lenses (e.g., fresnel lenses, etc.); watch crystals; optical fibers, output couplers, input couplers, microscope slides, holograms; cathode ray tube devices (e.g., computer and television screens); optical filters; data storage devices (e.g., compact discs, DVD discs, CD-ROM discs, and the like); flat panel electronic displays (e.g., LCDs, plasma displays, and the like); touch-screen displays (such as those of computer touch screens and personal data assistants); solar cells; flexible electronic displays (e.g., electronic paper and books); cellular phones; global positioning systems; calculators; graphic articles (e.g., signage); motor vehicles (e.g., wind screens, windows, displays, and the like); artwork (e.g., sculptures, paintings, lithographs, and the like); membrane switches; jewelry; and combinations thereof.

In some embodiments, the anti-reflective coatings of the present invention can be used as an outer surface of a display or optical device without applying an additional protective layer to the coatings. For example, in some embodiments there is no additional hard coating or anti-static coating applied to the anti-reflective coating of the present invention.

The surface area of a substrate is not particularly limited and can be easily scaled by the proper design of equipment suitable for disposing the anti-reflective coatings of the present invention, and can range, without limitation, from about 1 mm$^2$ to about 20 m$^2$, or about 1 cm$^2$ to about 10 m$^2$.

The substrates suitable for use with the present invention, and the anti-reflective coatings provided thereon can be structurally and compositionally characterized using analytical methods known to those of ordinary skill in the art of thin film fabrication and characterization.

Anti-Reflective Coatings

The present invention is directed to compositions comprising a substrate including a surface and having on at least a portion of the surface a multi-layer coating of nanowires comprising three or more laminar layers of nanowires. The compositions include a bottom layer of nanowires affixed to the surface, and a top-most layer of nanowires, wherein nanowires present within a laminar layer are oriented substantially parallel to each other, and nanowires within adjacent laminar layers are not substantially parallel to each other. In some embodiments, the top-most layer of nanowires has a refractive index of about 5% to about 70% of a refractive index of the bottom layer of nanowires, and the refractive index of the three or more laminar layers of nanowires decreases by about 10% or more per laminar layer from the bottom layer of nanowires to the top-most layer of nanowires.

As used herein, a "coating" refers to a multi-layer film or laminate on a substrate. The coatings of the present invention are anti-reflective. In some embodiments, the coatings of the present invention are also smudge-resistant.

As used herein, a "lattice" refers to a three dimensional array of interlocking nanowires comprised by a coating of the present invention. In some embodiments, a multi-layer coating of the present invention forms a lattice of nanowires.

As used herein, "laminar layers" refers to a coating comprised of layers that are substantially conformal or evenly coat a substrate, wherein adjacent layers within the coating are adhered to one another but do not substantially overlap.

The layers and coatings of the present invention can be characterized based upon the refractive index. As used herein, a "refractive index" of a layer refers to a volume average refractive index. For example, for a layer comprising two components (e.g., a nanowire having a refractive index, n>1.0, and air having a refractive index, n=1.00293) the refractive index of the layer is approximately the volume average of the first component of the layer and the volume average of the second component of the layer multiplied by the refractive index of the first and second components, respectively. Thus, the refractive index of a layer comprising multiple components can be approximated using equation (1):

$$n_{LAYER}=n_1V_1+n_2V_2\ldots+n_xV_x \quad (1)$$

where $V_1$, $V_2$ and $V_x$ are the average percentage volumes of the first, second and xth components of the layer, respectively, and wherein $V_1+V_2\ldots+V_x=100\%$ volume.

The anti-reflective coatings of the present invention have an anisotropic refractive index in at least the vertical direction (i.e., a non-homogeneous refractive index in at least the z-axis), and can also exhibit anisotropy in a lateral direction of, e.g., a layer of a coating.

Non-limiting examples of tools suitable for measuring a refractive index of a coating or a layer of the present invention include a refractometer, a gonioreflectometer, an ellipsometer, and any other analytical tools known to a person of ordinary skill in the art.

A refractive index of a layer and/or coating of the present invention can be measured at any wavelength in the electromagnetic spectrum from about 180 nm to about 30 µm. In some embodiments, a refractive index of a layer and/or coating is measured using the sodium D-line (λ=589.29 nm).

In some embodiments, the refractive index of a layer within a coating can be determined based on the refractive index of another layer within a coating. For example, in some embodiments a top-most layer of nanowires in a coating has a refractive index of about 5% to about 70% of a refractive index of a bottom layer of nanowires. As used herein, a percentage of a refractive index can be calculated using equation (2):

$$n_{LAYER2}=[(n_{LAYER1}-1.0)\times\%]+1.0 \qquad (2)$$

where $n_{LAYER2}$ is the refractive index of a second layer, $n_{LAYER1}$ is the refractive index of a first layer of a coating, and "%" is the percentage change between the first and second layers of the coating. Thus, given a first layer having a refractive index, $n_{LAYER1}=3.0$, a second layer having a refractive index of about 5% to about 70% of the first layer would have a refractive index of about $n_{LAYER2}=1.1$ to about $n_{LAYER2}=2.4$.

The coatings of the present invention are affixed to a substrate. As used herein, "affixed" refers to the coatings of the present invention having an adhesive interaction with a substrate. An adhesive interaction between the coatings and a substrate can be a covalent bonding interaction, a metal-metal bonding interaction, an ionic bonding interaction, a Van der Waals interaction, a Coulombic attractive interaction, a magnetic interaction, and combinations thereof, or any other adhesive interaction known to a person of ordinary skill in the art. In some embodiments, a bottom layer of a coating of the present invention can be affixed to a substrate using a contact layer, an epoxy, a resin, a solder, a mineral, and combinations thereof.

In some embodiments, a contact layer having a similar composition to the composition of nanowires in a layer thereon is present between the substrate and the nanowire coating. For example, a substrate comprising a layer of aligned zirconium oxide nanowires thereon can include a thin layer of zirconium oxide between the substrate and the first layer of nanowires. Thus, suitable contact layer compositions for use with the present invention include the same materials listed herein as suitable materials for use as nanowires. A contact layer can be deposited by known methods suitable for conformal deposition such as, but not limited to, chemical vapor deposition, plasma-enhanced chemical vapor deposition, thermal deposition, sputtering, a molecular beam, spin-coating, and the like.

In some embodiments, a contact layer has a thickness of about 10 nm to about 1 μm, about 25 nm to about 500 nm, about 30 nm to about 300 nm, about 40 nm to about 250 nm, or about 50 nm to about 200 nm.

In some embodiments, a bottom layer of nanowires has a refractive index of about 30% to about 100%, about 30% to about 90%, about 30% to about 80%, about 30% to about 60%, about 30% to about 50%, about 50% to about 90%, about 50% to about 80%, about 50% to about 70%, about 70% to about 90%, about 70% to about 80%, about 90%, about 85%, about 80%, or about 75% of a refractive index of the substrate.

In some embodiments, a top-most layer of nanowires has a refractive index of about 1% to about 40%, about 1% to about 35%, about 1% to about 30%, about 1% to about 25%, about 1% to about 20%, about 1% to about 15%, about 1% to about 10%, about 5% to about 40%, about 5% to about 35%, about 5% to about 30%, about 5% to about 25%, about 5% to about 20%, about 5% to about 15%, about 5% to about 10%, about 10% to about 40%, about 10% to about 35%, about 10% to about 30%, about 10% to about 25%, about 10% to about 20%, about 20% to about 40%, about 20% to about 35%, or about 20% to about 30% of the refractive index of the substrate.

In some embodiments, the refractive index of the three or more laminar layers decreases by about 15% or more per layer, about 20% or more per layer, about 25% or more per layer, about 30% or more per layer, about 35% or more per layer, about 40% or more per layer, about 45% or more per layer, or about 50% or more per layer from the bottom layer of nanowires to the top-most layer of nanowires.

FIG. 1A provides a graphic representation of refractive index versus coating thickness for an ideal gradient refractive index coating. Referring to FIG. 1A, a line graph, 100, displays the refractive index versus elevation (e.g., depth or distance) in arbitrary units ("a.u."). A first portion of the line graph, 101, corresponds to a substrate, which has a refractive index, 102, and an elevation (e.g., depth) indicated by the position of line 103. A second portion of the line graph, 104, corresponds to atmosphere (i.e., an ambient species proximate to a substrate having an anti-reflective coating thereon, and typically having a refractive index less than that of a substrate), which has a refractive index, 105, that is less than a refractive index of the substrate. The atmosphere has an elevation indicated by the position of line 106, which corresponds to the elevation of an outer surface of an anti-reflective coating that is present on the substrate. The anti-reflective coating has a depth indicated by the magnitude of vector 107. The presence of an ideal gradient refractive index coating on the substrate is indicated by the decrease in refractive index through the depth of the grating. The refractive index of the ideal anti-reflective coating decreases continuously from the surface of the substrate (i.e., the base of the coating), 103, to the outer surface of the coating, 106. The refractive index of the coating is first matched, 108, at its base to the refractive index of the substrate, and the refractive index of the coating is also matched at its surface, 109, to the refractive index of the atmosphere.

Not being bound by any particular theory, the refractive index matching of the anti-reflective coating with, at the base of the coating, the refractive index of a substrate, and at the surface of the coating, the refractive index of an atmosphere is the primary means by which the coatings of the present invention prevent reflection of electromagnetic radiation from the surface of a substrate. The coatings of the present invention, can be optimized for virtually any substrate for use in virtually any atmosphere because the refractive index of nanowires can be tuned based on both composition and the density of nanowires in a coating layer. For example, the anti-reflective coatings of the present invention can be designed for use in a gaseous atmosphere (e.g., air, nitrogen, argon, oxygen, carbon dioxide, and the like) that typically has a refractive index of about 1.0. The anti-reflective coatings of the present invention can also be designed for use in a gaseous atmosphere (e.g., water, or another solvent). For example, an anti-reflective coating can be designed for use on a submersible vehicle, a coating designed to mitigate detection by radar, or a coating designed to minimize reflections from the surface of an optical window, a cuvette, and the like. An anti-reflective coating of the present invention can also be tailored to minimize reflections between solid surfaces. For example, an anti-reflective coating can be designed to minimize reflections between a lasing medium and a second solid, between an optical fiber and an output coupler or an input coupler, and the like.

FIG. 1B provides a graphic representation of refractive index versus coating depth or thickness for an anti-reflective coating of the present invention. Referring to FIG. 1B, a line graph, 110, displays the refractive index versus elevation. A first portion of the line graph, 111, corresponds to a substrate, which has a refractive index, 112, and an elevation indicated by the position of line 103. A second portion of the line graph, 114, corresponds to an atmosphere having a refractive index, 115, that is less than a refractive index of the substrate. The atmosphere has an elevation indicated by the position of line 106, which corresponds to the elevation of an outer surface of an anti-reflective coating that is present on the substrate. The anti-reflective coating comprises five laminar layers of nanowires, 117, each laminar layer having a thickness indicated by the magnitude of vectors 121, 122, 123, 124 and 125, respectively. In some embodiments, the thickness of individual layers of nanowires within the anti-reflective coating is varied, as shown in FIG. 1B. The first layer of nanowires, having a thickness equal to the magnitude of vector 121, has a refractive index substantially identical to the refractive index of the substrate, 112. Thus, the anti-reflective coating is refractive index matched with the substrate, as indicated by arrow 118. The second layer of nanowires, having a thickness equal to the magnitude of vector 122, has a refractive index, 132, which is less than the refractive index of the first layer of nanowires, 112. The third layer of nanowires, having a thickness equal to the magnitude of vector 123, has a refractive index, 133, that is less than the refractive index of the second layer of nanowires. The fourth layer of nanowires, having a thickness equal to the magnitude of vector 124, has a refractive index, 134, that is less than the refractive index of the third layer of nanowires. The fifth layer of nanowires, having a thickness equal to the magnitude of vector 125, has a refractive index, 135, that is less than the refractive index of the fourth layer of nanowires. The refractive index of the fifth layer of nanowires, 135, is slightly greater than the refractive index of the atmosphere, 115. The interface between the outer surface of the anti-reflective coating and the atmosphere is indicated by arrow 119.

In some embodiments, the refractive index of the three or more laminar layers of nanowires decreases alinearly from the base of a coating to the surface of a coating. As used herein, "alinearly" refers to a coating for which an (x,y) plot of refractive index versus coating and substrate elevation (e.g., thickness) is described or substantially fit by a non-linear curve (e.g., a quadratic equation, an exponential equation, a power series, etc.). For example, referring to FIG. 1B, the points describing the refractive index versus elevation for the anti-reflective coating, using the elevation of the substrate as the origin, are fit by a non-linear line, 130.

FIG. 1C provides a graphic representation of refractive index versus coating depth or thickness for a second anti-reflective coating of the present invention. Referring to FIG. 1C, a line graph, 140, displays the refractive index versus elevation. A first portion of the line graph, 141, corresponds to a substrate, which has a refractive index, 142, and an elevation indicated by the position of line 103. A second portion of the line graph, 144, corresponds to an atmosphere having a refractive index, 145, that is less than a refractive index of the substrate. The atmosphere has an elevation indicated by the position of line 106, which corresponds to the elevation of an outer surface of an anti-reflective coating that is present on the substrate. The anti-reflective coating comprises three laminar layers of nanowires, 147, each laminar layer having a thickness indicated by the magnitude of vectors 151, 152 and 153, respectively. In some embodiments, the thickness of individual layers of nanowires within the anti-reflective coating is substantially the same, as shown in FIG. 1C. The first layer of nanowires, having a thickness equal to the magnitude of vector 151, has a refractive index, 161, which less than the refractive index of the substrate, 142. The substrate-coating interface is indicated by arrow 148. The second layer of nanowires, having a thickness equal to the magnitude of vector 152, has a refractive index, 162, which is less than the refractive index of the first layer of nanowires, 161. The third layer of nanowires, having a thickness equal to the magnitude of vector 153, has a refractive index, 163, that is less than the refractive index of the second layer of nanowires. The refractive index of the third layer of nanowires, 163, is greater than the refractive index of the atmosphere, 145. The interface between the outer surface of the anti-reflective coating and the atmosphere is indicated by arrow 149.

In some embodiments, the refractive index of the three or more laminar layers of nanowires decreases linearly from the bottom layer of nanowires to the top-most layer of nanowires. As used herein, "decreases linearly" refers to a coating for which an (x,y) plot of refractive index versus coating and substrate elevation (e.g., thickness) is described or substantially fit by a linear equation. For example, referring to FIG. 1C, the points describing the refractive index versus elevation for the anti-reflective coating, using the elevation of the substrate as the origin, are fit by a straight line, 150.

Figure 2:
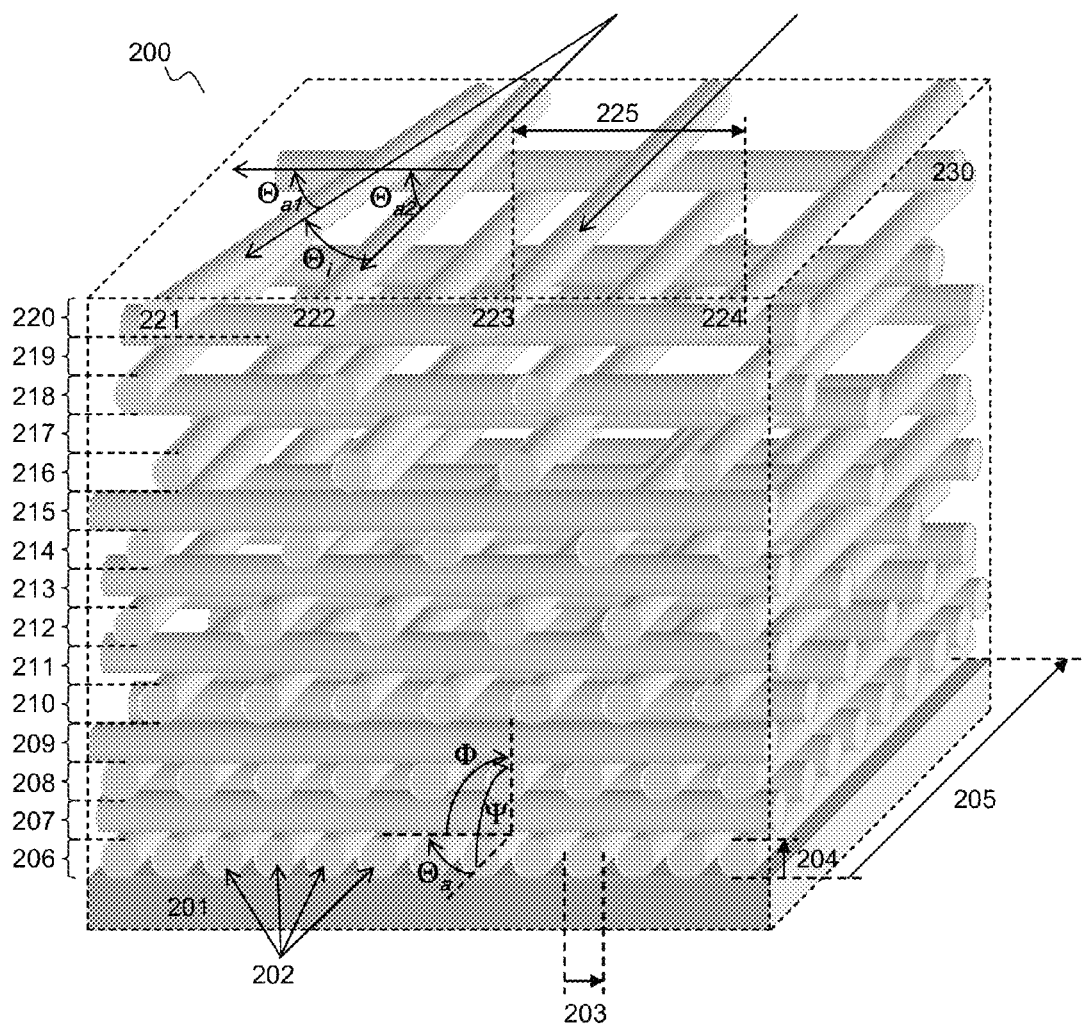
FIG. 2 provides a schematic cross-sectional representation of an anti-reflective surface of the present invention.

FIG. 2 provides a three-dimensional cross-sectional representation, 200, of one embodiment of an anti-reflective coating of the present invention. Referring to FIG. 2, a substrate, 201, is provided having an arrangement of nanowires, 202, thereon. The nanowires have a lateral dimension (e.g., a width or a diameter) indicated by the magnitude of vector 203, and a vertical dimension (e.g., a height or a second diameter) indicated by the magnitude of vector 204. The portion of the nanowires that is visible in the schematic representation has a length indicated by the magnitude of vector 205. The nanowires in contact with or affixed to the substrate form a first laminar layer (e.g., a bottom layer) of nanowires on the substrate, 206. The anti-reflective coating further includes a second layer of nanowires, 207, a third layer of nanowires, 208, a fourth layer of nanowires, 209, a fifth layer of nanowires, 210, a sixth layer of nanowires, 211, a seventh layer of nanowires, 212, an eighth layer of nanowires, 213, a ninth layer of nanowires, 214, a tenth layer of nanowires, 215, an eleventh layer of nanowires, 216, a twelfth layer of nanowires, 217, a thirteenth layer of nanowires, 218, a fourteenth layer of nanowires, 219, and a fifteenth layer of nanowires, 220.

In some embodiments, a thickness of a laminar layer within a multi-layer coating of nanowires is approximately a diameter of a nanowire present within the laminar layer. In some embodiments, a thickness of a laminar layer within a multi-layer coating of the present invention is about two times or less, about three times or less, about five times or less, or about ten times or less than an average diameter of a nanowire present within the layer of nanowires. Referring to FIG. 2, the individual layers of nanowires depicted have a thickness substantially identical to the diameter of the nanowires. The nanowires in the various layers of the anti-reflective coating can have diameters, heights and widths that are substantially identical or different.

The orientation of a nanowire relative to a substrate surface can be described by a "pitch", which as used herein refers to an average angle made between a long axis of a nanowire and the plane of a substrate (or for non-planar substrates, with an average curvature of the substrate). Referring to FIG. 2, the pitch of layers 206, 208, 210, 212, 214, 216, 218 and 220 is described by angle $\Psi$, wherein 0° is described by co-planarity with a substrate. The pitch of layers 207, 209, 211, 213, 215, 217 and 219 is described by angle $\Phi$, wherein 0° is described by co-planarity with a substrate. In some embodiments, nanowires present within a layer of an anti-reflective coating have a pitch of about ±30°, about ±25°, about ±20°, about ±15°, about ±10°, about ±5°, or about 0°. In some embodiments, the long axis of the nanowires present within a layer are substantially co-linear or co-planar with a plane of a substrate, i.e., have a pitch of about 0°; for example, when a laminar layer of nanowires has a thickness that is substantially identical to an average diameter of nanowires present within the layer.

In some embodiments, adjacent nanowires within a laminar layer of a coating are oriented in a non-random manner. The orientation relative to one another of any two adjacent nanowires within a layer can be described by an angle formed between two vectors oriented co-linear to long axes of the nanowires. Referring to FIG. 2, adjacent nanowires 221 and 222, present within layer 220, are oriented relative to one another by an angle $\Theta_r$. Adjacent nanowires 222 and 223, present within layer 220, are oriented substantially parallel to one another. In some embodiments, nanowires present within the same layer are oriented at an average angle of about 30° or less, about 25° or less, about 20° or less, about 15° or less, about 10° or less, or about 5° or less relative to other nanowires present within the layer. In some embodiments, nanowires within a single laminar layer of a coating of the present invention are oriented substantially parallel to one another.

In some embodiments, adjacent nanowires within a single laminar layer of a coating of the present invention are in contact with one another, for example, at a point or points along the long axes of the nanowires. In some embodiments, adjacent nanowires within a single laminar layer do not substantially contact one another. Referring to FIG. 2, adjacent nanowires 223 and 224, present within layer 220, do not contact one another and have a spacing there between indicated by the magnitude of vector 225. In some embodiments, adjacent nanowires within a layer have a spacing there between of about 30% or less, about 25% or less, about 20% or less, about 15% or less, about 10% or less, or about 5% or less than the average length of the nanowires present in the layer.

In some embodiments, nanowires within adjacent laminar layers of a coating are oriented in a non-random manner. The orientation relative to one another of any two nanowires within adjacent layers can be described by an angle formed between two vectors oriented co-linear to long axes of the nanowires. Referring to FIG. 2, nanowires 221 and 230, present within adjacent layers 220 and 219, respectively, are oriented relative to one another by an angle $\Theta_{a1}$.

In some embodiments, nanowires within adjacent laminar layers of the multi-layer coating are substantially orthogonal to one another. For example, nanowires 222 and 230, present within adjacent coating layers 220 and 230, respectively, are oriented substantially orthogonal to one another (i.e., are oriented relative to one another by an angle $\Theta_{a2}$, which is about 90°.

In some embodiments, the refractive index of a multi-layer coating can be decreased without adjusting the number density of nanowires in adjacent layers of the coating. Specifically, porous nanowires having diameters of varying size that include an internal void space can be utilized to provide multi-layer GRIN coatings. Porous nanowires having a controlled porosity (and a controlled refractive index) deposited in aligned layers by the methods described herein to provide aligned nanowire coatings having a controlled refractive index. Generally, for nanowires of similar chemical composition, increasing the porosity results in a decrease in the refractive index of the nanowires. Thus, the present invention is directed to a GRIN multi-layer coating in which a constant number density of nanowires per coating layer is maintained, while the refractive index of the nanowire coating layers is decreased by increasing the porosity or changing the composition of the nanowires in the layers of the coating. The present invention is also directed to multi-layer coatings in which both the number density of nanowires and porosity or chemical composition of nanowires is varied between adjacent coating layers to provide a multi-layer GRIN coating structure.

In some embodiments, a coating further comprises a molecular or polymeric matrix surrounding the multi-layer coating of nanowires, wherein at least a portion of the topmost layer of nanowires is exposed. Preferred polymers include structures having narrow and/or low-intensity absorptions in the near-infrared and/or infrared regions of the spectrum. For example, polymers comprising carbon-carbon (C—C) bonds, carbon-hydrogen (C—H) bonds, ether (C—O) bond, carbonyl (C═O) bonds, carbon-halogen (C—X) bonds wherein X is preferably —F or —Cl, and the like are particularly suitable for encapsulating at least a portion of a nanowire coating of the present invention.

In some embodiments, a polymer suitable for use as an encapsulant can be dissolved in a solvent for application via drop-coating, spin-coating, spray-coating, dip-coating, and the like. Therefore polymers capable of being dissolved in a solvent selected from: a hydrocarbon (e.g., hexanes, and the like), an aromatic solvent (e.g., toluene, benzene, and the like), a nitrogen-containing solven (e.g., pyridine, and the like), acetone, ethyl acetate, a nitrile solvent (e.g., acetonitrile, butyronitrile, and the like), dimethylformamide, diethylacetamide, N-methylpyrrolidone, a chlorinated solvent (e.g., chloroform, methylene chloride, dichloroethane, and the like), an ether, a glycol, a glycol ether, and the like, and combinations thereof.

In some embodiments, a polymer suitable for use as an encapsulant of a nanowire coating of the present invention is selected from a polyolefin (e.g., an ethylene-alkylene copolymer such as ethylene-butylene copolymer, and the like), ethylene-vinyl acetate copolymers, styrene polymers, halogenated hydrocarbon polymers, vinyl polymers, acrylic polymers, methacrylic polymers, polyethers, polyether copolymers, polyamides, polyimines, polyurethanes, polysiloxanes, cellulosic polymers, and combinations thereof. In some embodiments, an encapsulant comprises a high-molecular weight polystyrene (e.g., polystyrene having a molecular weight of about 100,000 Da to about 1,000,000 Da), a vinyl polymer, or a (styrene-ethylene-butylene) triblock copolymer grafted with maleic anhydride.

In some embodiments, an encapsulant comprises a ceramic. Ceramics deposited from a sol-gel process are particularly useful, and include, but are not limited to, zirconia, titania, alumina, and the like, a doped variant thereof, and combinations thereof. Precursor mixtures suitable for depositing a ceramic from a sol-gel process include, but are not limited to, $Zr(OR)_x(OH)_y$, $Ti(OR)_x(OH)_y$, $Al(OR)_x(OH)_y$, and combinations thereof, wherein R is independently at each occurrence a $C_1$-$C_6$ alkyl, the mixtures can comprise a single precursor or a mixture of precursors having different substituents wherein x in the mixture is 0 to 2, y in the mixture is 0 to 2 and x+y=2 (for Zr- and Ti-containing precursors), and x in the mixture is 0 to 1.5, y in the mixture is 0 to 1.5, and x+y=1.5 (for Al-containing precursors).

The present invention is also directed to a composition, comprising: a substrate including a surface and having on at least a portion of the surface an anti-reflective multi-layer mat of nanowires comprising three or more laminar layers of nanowires and including a bottom layer of nanowires affixed to the surface and a top-most layer of nanowires, wherein the top-most layer of nanowires has a refractive index of about 5% to about 70% of a refractive index of the bottom layer of nanowires, and wherein the refractive index of the three or more laminar layers decreases by about 10% or more per layer from the bottom layer of nanowires to the top-most layer of nanowires.

As used herein, a "mat" refers to a coating comprising multiple layers of nanowires either from a single deposition process in which adjacent nanowires are partially entangled with one another, thereby providing a single layer having a thickness greater than an average diameter of the nanowires or multiple layers of optionally aligned nanowires having a pitch of about ±60° or less.

In some embodiments, a thickness of a laminar layer within a mat of nanowires is about 10 times or less, about 5 times or less, about 4 times or less, about 3 times or less, about 2 times or less, or about 1.5 times or less an average diameter of the nanowires present within the laminar layer of the mat. The thicknesses of the laminar layers present within the mat can be same or independently varied.

In some embodiments, the substrate and the metallic nanowires comprise at least one metal that can be the same or different selected from: a transition metal, a Group 13 metal, a Group 14 metal, a Group 15 metal, an oxide thereof, or a combination thereof. In some embodiments, particularly suitable metals for use as a substrate and/or a nanowire have a limited absorbance in the near-IR and/or IR region of the electromagnetic spectrum (e.g., from about 1 μm to about 30 μm). In some embodiments, a substrate and/or a nanowire is a metal selected from: silicon, germanium, gallium, indium, an arsenide thereof, a selenide thereof, a silicide thereof, and combinations thereof. In some embodiments, the metallic nanowires within the multi-layer mat are bound to the substrate and each other via metal-metal bonds. Bonding can be achieved and/or enhanced, for example, via sintering, calcining, soldering, plasma treating, welding, and combinations thereof.

In some embodiments, the present invention is directed to a composition, comprising: a ZnS substrate including a surface, and a multi-layer coating of ZnS nanowires positioned on at least a portion of the surface, the coating comprising three or more laminar layers of ZnS nanowires, including a bottom layer of ZnS nanowires affixed to the surface, and a top-most layer of ZnS nanowires, wherein a ZnS nanowire within a laminar layer is oriented substantially parallel to another ZnS nanowire within the same laminar layer, ZnS nanowires within adjacent laminar layers are not substantially parallel to one another, the top-most layer of ZnS nanowires has a refractive index of about 5% to about 70% of a refractive index of the bottom layer of ZnS nanowires, and the refractive index of the three or more laminar layers of ZnS nanowires decreases by about 10% or more per laminar layer from the bottom layer of ZnS nanowires to the top-most layer of ZnS nanowires.

In some embodiments, the resistance to crack propagation (e.g., fracture toughness) of a substrate is improved by coating with a multi-layer nanowire coating of the present invention. As opposed to the incorporation of inorganic or metal fibers or nanowires into a substrate, the present invention provides a method of improving the crack resistance of a substrate without modifying its composition.

Not being bound by any particular theory, a nanowire coating of the present invention can improve the fracture resistance by improving load distribution from the substrate to the nanowire coating, as well as, under certain conditions, absorbing shock from high-velocity, particles and liquids. For example, the coatings of the present invention can be utilized as resistance coatings for spaceships, airships, airplanes, jets, munitions (e.g., missiles, bombs, rockets, and the like), as well as automotive parts, and any other application in which anti-reflection, abrasion resistance and crack resistance are desirable.

In some embodiments, the nanowire coatings of the present invention are of particular use for improving the crack resistance and durability of ceramic substrates (e.g., zinc sulfide and doped variants thereof). Crack resistance can be measured using, e.g., a nanoindenter, or any other analytical method known to a person of ordinary skill in the art.

In some embodiments, a portion of the substrate having a nanowire coating of the present invention thereon has a resistance to crack propagation that is about 3 times or more, about 5 times or more, about 7 times or more, about 10 times or more, or about 12 times or more than a portion of the metallic substrate surface that lacks the multi-layer coating of nanowires.

In some embodiments, at least a portion of the substrate having a nanowire coating of the present invention thereon has a durability, wear- and/or abrasion-resistance that is about 3 times or more, about 5 times or more, about 7 times or more, or about 10 times or more than a portion of the metallic substrate surface that lacks the nanowire coating. Durability, wear- and/or abrasion-resistance can be measured, for example, using a water-jet impact test, a sand drop test, a scratch test, or any other durability, wear- and/or abrasion-resistance test known to persons of ordinary skill in the art.

The present invention is also directed to a composition, comprising: a substrate including a surface and an anti-reflective multi-layer coating positioned on at least a portion of the surface, the coating comprising three or more laminar layers, each layer comprising a matrix incorporating a different degree of porosity compared to the other layers in the coating, wherein a bottom layer of the coating is affixed to the surface, wherein the bottom layer has a refractive index of about 60% to about 100% of a refractive index of the substrate, wherein a top-most layer of the coating has a refractive index of about 1% to about 40% of the refractive index of the substrate, and wherein the refractive index of the three or more laminar layers decreases by about 10% or more per layer from the bottom layer of the coating to the top-most layer of the coating.

As used herein, a "matrix" refers to a material capable of forming a film or coating on a substrate. Materials suitable for use as a matrix with the present invention include, but are not limited to, polymers, glasses (e.g., inorganic and organic-doped oxides), crystalline and polycrystalline materials (e.g., quartz), and combinations thereof. In some embodiments, the matrix comprises one or more polymers selected from: a polystyrene, a polysiloxane, a polyacrylate, a polyvinylpyrrolidone, a polycarbonate, a polyalkyleneglycol, a (styrene-ethylene-butylene) tri-block copolymer grafted with maleic anhydride, a substituted variant thereof, or a combination thereof.

In some embodiments, materials suitable for use as a matrix have a maximum refractive index, $n_M$, of about 20, about 15, about 10, about 5, about 2, or about 1.5. In some embodiments, materials suitable for use as a matrix have a minimum refractive index, $n_M$, of about 1.4, about 1.5, about 1.8, or about 2.

In some embodiments, a matrix has a glass transition temperature of about 400° C. to about 1000° C. In some embodiments, a matrix has a minimum glass transition temperature of about 400° C., about 425° C., about 450° C., about 500° C., about 550° C., about 600° C., about 700° C., or about 800° C. In some embodiments, a matrix has a maximum glass transition temperature of about 1000° C., about 950° C., about 900° C., about 850° C., or about 800° C.

As used herein, a "pore-forming moiety" refers to a composition having a mean diameter of about 1 nm to about 100 nm. In some embodiments, a pore-forming moiety has a maximum mean diameter of about 100 nm, about 90 nm, about 80 nm, about 70 nm, about 60 nm, about 50 nm, about 40 nm, about 30 nm, about 25 nm, about 20 nm, about 18 nm, about 15 nm, about 12 nm, about 10 nm, about 8 nm, about 5 nm, or about 2 nm. In some embodiments, a pore-forming moiety has a minimum mean diameter of about 1 nm, about 1.5 nm, about 2 nm, about 2.5 nm, about 3 nm, 4 nm, about 5 nm, about 10 nm, or about 20 nm. Pore-forming moieties for use with the present invention are not limited to primarily spherical materials, but can have any three-dimensional shape such as, but not limited to, ellipsoidal, cylindrical, conical, polyhedral, toroidal, and combinations thereof. For non-spherical pore-forming moieties for use with the present invention, the mean diameter is equivalent to the longest axis of the three-dimensional pore-former.

As used herein, a "loading" refers to the volume of a layer occupied by a pore-forming moiety. As used herein, a "porosity" refers to the volume of a layer occupied by void space introduced by a pore-forming moiety. In some embodiments, a layer of a coating of the present invention has a particulate loading and/or porosity of about 20% to about 95%. In some embodiments, a layer of a coating of the present invention has a maximum particulate loading and/or porosity of about 95%, about 92%, about 90%, about 88%, about 85%, about 82%, about 80%, about 78%, about 75%, about 70%, or about 65%. In some embodiments, a layer of a coating of the present invention has a minimum particulate loading and/or porosity of about 20%, about 25%, about 30%, about 35%, about 40%, about 45%, about 50%, about 55%, about 60%, about 65%, about 70%, or about 75%.

In some embodiments, in addition to being anti-reflective the coatings of the present invention are smudge resistant. As used herein, a "smudge" refers to a residue that can be deposited on a film surface. A residue can include dirt, a particulate (e.g., diesel exhaust, soot, and the like), an oil (e.g., a composition that is immiscible with water), a vapor (e.g., water and steam, as well as environmental vapors such as fog, clouds, smog, and the like), a component of human and/or animal perspiration (e.g., an exudate from the apocrine glands, merocrine glands, sebaceous glands, and the like), oils produced by the hair and/or skin of human and/or animal, other biological compositions (e.g., saliva, blood, skin flakes, hair, excrement, other waste, and the like), and combinations thereof.

Not being bound by any particular theory, the refractive index of smudges is typically different than that of a film material. Thus, in addition to any light-blocking debris present in the smudge, this difference in refractive index between the smudge and the underlying substrate is what makes the smudge visible to a viewer, and can give a smudge an "oily" appearance, especially when deposited onto a smooth surface. However, a roughened surface both diffracts and diffuses light emerging and/or reflecting from the surface. Thus, a smudge deposited onto a roughened surface will induce less of a change in the pattern of light emerging and/or reflected from the roughened surface. Moreover, a roughened surface presents peaks and valleys (that can be in a regular pattern or in a random arrangement upon the surface) that can sequester a smudge material, such that a smudge deposited on a surface does not lead to a conformal deposition of smudge residue upon the surface. For example, the valleys of a roughened surface can remain comparably "smudge free", whereas the peaks of a roughened surface can sequester the smudge material. Alternatively, the peaks of a roughened surface can remain comparably "smudge free", whereas the valleys of a roughened surface can sequester the smudge material.

As used herein, "roughness" refers to a topography of a surface of a coating as measured by the root-mean square (rms) of the surface variations. The rms roughness of a surface is based on finding a median level for a surface of a coating and evaluating the standard deviation from this median level. The rms roughness, R, for a surface can be calculated using equation (3):

$$R = \sqrt{\frac{1}{N^2}\sum_{i=1}^{N}\sum_{j=1}^{N}(H(i,j)-\overline{H})^2} \quad (3)$$

wherein i and j describe a location on the surface, H is the average value of the height across the entire surface of a coating, and N is the number of data points sampled on the surface of the coating.

In some embodiments, a coating of the present invention has a surface roughness of about 100 nm to about 10 μm, about 200 nm to about 10 μm, about 500 nm to about 10 μm, about 1 μm to about 10 μm, about 2 μm to about 10 μm, about 5 μm to about 10 μm, about 1 μm, about 2 μm, about 5 μm, or about 10 μm. In some embodiments, a coating of the present invention has a surface roughness approximately equal the diameter of the nanowires present in the outermost layer of a multi-layer coating. In some embodiments, a coating of the present invention can be roughened by one or more post-deposition treatment processes.

In some embodiments, a portion of a substrate having an anti-reflective coating of the present invention thereon reflects about 50% or less, about 40% or less, about 30% or less, about 20% or less, about 15% or less, about 10% or less, about 5% or less, about 2% or less, about 1% or less, about 0.5% or less, about 0.1% or less, about 0.05% or less, about 0.01% or less, about 0.005% or less, about 0.001% or less, or about 0.0005% or less of at least one wavelength of an electromagnetic radiation having at least one wavelength of about 180 nm to about 30 μm compared to an uncoated portion of the substrate. In some embodiments, a portion of a substrate having the anti-reflective multi-layer coating of nanowires thereon reflects about 50% or less of at least one wavelength of an electromagnetic radiation having at least one wavelength of about 180 nm to about 30 μm, about 180 nm to about 10 μm, about 180 nm to about 1 μm, about 180 nm to about 500 nm, about 180 nm to about 400 nm, about 180 nm to about 300 nm, about 180 nm to about 250 nm, about 250 nm to about 30 μm, about 250 nm to about 10 μm, about 250 nm to about 1 μm, about 250 nm to about 500 nm, about 250 nm to about 400 nm, about 300 nm to about 30 μm, about 300 nm to about 10 μm, about 300 nm to about 1 μm, about 400 nm to about 30 μm, about 400 nm to about 10 μm, about 400 nm to about 5 μm, about 400 nm to about 1 μm, about 1 μm to about 30 μm, about 5 μm to about 30 μm, or about 10 μm to about 30 μm compared to an uncoated portion of the substrate.

In some embodiments, a substrate coated with a nanowire coating of the present invention has a reduced retro-reflectance compared with an uncoated substrate. As used herein, "retro-reflectance" refers to light that is reflected from a substrate back to its source along a vector that is parallel to, but in the opposite direction of the incoming light. Generally, retro-reflected light is not substantially scattered by a substrate. Many substrates that are transparent in the near-infrared and/ or infrared regions of the spectrum are retro-reflective in the visible region of the electromagnetic spectrum. The nanowire coatings of the present invention are suitable for reducing, or substantially eliminating retro-reflection for many substrates, including substrates that are substantially transparent in the near-IR and/or IR regions of the electromagnetic spectrum.

Thus, in some embodiments, a substrate having the multilayer mat or coating of nanowires thereon has a retro-reflectance at one or more wavelengths from about 400 nm to about 12 µm that is at least 50% less, at least 60% less, at least 70% less, at least 80% less, at least 90% less, or at least 95% less than a retro-reflectance from an uncoated substrate that lacks the multilayer mat of nanowires at the same one or more wavelengths.

In particular, in some embodiments, a substrate having a multilayer mat or coating of nanowires thereon has a retro-reflectance at 633 nm that is at least 50% less, at least 60% less, at least 70% less, at least 80% less, at least 90% less, or at least 95% less than a retro-reflectance at 633 nm from an uncoated substrate that lacks the multilayer coating of nanowires.

The present invention is directed to a zinc sulfide, germanium, sapphire, or silicon substrate having a GRIN coating of the present invention thereon, wherein the transmittance of the substrate is reduced by about 10% or less at a wavelength from 1 µm to 12 µm, and wherein the retro-reflectance of the substrate is decreased by about 50% or more, 60% or more, 70% or more, 80% or more, 90% or more, or 95% or more at a wavelength from about 400 nm to about 800 nm compared with the retro-reflectance of an uncoated ZnS substrate at the same wavelength from about 400 nm to about 800 nm.

The anti-reflective coatings of the present invention are robust. As used herein, "robust" refers to physical, dimensional and/or chemical stability. For example, the coatings of the present invention exhibit wear resistance, dimensional stability, and chemical stability that makes them suitable for use in environments under which the coatings are subjected to physical contact, mechanical stress, chemical reactivity and/or exposure to intense electromagnetic radiation.

In some embodiments, a coating of the present invention has a Young's Modulus of about 1 GPa to about 1,000 GPa, about 10 GPa to about 1,000 GPa, about 50 GPa to about 1,000 GPa, about 100 GPa to about 1,000 GPa, or about 500 GPa to about 1,000 GPa. In some embodiments, the Young's Modulus of a coating of the present invention is substantially the same as the Young's Modulus the nanowires present in the layers of the coating, or the matrix present in the layers of the coating.

In some embodiments, a thin layer can be deposited over a coating and/or an outer surface of a coating can be derivatized to provide a barrier to detritus, chemical contamination, increase the mechanical strength of a coating, provide enhanced smudge resistance, and the like.

Processes to Prepare the Anti-reflective Coatings

The processes of the present invention are suitable to deposit an anti-reflective coating in any geometry that is desired. In some embodiments, a conformal anti-reflective coating is deposited. As used herein, "conformal" refers to a layer or coating that is of substantially uniform thickness regardless of the geometry of underlying features. Thus, conformal coating of substrates of various size and shape can result in anti-reflective coatings having substantially similar sizes and shapes, and the size of the resulting articles can be controlled by selecting the dimensions of a substrate (e.g., the spacing and dimensions of a grating, or shape of a touch-screen, and the like).

The present invention is also directed to a process for preparing an anti-reflective multi-layer nanowire coating on at least a portion of a surface of a substrate, the process comprising:

disposing on the surface a first laminar layer of nanowires, wherein the first laminar layer has a refractive index about 60% to about 100% of a refractive index of the substrate;

affixing the first laminar layer of nanowires to the surface;

disposing a second laminar layer of nanowires onto the first laminar layer of nanowires;

affixing the second laminar layer of nanowires to the first laminar layer of nanowires;

disposing at least a third laminar layer of nanowires onto the second laminar layer of nanowires; and affixing the third laminar layer of nanowires to the second laminar layer of nanowires; wherein the second laminar layer of nanowires has a refractive index less than the refractive index of the first laminar layer of nanowires, and wherein the third laminar layer of nanowires has a refractive index less than the refractive index of the second laminar layer of nanowires.

As used herein, "disposing" refers to any process whereby nanowires are formed on a substrate. Disposing processes can be additive (i.e., material is added to a surface) or subtractive (i.e., material is removed from a surface), or a combination thereof. Disposing can be performed serially or in parallel, either of which processes can include self assembly of a material onto a substrate. In some embodiments, disposing refers to disposing an arrangement of nanowires on a substrate. Disposing processes can include, but are not limited to, depositing (e.g., via dip-coating, electrospinning, printing, stamping, and the like), growing, and combinations thereof.

In some embodiments, disposing a first layer of nanowires on a substrate comprises growing a first layer of nanowires on the substrate. Any process suitable for growing nanowires known to a person of ordinary skill in the art can be used. For example, in some embodiments a first layer of nanowires is catalytically grown on a substrate.

In some embodiments, a process of the present invention comprises activating a surface of a substrate. As used herein, "activating" refers to treating a substrate prior to, or concomitant with, disposing to enhance the quality of a deposition process (e.g., provide enhanced yield, a faster deposition rate, a more controlled deposition process). Activating can include, without limitation, cleaning, reducing, oxidizing, functionalizing, derivatizing, polishing, roughening, plasma treating, thermally treating, and combinations thereof. In some embodiments, activating comprises removing a native oxide layer from a surface of a conductive and/or semiconductive substrate.

In some embodiments, the process further comprises:

aligning the nanowires within the first laminar layer to orient the nanowires substantially parallel to one another;

aligning the nanowires within the second laminar layer to orient the nanowires within the second laminar layer substantially parallel to one another, wherein the nanowires within the second laminar layer are not parallel to the nanowires within the first laminar layer; and aligning the nanowires within the third laminar layer to orient the nanowires within the third laminar layer substantially parallel to one another, wherein the nanowires within the third laminar layer are not parallel to the nanowires within the second laminar layer.

As used herein, "aligning" refers to controlling the orientation of a long axis of a nanowire or group of nanowires. In some embodiments, aligning includes orienting a group of nanowires such that the long axes of the nanowires are substantially parallel with one another. In some embodiments, aligning includes orienting a first group of nanowires such that the long axes of the nanowires present in the first group are angularly oriented relative to the long axes of a second group of nanowires. Aligning can refer to controlling the orientation of nanowires in solution, on a surface of a stamp, on a substrate, and combinations thereof. In some embodiments, "aligning" refers to controlling the x,y,z position of nanowires deposited on a substrate.

In some embodiments, aligning comprises at least one of: applying a mechanical force to the nanowires (e.g., alignment on the surface of an aqueous solution via mechanical force), applying a magnetic field to the nanowires, applying an electric field to the nanowires (e.g., using an AC field to induce electric dipole moments in the nanowires, which induces alignment relative to electrodes), applying a fluid gradient to the nanowires, and combinations thereof.

In some embodiments, a process of the present invention comprises disposing a fourth laminar layer of nanowires onto a third laminar layer of nanowires, wherein the fourth laminar layer of nanowires has a refractive index less than the refractive index of the third laminar layer of nanowires. Thus, the present invention includes processes suitable for forming multi-layer coatings comprising more than three layers, for example, four, five, six, seven, eight, nine, ten, eleven, twelve, fifteen, twenty, thirty, forty, fifty, or one hundred or more layers of nanowires.

In some embodiments, the process further comprises aligning nanowires within a fourth laminar layer to orient the nanowires within the fourth laminar layer substantially parallel to one another, wherein the nanowires within the fourth laminar layer are not parallel to the nanowires within the third laminar layer.

In some embodiments, a bottom layer of nanowires is affixed to the substrate. In some embodiments, nanowires in adjacent layer of a multi-layer coating are affixed to each other. Affixing can be performed during a providing process (e.g., a forming, or a depositing of the nanowires on a substrate) or via another process (e.g., a post-treating process). Post-treating processes suitable for affixing the nanowires to a substrate include, but are not limited to, calcining, covalently bonding, hydrogen-bonding, calcining, soldering, cross-linking, melting, encapsulating in a matrix, and combinations thereof.

In some embodiments, ordered nanowire layers are deposited by a fluidic process in which the nanowires are dispersed in a solution, aligned, and then the aligned nanowires are applied to a substrate. Nanowires can be rendered hydrophobic via chemical functionalization, and added to an aqueous solution and dispersed. Typically, the nanowires float on the surface of the aqueous solution. Clumping of the nanowires, if present, can be diminished via sonication, mechanical mixing, heating, and the like.

In some embodiments, the aqueous solution comprises distilled water. The aqueous solution can also contain an additive such as, but not limited to, a salt (e.g., an alkali salt, an alkali earth metal salt, a metal salt, and the like), an acid (e.g., a mineral acid, an organic acid, and the like), a base (e.g., a mineral base, an organic base, and the like), a surfactant, a polymer, and combinations thereof.

In some embodiments, the nanowires are dispersed in a solvent and then added to the aqueous solution to provide a dispersion. The solvent can be removed from the aqueous solution via evaporation to provide a film of nanowires on the surface of the aqueous solution.

The dispersed nanowires are then aligned by applying an external force to the nanowires. In some embodiments, the nanowires are aligned by applying a mechanical force to the enclosure containing the aqueous dispersion of nanowires such that the surface area of the aqueous solution decreases. For example, nanowires are dispersed in trough having adjustable sidewalls, which are moved towards one another to decrease the surface area of the aqueous solution (while ends of the trough remain mostly stationary). Movement of the sidewalls of the trough applies a mechanical force to the nanowires on the surface of the aqueous solution and forces the nanowires to align on or near the surface of the aqueous solution via mechanical contact with the sidewalls and/or adjacent nanowires. The aligning process can be monitored using, e.g., a surface tensiometer, which can be maintained in a feedback loop with a stepper used to control the movement of one or both of the sidewalls of the enclosure (i.e., the trough).

In addition to a mechanical force, other forces suitable for aligning the nanowires on or near the surface of the aqueous solution include, but are not limited to, a magnetic force (e.g., applied to nanowires comprising a material having a dipole moment or an induced dipole moment), a fluid force (e.g., through the aqueous solution), and the like, and combinations thereof.

In those embodiments in which alignment is induced via mechanical force applied to one or more sides of an enclosure containing an aqueous dispersion of nanowires, the enclosure a material suitable for inducing a positive meniscus between the surface of the aqueous solution the sides of the enclosure. Suitable materials include hydrophobic materials. In some embodiments, at least the surface of the enclosure that contacts the surface of the aqueous solution comprises an optionally fluorinated perfluorpolyoalkylene (e.g., TEFLON®, E.I. Du Pont de Nemours and Co., Wilmington, Del.).

Once a nanowire film on the surface of an aqueous solution reaches a desired density, the nanowires are transferred to a substrate through a dip-coating process. As used herein, "dip-coating" refers to a process in which a substrate is passed through an aqueous solution comprising nanowires dispersed thereon and/or therein, and via attractive forces the aligned nanowires deposit onto the substrate in a self-assembled manner. The nanowire density on the substrate can be controlled by the density of nanowires present in the aqueous dispersion. Substrate densities approaching monolayer coverage can be achieved. A deposited layer of nanowires can be annealed, sintered, encapsulated, and the like, followed by deposition of another nanowire layer thereon. The density of each layer of nanowires deposited by the dip-coating process can be controlled by the density of nanowires present on the surface of the aqueous solution.

Thus, this process can generate a nanowire coating having a gradient refractive index by compressing a nanowire film to generate a nearly close-packed layer and transferring the close-packed layer to the substrate, followed by decreasing the nanowire density on the surface of the aqueous solution (e.g., by decreasing the number of nanowires and/or increasing the surface area of the aqueous solution by moving a sidewall) and applying a second layer of nanowires (having a lower density that the first layer of nanowires) to the substrate. The orientation the nanowires relative to the substrate and to previously deposited aligned layers of nanowires can be controlled by the orientation of the substrate during the dip-coating, and rotation of the substrate.

The dip-coating process can be repeated until a nanowire layer having a refractive index of about 1.1 or less has been deposited. In addition, because the density of nanowires present on the surface of the aqueous solution can be controlled, multi-layer nanowire coatings having smooth layerto-layer transitions in refractive index can be readily prepared. The dip-coating process also enables both sides of a substrate to be coated simultaneously with nanowire coatings.

Thus, in some embodiments, the present invention is directed to a process comprising:

dispersing a plurality of nanowires in a non-aqueous solvent;

applying the non-aqueous dispersion of nanowires to an aqueous solution;

aligning the nanowires in the aqueous solution; and disposing the aligned nanowires from the aqueous solution onto a substrate.

In some embodiments, the process further comprises removing the non-aqueous solvent from the aqueous solution. Embodiments in which a non-aqueous, water-miscible solvent is not removed from the aqueous solution prior to the aligning are also within the scope of the present invention.

In some embodiments, the aligning is performed with the nanowires localized on the surface of the aqueous solution.

In some embodiments, the disposing and/or aligning of nanowires is performed via an electrospinning process. Electrospinning processes and nanowires prepared therefrom that are suitable for use with the present invention are provided in US Pub. No. 2006/0226580, U.S. Appl. No. 61/227,336, and U.S. Appl. No. 61/240,891, which are incorporated herein by reference in their entireties.

Disposing and/or aligning of nanowires on curved substrate can be readily achieved using an electrospinning process in which a curved substrate is placed on a stage having comprising a conductive material, wherein a plurality of conductive lines are used to support the curved substrate and align the nanowires deposited thereon. FIG. 11 provides a schematic cross-sectional representation, 1100, of a electrospinning apparatus suitable for disposing aligned nanowires on a curved substrate. Referring to FIG. 11, a spinneret, 1101, comprising a fluid control (e.g. a syringe pump) interfaced with a needle tip, is positioned a distance from a stage, 1102, comprising a plurality of projecting lines, 1103. Both the stage and protruding lines comprise a conductive material, and are electrically grounded, 1104, with the needle tip. The protruding lines, 1103, have a vertical height, 1105, suitable for supporting a curved substrate, 1106. Flowing of a nanowire precursor solution, 1107, results in disposition of nanowires transverse, 1108, to the protruding lines, which align the nanowires on the curved substrate, 1106. The stage, 1102, can be rotated, 1109, as well as translated in the x-, y- and/or z-directions, and/or tilted along axes $\phi$ and/or $\theta$. Rotation and/or translation between disposing layers of nanowires provides overlapping multi-layer nanowires coatings providing a refractive index gradient.

In some embodiments, the disposing and/or aligning of nanowires is performed using a stamp. As used herein, a "stamp" refers to a three-dimensional object having a surface suitable for adhering a nanowire thereto and transfer the nanowire to a substrate. In some embodiments, a stamp comprises at least one surface having a protrusion thereon that defines a pattern. Stamps for use with the present invention are not particularly limited by geometry, and can be flat, curved, smooth, rough, wavy, and combinations thereof. In some embodiments, a stamp can have a three dimensional shape suitable for conformally contacting at least a portion of the stamp with a substrate.

In some embodiments, a stamp can comprise multiple surfaces that can be flat or patterned, the latter embodiments comprising the same or different patterns on multiple surfaces of a stamp. In some embodiments, a stamp comprises a cylindrical surface optionally including one or more protrusions on a curved surface of the cylinder that define a pattern.

In some embodiments, a stamp comprises a flexible material. As used herein, "flexible" refers to a material capable of being flexed, or undergoing elastic or plastic deformation, bending, compression, twisting, and the like in response to applied external force, stress, strain and/or torsion. In some embodiments, a flexible material is capable of being rolled upon itself. Preferred flexible materials for use with a stamp of the present invention include elastomeric polymers, i.e., "elastomers." Elastomers suitable for use as a materials in a stamp include, but are not limited to, a polyurethane, a resilin, an elastin, a polyimide, a phenol formaldehyde polymer, a polydialkylsiloxane (e.g., polydimethylsiloxane, "PDMS"), a natural rubber, a polyisoprene, a butyl rubber, a halogenated butyl rubber, a polybutadiene, a styrene butadiene, a nitrile rubber, a hydrated nitrile rubber, a chloroprene rubber (e.g., polychloroprene, available as NEOPRENE™ and BAYPREN®, Farbenfabriken Bayer AG Corp., Leverkusen-Bayerwerk, Germany), an ethylene propylene rubber, an epichlorohydrin rubber, a polyacrylic rubber, a silicone rubber, a fluorosilicone rubber, a fluoroelastomer (for example, those described herein, supra), a perfluoroelastomer, a tetrafluoroethylene/propylene rubber, a chlorosulfonated polyethylene, an ethylene vinyl acetate, cross-linked variants thereof, halogenated variants thereof, and combinations thereof.

Figure 3A:
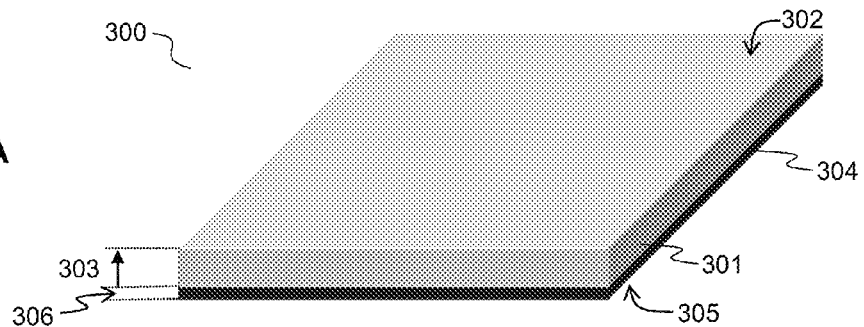
FIGS. 3A-3C provide three-dimensional schematic representations of stamp structures suitable for use with the present invention.
Figure 3B:
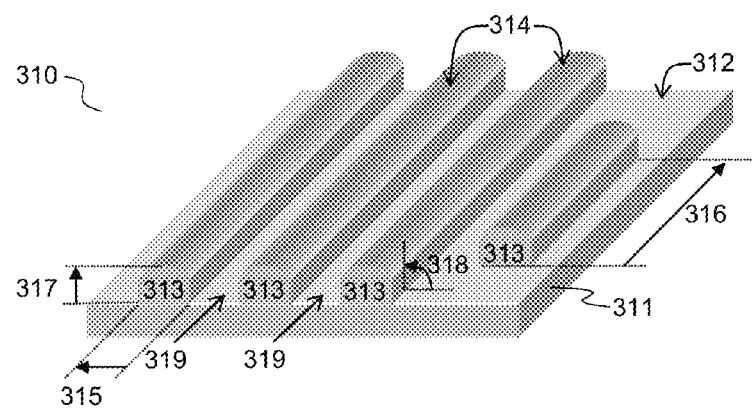
Figure 3C:
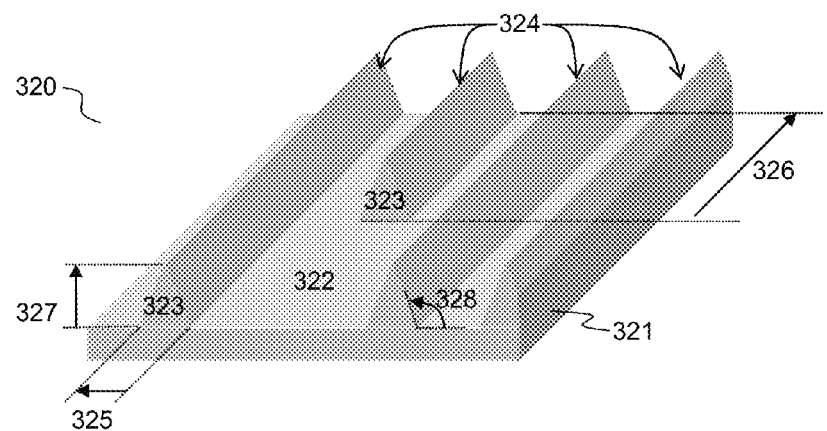

FIGS. 3A-3C provide three-dimensional schematic representations, 300, 310 and 320, respectively, of stamps suitable for use with the present invention. Referring to FIG. 3A, a stamp, 301, including a surface, 302, having a thickness, 303, is provided. In some embodiments, a stamp comprises a backing layer, 304, including a back surface, 305, and a thickness, 306. A backing layer can increase the dimensional stability of a stamp. In some embodiments, a backing layer is rigid, semi-rigid, webbed, multi-laminate, or a combination thereof. In some embodiments, a backing layer has the same or a similar composition as a material present in the stamp, but with a greater density.

Referring to FIG. 3B, a stamp, 311, including a surface, 312, having at least one protrusion thereon, 313, is provided. The at least one protrusion, 313, includes a surface, 314. The surface of a protrusion can be flat, curved (e.g., concave and/or convex), pointed, and combinations thereof. The at least one protrusion has lateral dimensions 315 (width) and 316 (length), and vertical dimension 317 (height), each of which can be controlled independently. The lateral dimensions of protrusions can be the same or different across the surface of a stamp. The at least one protrusion also includes a sidewall angle, 318, which refers to the angle that the surface of the protrusion makes with the surface of the stamp, 312. In some embodiments, a protrusion has a sidewall angle of about ±50°, about ±40°, about ±30°, about ±20°, about ±15°, about ±10°, or about ±5°. In some embodiments, a pattern of protrusions on a stamp surface creates an array of channels in a surface of a stamp, 319, the length and width of which is defined by the protrusions on a stamp. In some embodiments, the length and width of a channel on a stamp surface is suitable for containing a nanowire.

In some embodiments, a stamp surface, 312, and/or a protrusion surface, 314, can be functionalized and/or derivatized to provide an adhesive or a repulsive interaction between a surface and a nanowire. For example, in some embodiments, a surface of a stamp can be functionalized to provide an adhesive interaction between the surface and a nanowire, and a surface of a protrusion can be functionalized (e.g., with a fluorinated moiety) to provide a repulsive interaction between the surface and a nanowire.

In some embodiments, a substrate, a stamp surface, and/or a protrusion on a stamp can be functionalized, derivatized, textured, or otherwise pre-treated prior to disposing a nanowire or a polymer composition thereon. As used herein, "pre-treating" refers to chemically or physically modifying a surface. Pre-treating can include, but is not limited to, cleaning, oxidizing, reducing, derivatizing, functionalizing, exposing a surface to a reactive gas, plasma, thermal energy, ultraviolet radiation, and combinations thereof. Not being bound by any particular theory, pre-treating a surface can increase or decrease an adhesive interaction between a surface and a layer comprising a nanowire or a polymer composition.

Referring to FIG. 3C, a stamp, 321, including a surface, 322, having at least one protrusion thereon, 323, is provided. The at least one protrusion, 323, includes a surface, 324, that is pointed. The at least one protrusion has lateral dimensions 325 (width) and 326 (length), and vertical dimension 327 (height), each of which is controlled independently. The at least one protrusion also includes a sidewall angle, 328.

In some embodiments, a layer of nanowires is deposited on a substrate and the nanowires are aligned by contacting a stamp having at least one protrusion thereon with the nanowires. For example, a stamp having a surface including at least one protrusion thereon forming a pattern of channels on the stamp surface can be contacted with a substrate having nanowires thereon to align the long axes of the nanowires in an orientation substantially parallel to the channels of the stamp.

Figure 4A:
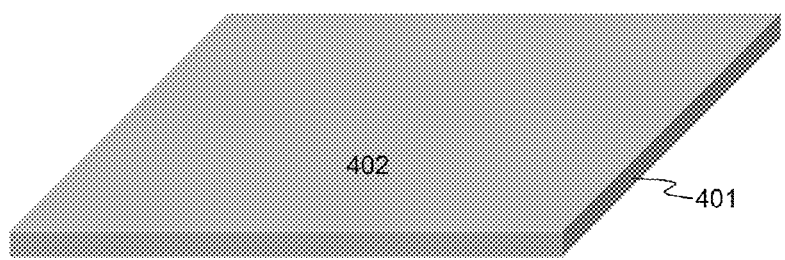
FIGS. 4A-4F provide a three-dimensional schematic cross-sectional representation of a process for providing an anti-reflective surface of the present invention.

FIGS. 4A-4F provide three-dimensional schematic cross-sectional representations of a process for providing an anti-reflective surface of the present invention. Referring to FIG. 4A, a stamp, 401, having a surface, 402, is provided.

Figure 4B:
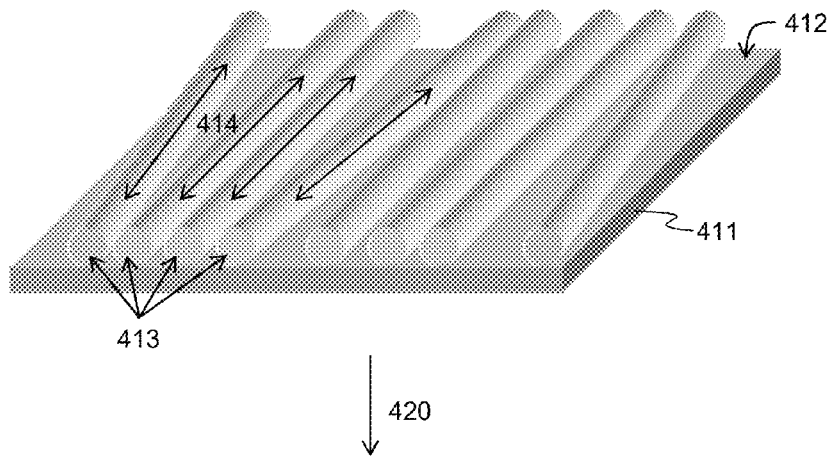

Nanowires are deposited onto the stamp surface, 410. Referring to FIG. 4B, a stamp, 411, including a surface, 412, having nanowires deposited thereon, 413, is provided. The nanowires are aligned, 414, substantially parallel to one another. The schematic representations of layers of nanowires having a thickness corresponding to a single nanowire made herein are for purposes of description and illustration only, and should be interpreted as non-limiting.

In some embodiments, a layer of nanowires can be co-deposited onto a stamp with a sacrificial material that can facilitate deposition and/or alignment of the nanowires. Suitable sacrificial materials include, but are not limited to, molecular species, polymers, gels, sol-gels, dendrimers, oligomers, solvents, and the like, and combinations thereof. In some embodiments, a sacrificial material comprises an aliphatic or partially aliphatic organic moiety that can be oxidized and/or volatized from a substrate subsequent to the disposing.

In some embodiments, an electrospun layer of nanowires, is deposited onto a stamp surface. The refractive index, density and porosity of a nanowire layer can be controlled by the charge, mass/charge ratio, and electric field strength used to prepare an electrospun layer of nanowires (or nanofibers).

Figure 4C:
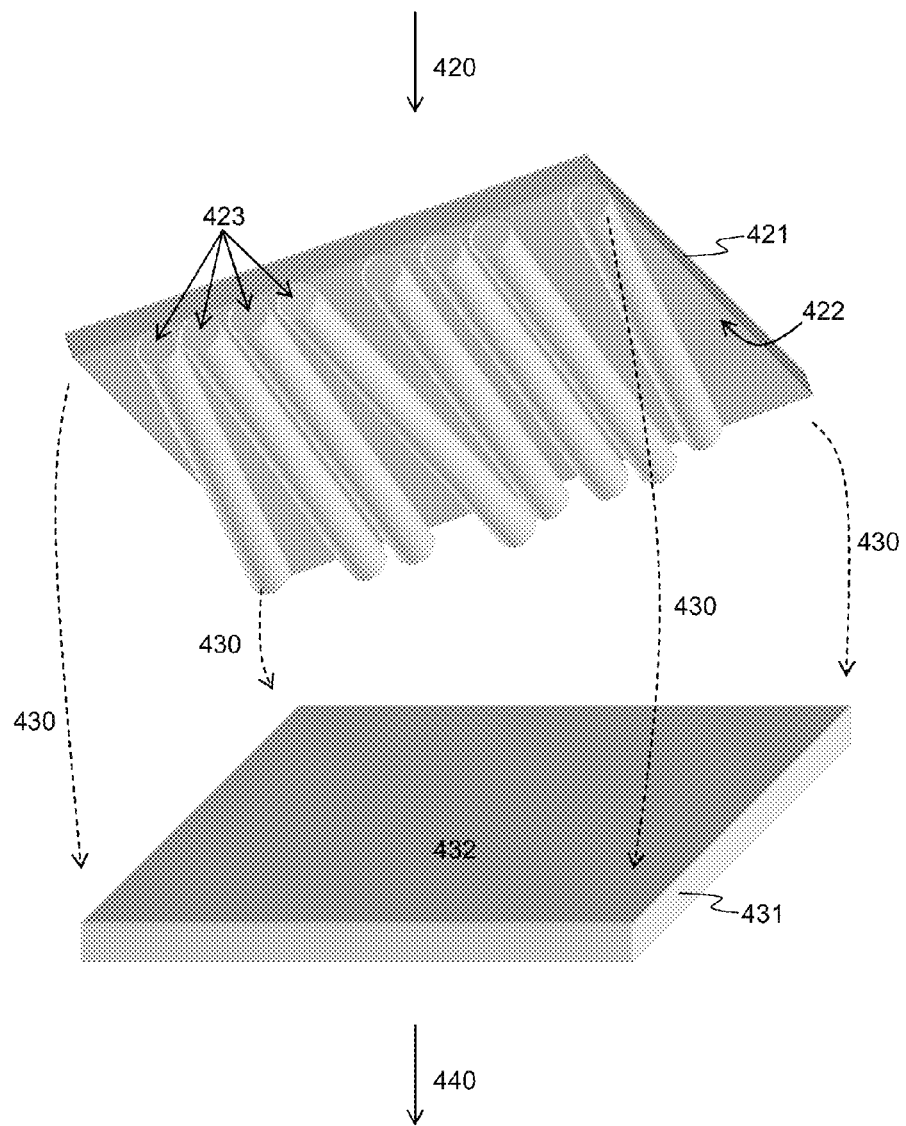

The nanowires are then contacted with a substrate, 420, to deposit the nanowires on a substrate. Referring to FIG. 4C, a stamp, 421, including a surface, 422, having nanowires deposited thereon, 423, is contacted with a substrate, 431, having a surface, 432, to deposit the nanowires on the substrate. The stamp, 421, and the substrate, 431, are aligned, 430, during the disposing. The stamp is then removed from the substrate, 440.

Figure 4D:
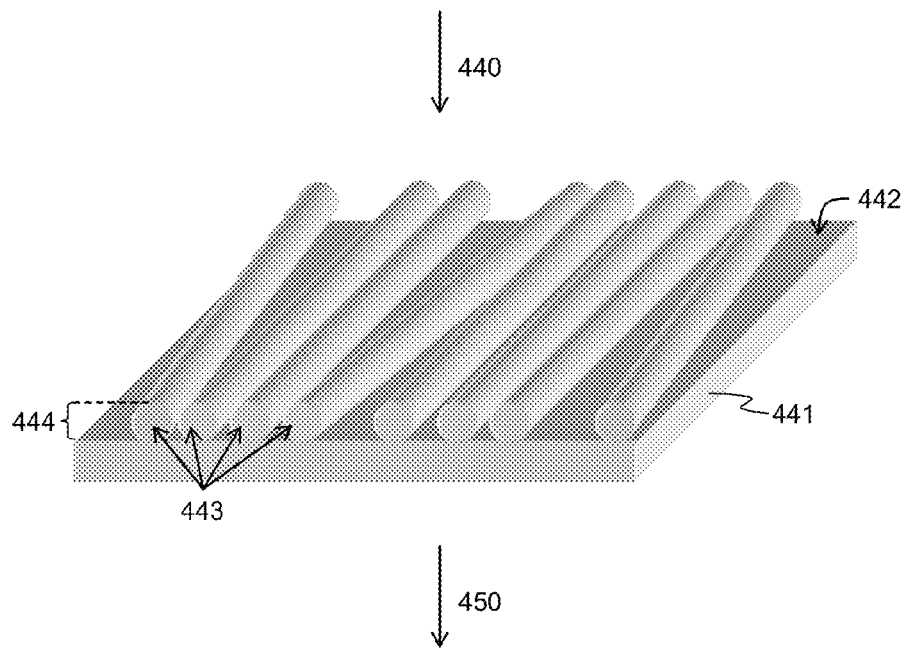

Referring to FIG. 4D, a substrate, 441, including a surface, 442, having a layer, 444, of nanowires, 443, thereon is provided. A second layer of nanowires is then deposited, 450, onto the first layer of nanowires.

Figure 4E:
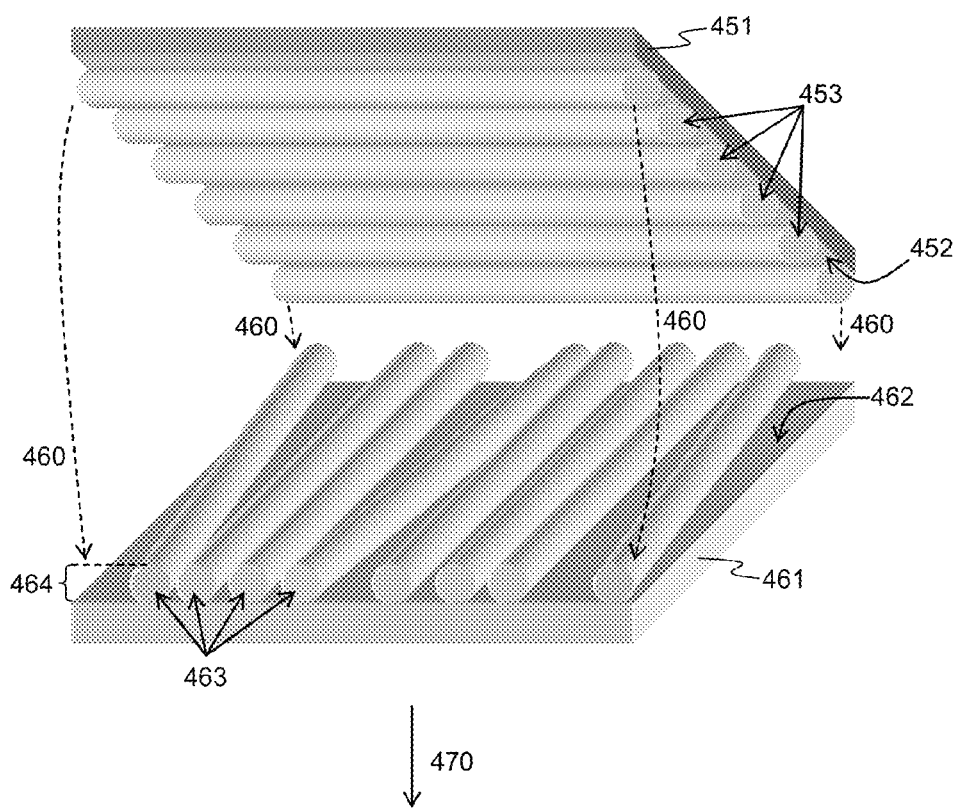

Referring to FIG. 4E, a stamp, 451, including a surface, 452, having nanowires deposited thereon, 453, is provided, and contacted with a substrate, 461, including a surface, 462, having a first layer, 464, of nanowires, 463, thereon, to deposit a second layer of nanowires on the substrate. The stamp, 451, and the substrate, 461, are aligned, 460, during the disposing. The stamp is then removed from the substrate, 470.

Figure 4F:
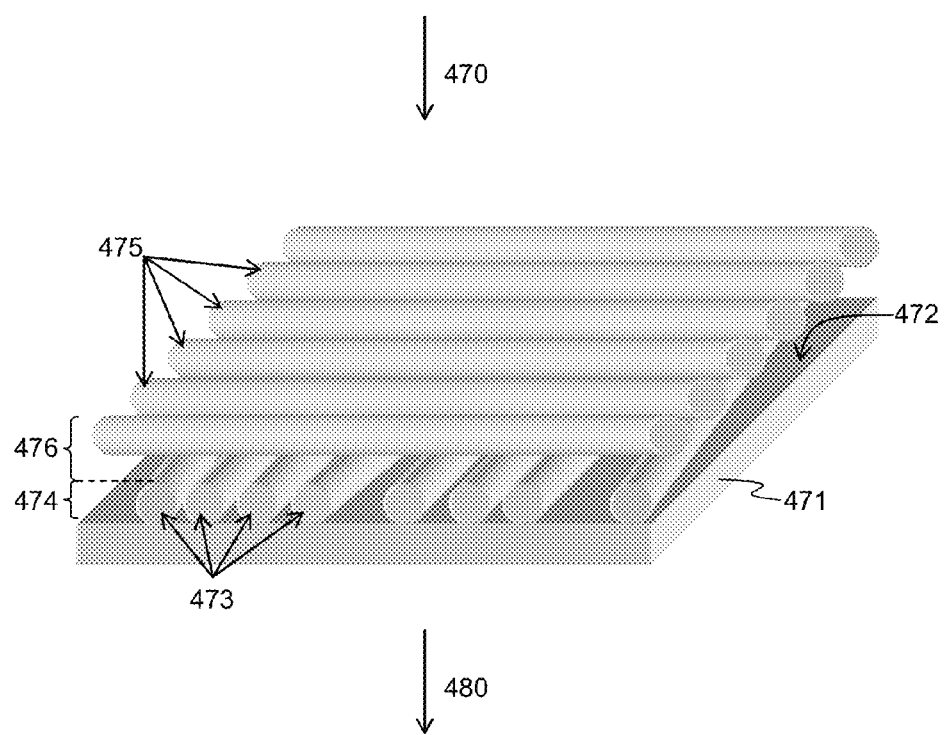

Referring to FIG. 4F, a substrate, 471, including a surface, 472, having a first layer, 474, of nanowires, 473, and a second layer, 476, of nanowires, 475, thereon is provided. The second layer of nanowires, 476, has a refractive index that is less than a refractive index of the first layer of nanowires, 474. The nanowires comprising the first and second layers, 473 and 475, respectively, can have a composition that is the same or different. A third layer of nanowires is deposited on the second layer of nanowires, 480, by repeating the process described herein, depicted schematically in, e.g., FIGS. 4C and 4E.

The present invention is also directed to a process for preparing an anti-reflective multi-layer coating on at least a portion of a surface of a substrate, the process comprising:

printing on the surface a first laminar layer comprising a first polymer and an optional second polymer;

disposing on the first laminar layer a second laminar layer comprising the first polymer and the second polymer, wherein the second laminar layer is substantially free from solvent, and the second polymer is present in the second layer in a higher concentration than the first layer;

printing on the second laminar layer a third laminar layer comprising the first polymer and the second polymer, wherein the third laminar layer is substantially free from solvent, and the second polymer is present in the third layer in a higher concentration than the second layer;

optionally exposing the first laminar layer to conditions suitable for removing the second polymer from the first laminar layer while retaining the first polymer within the first laminar layer;

exposing the second laminar layer to conditions suitable for removing the second polymer from the second laminar layer while retaining the first polymer within the second laminar layer; and exposing the third laminar layer to conditions suitable for removing the second polymer from the third laminar layer while retaining the first polymer within the third laminar layer to provide an anti-reflective multi-layer coating having a refractive index gradient.

As used herein, "printing" refers to spatially controlled deposition. While the deposition of polymer coatings is well known, the formation of multi-layer polymer coatings having controlled porosity has been difficult to achieve because solvents are typically necessary to provide a uniform polymer deposition. The present invention In some embodiments, two or more polymers are dissolved in a solvent and applied to a substrate (e.g., disposition of a first layer on a substrate) or two or more polymers are dissolved in a solvent and applied to a stamp, and the coated stamp is used to print one or more layers on a substrate. As solvent is removed from a deposited film comprising two or more polymers, the polymers are selected such that phase separation occurs. The length scale of phase separation can be controlled by the solvent (e.g., size, polarity, functionality, rate of solvent removal, etc.) and can vary from the millimeter length scale to the sub-nanometer length scale. A solvent can be chosen that can dissolve only one of the two polymers. One polymer is selected as the pore-forming moiety and another polymer is a matrix forming moiety. The refractive index of a resulting layer of a coating can be predetermined by the refractive index of the matrix-forming polymer and the percentage of the pore-forming polymer present in the composition.

Polymers suitable for use with the present invention include matrix-forming polymers described herein. In some embodiments, a polymer composition comprises polystyrene and polyvinylpyrrolidone dissolved in a cyclohexane and/or ethanol. In some embodiments, a polymer composition further comprises a sol-gel precursor such as an alkoxysilane, a dialkoxysilane, a trialkoxysilane, a tetraalkoxysilane, or a substituted variant thereof.

In some embodiments, printing comprises coating a stamp with a polymer composition, and positioning the coated stamp surface proximate to a substrate to transfer the polymer composition from the stamp to the substrate.

In some embodiments, printing comprises:

coating an elastomeric stamp with a composition comprising a pre-determined amount of the first polymer, the optional second polymer, and a solvent to provide a coated stamp;

phase separating the polymers on the coated stamp;

removing the solvent from the composition; and contacting the coated stamp with the surface under conditions sufficient to transfer the composition from the coated stamp to the surface.

A polymer composition can be applied to a stamp surface by a coating method known in the art such as, but not limited to, screen printing, ink jet printing, syringe deposition, spraying, spin coating, brushing, atomizing, dipping, aerosol depositing, capillary wicking, and combinations thereof. In some embodiments, applying a resist composition to a stamp surface comprises spin coating (i.e., rotating the stamp surface at about 100 revolutions per minute (rpm) to about 5,000 rpm while pouring or spraying the resist composition onto the stamp surface).

In some embodiments, a polymer composition is dissolved in a solvent to facilitate uniform coating of a stamp surface. Solvents suitable for dissolving a polymer composition for application to a stamp include, but are not limited to, $C_6$-$C_{15}$ straight chain, branched and cyclic hydrocarbons (e.g., hexane, cyclohexane and the like), $C_6$-$C_{16}$ aryl and aralkyl hydrocarbons (e.g., benzene, toluene, xylene, and the like), $C_1$-$C_{15}$ alkyl, aryl, and aralkyl alcohols (e.g., methanol, ethanol, propanol, butanol, and the like), $C_6$-$C_{15}$ alkyl, aryl, and aralkyl amines, $C_6$-$C_{15}$ alkyl, aryl, and aralkyl amides (e.g., dimethylformamide, N-methylpyrrolidone, and the like), $C_6$-$C_{15}$ alkyl and aralkyl ketones (e.g., acetone, methylethylketone, benzophenone, and the like), $C_6$-$C_{15}$ esters (e.g., ethyl acetate and the like), $C_6$-$C_{15}$ alkyl and aralkyl ethers (e.g., ethyleneglycol dimethylether and the like), and combinations thereof.

In some embodiments, a solvent is chosen from: benzene, toluene, a xylene, cumene, mesitylene, propylene glycol mono-methyl ether, tetrahydrofuran, dodecane, tetralin, pyridine, tetrahydrofuran, acetone, ethylacetate, methylethylketone, methylene chloride, 1,2-dichloroethane, chloroform, chlorobenzene, dimethylformamide, and combinations thereof.

Exposing can comprise a process such as, but not limited to, heating a laminar layer, irradiating a laminar layer with electromagnetic radiation, irradiating a laminar layer with an electron beam, exposing to a selective solvent, pyrrolizing a laminar layer, exposing a laminar layer to a plasma, and combinations thereof. The conditions of the exposing are selected such that a matrix-forming polymer is not removed from a coating layer, while a pore-forming polymer is volatized to create a porous matrix. The refractive index of the layer is therefore dependent upon the degree of porosity in the resulting matrix, as well as the refractive index of the matrix-forming polymer. In some embodiments, exposing comprises exposing to a selective solvent (i.e., a solvent that is selective for dissolving a pore-forming moiety and/or polymer).

In some embodiments, the optionally exposing is performed simultaneous with the exposing the second laminar layer and the exposing the third laminar layer. Thus, the present invention includes introducing porosity into the layers of a multi-layer coating in serial or simultaneously.

In some embodiments, the optionally exposing is performed prior to the printing on the first laminar layer a second laminar layer; and the exposing the second laminar layer is performed prior to printing on the second laminar layer a third laminar layer.

In some embodiments, the present invention further comprises cross-linking at least one of the polymers present in a polymer composition. Cross-linking can include intramolecular cross-linking, intermolecular cross-linking, the addition of a molecular cross-linker into one or more of the layers of a multi-layer coating, and combinations thereof.

In some embodiments, a process further comprises post-treating a multi-layer coating to increase the mechanical strength of the coating, increase an adhesive interaction between the coating and a substrate, increase an interlayer adhesive interaction, enhance the chemical stability of a coating, enhance the density of a coating layer, and combinations thereof. Post-treating processes include, without limitation, annealing, calcining, sintering, exposing to ultraviolet light, exposing to plasma, and combinations thereof. Post-treating can be performed in a serial manner (e.g., after a deposition and exposing process), a semi-serial manner (e.g., after a deposition of every 2-3 layers of a multi-layer coating), or as a single post-treatment process after deposition of a multi-layer coating.

Unlike spin-coating, spray coating, and chemical vapor deposition, the solvent-less disposing (e.g., stamping) of the present invention can deposit multi-layer coatings without modification or damage to underlying layers of a coating during the later deposition processes. For example, multi-layer coatings cannot be easily deposited by spin-coating without the later-deposited coating layers dissolving underlying layers of the coating.

The tensile strength and/or chemical functionality of the coatings of the present invention can be modified by, for example, functionalizing the nanowires, modifying the surfaces of the coatings and/or annealing the coatings.

In some embodiments, the process of the present invention further comprises polishing a roughened surface of a coating. Not being bound by any particular theory, surface roughness on the order of about 100 nm to about 100 μm can improve the smudge resistance of a coating. However, a roughened surface will typically exhibit decreased optical transmission properties compared with a smooth surface of the same composition. In some embodiments, the optical transmission of a roughened surface can be improved by polishing. Roughened surfaces of the present invention can be polished by a process selected from: chemically polishing, mechanically polishing, thermally polishing, and combinations thereof.

As used herein, "chemically polishing" refers to a process of applying an acidic reagent, a basic reagent, a fluoride reagent, or a combination thereof to a surface, whereby reaction between the surface and a reagent reduces the frequency of sub-100 nm features on the surface.

Acidic reagents suitable for use with the present invention include, but are not limited to, sulfuric acid, trifluoromethanesulfonic acid, fluorosulfonic acid, trifluoroacetic acid, hydrofluoric acid, hydrochloric acid, carborane acid, and combinations thereof.

Basic reagents suitable for use with the present invention include, but are not limited to, sodium hydroxide, potassium hydroxide, ammonium hydroxide, tetraalkylammonium hydroxide ammonia, ethanolamine, ethylenediamine, and combinations thereof.

Fluoride reagents suitable for use with the present invention include, but are not limited to, elemental fluorine, ammonium fluoride, lithium fluoride, sodium fluoride, potassium fluoride, rubidium fluoride, cesium fluoride, francium fluoride, antimony fluoride, calcium fluoride, ammonium tetrafluoroborate, potassium tetrafluoroborate, and combinations thereof.

As used herein, "mechanically polishing" refers to processes selected from: contacting a particulate composition with a surface, brushing a surface, and combinations thereof, whereby friction and/or mechanical interaction with a surface reduces the frequency of sub-100 nm features on the surface.

As used herein, "thermally polishing" refers to a process of applying thermal energy to a surface, whereby the thermal energy reduces the frequency of sub-100 nm features on the surface. In some embodiments, a thermal energy is chosen from: a convective thermal energy (e.g., heating in an oven or furnace), a conductive thermal energy (contacting the substrate or film with a heating element and the like), an electromagnetic thermal energy (e.g., infrared light), a plasma thermal energy (e.g., a plasma at about 50° C. or greater), and combinations thereof.

EXAMPLES

Hypothetical Example 1

An unpatterned (flat) 200 mm by 200 mm square-shaped stamp comprising a flexible material (polydimethylsiloxane, "PDMS") can be prepared by coating a flat master (e.g., silicon) using methods previously described elsewhere. See, e.g., U.S. Pat. Nos. 5,512,131 and 5,900,160, which are incorporated herein by reference in their entirety. The stamp can be spin-coated with a thin layer of a polymer composition (90 wt-% polystyrene and 10 wt-% polyvinylpyrrolidone) dissolved in a solvent (a 1:1 ethanol and toluene, v/v), 4% polymer by weight. The polymer-coated stamp can be dried to remove the solvent and then contacted for about 60 seconds with a substrate. The substrate can be heated (at about 80° C. to about 130° C.) during the contacting to promote transfer of the polymer from the stamp to the substrate.

The above process can be repeated using a second polymer composition (80 wt-% polystyrene and 20 wt-% polyvinylpyrrolidone) to provide a second polymer layer. Similarly, a third polymer layer can be deposited using a third polymer composition (70 wt-% polystyrene and 30 wt-% polyvinylpyrrolidone).

The polyvinylpyrrolidone can then be removed from the multi-layer coating by exposing the multi-layer coating to ethanol. The resulting multi-layer, refractive index gradient coating can be optionally annealed to stabilize its chemical composition.

Hypothetical Example 2

In another embodiment, the composite film prepared in Hypothetical Example 1 can be post-treated to increase the hydrophobicity of the surface of the coating. For example, the coating can be exposed to a vapor comprising tridecafluoro-1,1,2,2-tetrahydrooctyltrichlorosilane to functionalize the top surface of the coating.

Example 3

Aligned layers of composite nanowires (i.e., nanofibers comprising zinc acetate and polyvinylpyrrolidone, 1:1 by weight, "ZnAc-PVP nanowires") were electrospun from a precursor solution of 3:3:20:10 parts by weight zinc acetate:polyvinylpyrrolidone:ethanol:water. The layers of ZnAc-PVP nanowires were deposited by flowing the precursor solution at a flow rate of 0.206 mL/hr to 0.274 mL/hr through a needle having a 21-24 gauge diameter and to which was applied a DC voltage of 17-20 kV. The flow rate of the precursor solution was controlled using a syringe pump. A collector (two electrically grounded metal blades having a separation distance of about 13 mm) was placed about 20 cm from the needle tip. Uniaxially aligned composite ZnAc-PVP nanowires were collected using the collector and transferred from the collector to a silicon substrate by passing the substrate through the array of uniaxially aligned ZnAc-PVP nanowires. Many of the ZnAc-PVP nanowires had a length of 13 mm or more and a diameter of about 1-5 μm. Three dimensional coatings of layered ZnAc-PVP nanowires were produced by rotating the substrate about 90° between passes through the collected ZnAc-PVP nanowires. This resulted in four layers being deposited with the ZnAc-PVP nanowires in each layer being substantially orthogonal to those ZnAc-PVP nanowires in adjoining (i.e., adjacent) layers.

Figure 5:
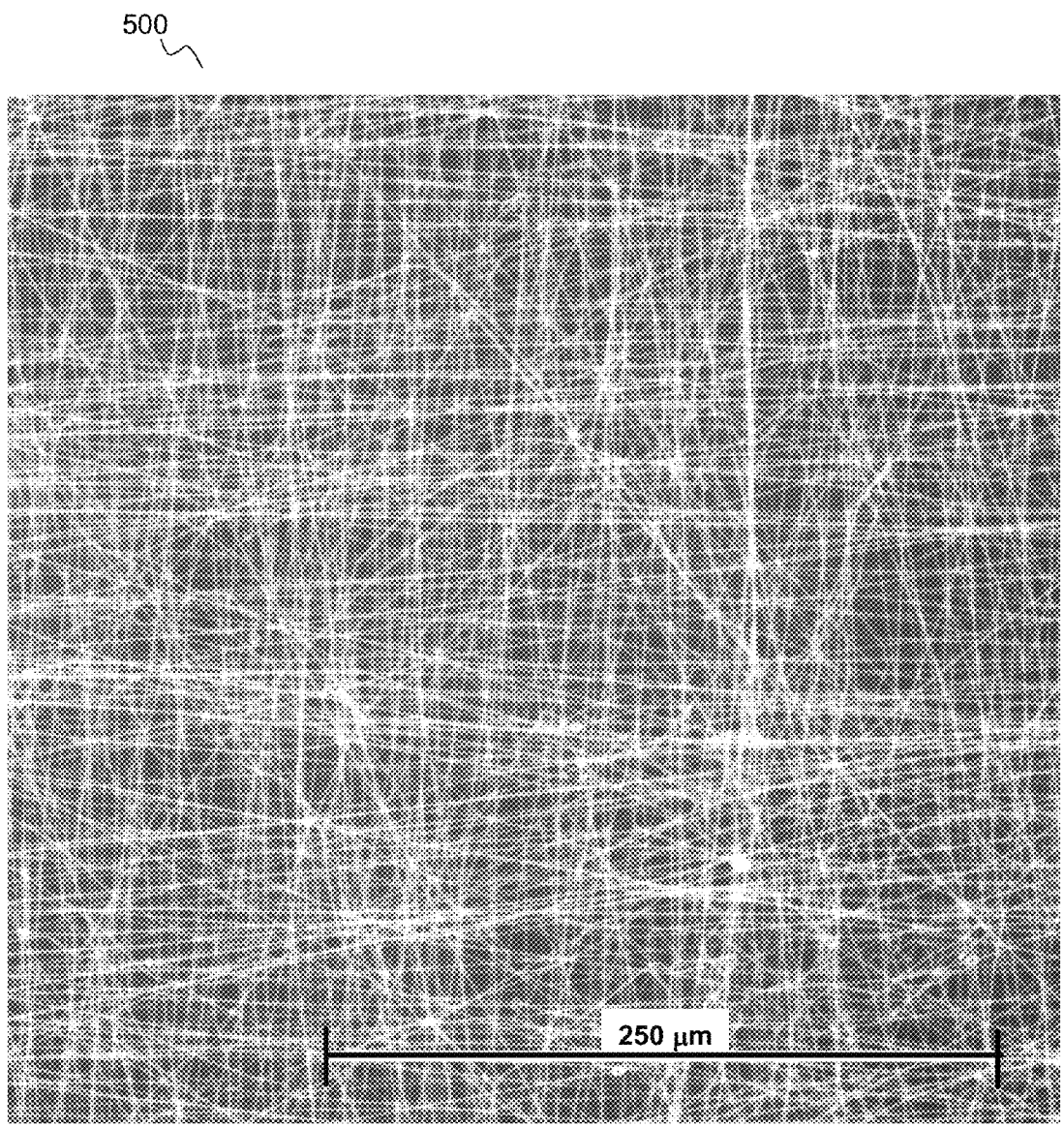
FIGS. 5 and 6 provide optical microscopy images of multi-layer nanowire coatings prepared by a process of the present invention.

An optical image of the deposited four layer ZnAc-PVP nanowire coating is provided in FIG. 5. Referring to FIG. 5, the image, 500, at 5× resolution shows overlapping ZnAc-PVP nanowires on a silicon substrate.

Example 4

The composite ZnAc-PVP nanowire coating prepared in Example 3 was converted to a ZnO nanowire coating by heating the composite coating and substrate to 550° C. at a ramp rate of about 2° C. per minute, holding at 550° C. for about 13 hours, and then cooling the calcined coating to room temperature (about 21° C.) over about 4 hours to provide a multi-layer coating of ZnO nanowires.

In general, the composite ZnAc-PVP nanowires can be converted to ZnO nanowires by calcination and sintering at about 450° C. to about 550° C. for about 1 hour to about 15 hours.

Figure 6:
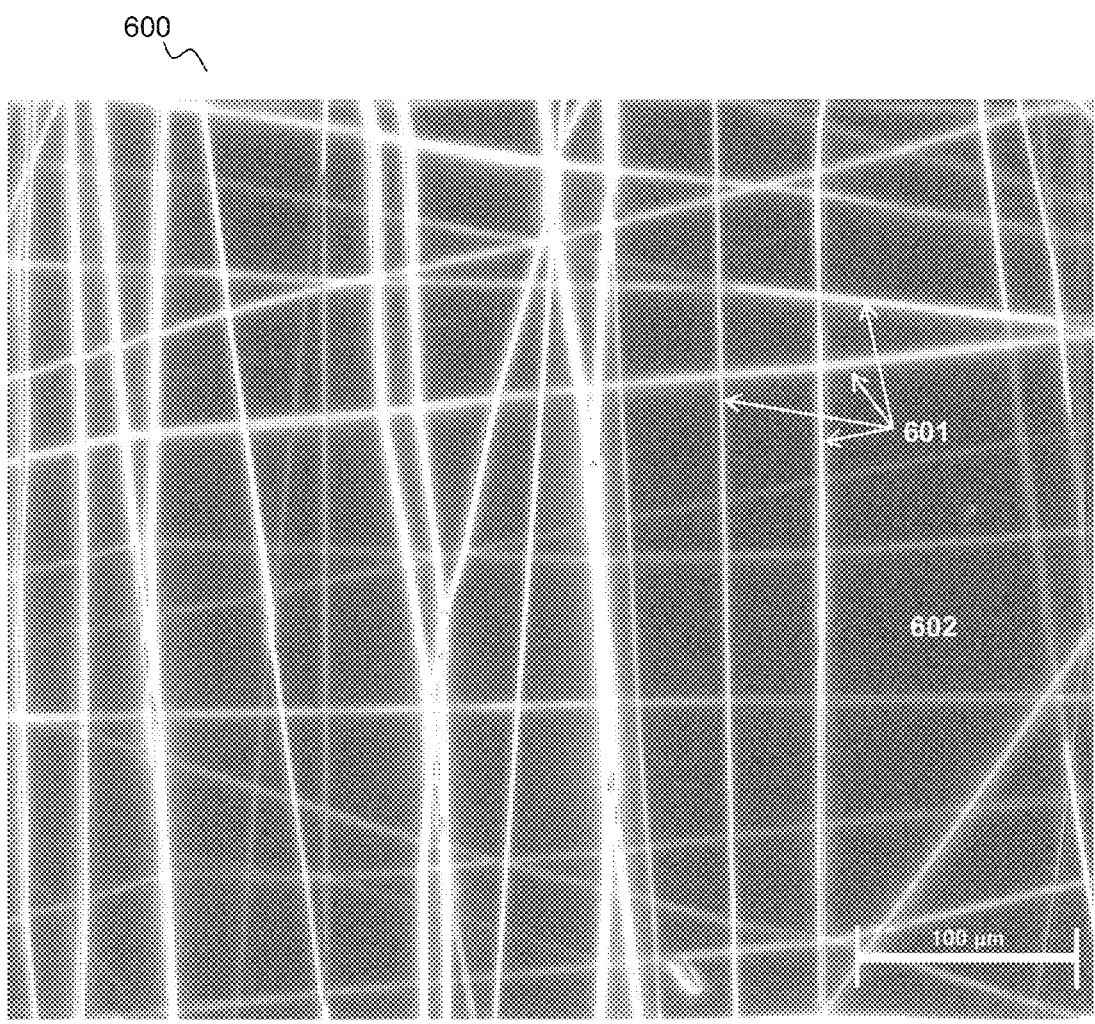

An optical image of the four layer ZnO nanowire coating is provided in FIG. 6. Referring to FIG. 6, the image, 600, at 100× resolution shows overlapping ZnAc-PVP nanowires, 601, on a silicon substrate, 602.

Hypothetical Example 5

In another embodiment the ZnO nanowire multi-layer coating prepared in Example 4 can be converted to provide a multi-layer coating of ZnS nanowires by annealing the substrate and ZnO nanowire multi-layer coating in a $H_2S$ atmosphere at about 500° C. to about 550° C. for about 1 hour to about 10 hours.

Hypothetical Example 6

An unpatterned (flat) 4 cm by 4 cm stamp comprising a flexible material (polydimethylsiloxane, "PDMS") can be prepared as in Hypothetical Example 1. A first solution and/or suspension of nanowires can be spin-coated onto the flexible stamp. A second flexible stamp can be contacted with the surface of the flexible stamp bearing the nanowires, and can then be gently pressed and dragged across the surface of the first flexible stamp for a distance of about 3 mm. The shear forces induced by the contact and motion can align the nanowires on the surface of the first flexible stamp as to provide a single, dense layer of nanowires on the surface of the first flexible stamp. The aligned layer of nanowires can then be transferred to a substrate by contacting at least the aligned layer of nanowires with a substrate. A portion of the surface of the flexible stamp can also contact in the substrate during the transferring.

This process (i.e., disposing a solution of nanowires on a flexible stamp and aligning the nanowires) can then be repeated using a second solution and/or suspension of nanowires, wherein the second solution and/or suspension of nanowires can have a nanowire concentration less than the first solution and/or suspension (e.g., the second solution can have a concentration of nanowires about 25% less than the concentration of the first solution). An aligned layer of nanowires prepared from the second solution can then be transferred to the substrate comprising the first aligned layer of nanowires. The substrate can be rotated about 90° to provide a second layer of aligned nanowires on top of and substantially perpendicular to the first layer of aligned nanowires. A third layer of nanowires can be prepared in a similar manner, wherein a third solution and/or suspension of nanowires can have a concentration of nanowires that is about 50% less than the first solution. After disposing and aligning the nanowires on a flexible stamp, the third aligned layer of nanowires can be transferred to the substrate and oriented substantially perpendicular to the second aligned layer of nanowires. Optionally, a fourth layer of nanowires can be prepared in a similar manner, wherein a fourth solution and/or suspension of nanowires can have a concentration of nanowires that is about 75% less than the first solution. After disposing and aligning the nanowires on a flexible stamp, the fourth aligned layer of nanowires can be transferred to the substrate and oriented substantially perpendicular to the third aligned layer of nanowires. The resulting multi-layer nanowire coating can be sintered to anneal the nanowire layers to each other, as well as providing increased adhesion of the nanowire coating to the substrate.

Example 7

Aligned layers of composite nanowires (zinc acetate:polyvinylpyrrolidone nanowires, 1:1 by weight, "ZnAc-PVP nanowires") were deposited from a precursor solution of 3:3:20:10 parts by weight zinc acetate:polyvinylpyrrolidone:ethanol:water onto a substrate (e.g., a 20 mm by 20 mm square substrate). The layers of ZnAc-PVP nanowires were deposited by flowing the precursor solution at a flow rate of 0.206 mL/hr to 0.274 mL/hr through a needle having a 21-24 gauge diameter, to which was applied a DC voltage of 17-20 kV. The flow rate of the precursor solution was controlled using a syringe pump. A collector (two electrically grounded metal blades having a separation distance of about 25 mm) was placed about 20 cm from the needle tip with the substrate placed between the grounded blades about 20 cm from the needle tip, wherein the substrate surface was oriented normal to the needle tip.

Figure 7A:
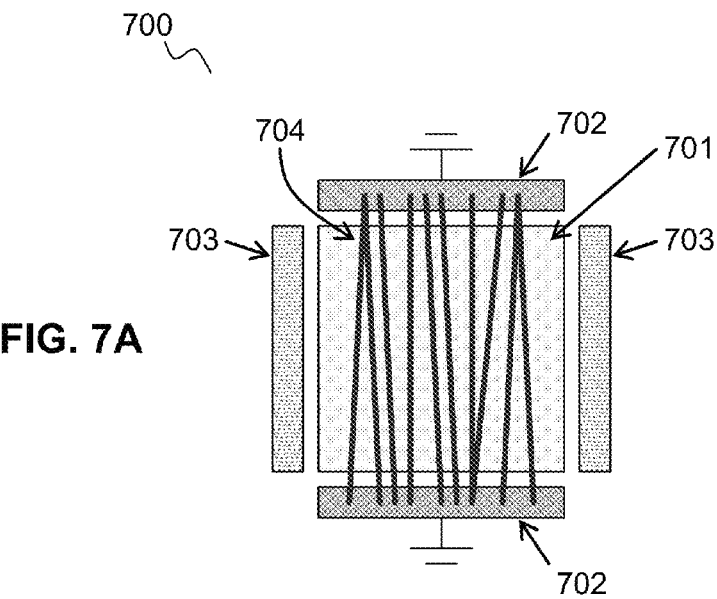
FIGS. 7A-7B provide a top-view schematic diagram of a process for disposing multi-layer aligned nanowire coatings directly to a substrate.
Figure 7B:
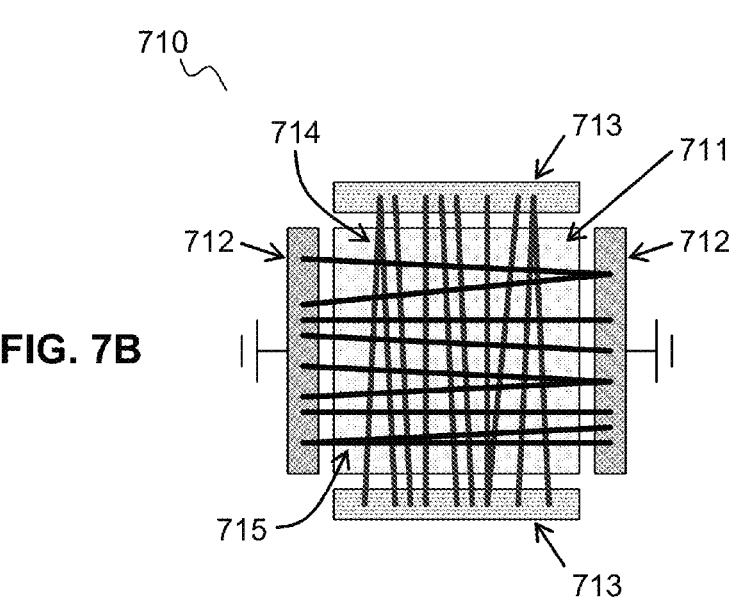

FIGS. 7A and 7B provide a top-view schematic representation of this arrangement and a method of aligned nanowire deposition using this arrangement. Referring to FIG. 7A, a substrate, 701, is positioned between grounded metal blades (e.g., electrodes) and nanowires can be directly deposited on the substrate, 704. An optional second set of ungrounded metal blades, 703, orthogonal to the first set of metal blades is also depicted. Uniaxially aligned composite nanowires (e.g., ZnAc-PVP nanowires) were collected directly on the substrate until a desirable density of nanowires was obtained. A second layer of nanowires was then deposited onto the first layer of nanowires, 709.

Referring to FIG. 7B, three dimensional coatings of layered nanowires can be produced by grounding the second set of metal blades, 712, and flowing the precursor as described above. Alternatively, the second layer of nanowires, 715, can be deposited by first rotating the substrate, 711, about 90.degree. between the first set of grounded metal blades, 713. Thus, a second layer of aligned nanowires, 715, can be deposited directly onto the first layer of aligned nanowires, 714. Repeating this process (i.e., rotating or grounding alternating pairs of metal blades and then disposing) can permit multi-layer nanowire coatings having a tunable density to be deposited, wherein nanowires in adjacent layers are substantially orthogonal to one another.

The ZnAc-PVP nanowires were optionally calcined as described in Example 4 to provide a multi-layer coating comprising ZnO nanowires. ZnS nanowires can subsequently be optionally chemically treated, as described in Hypothetical Example 5 to provide a multi-layer coating of ZnS nanowires.

Example 8

The density of ZnO nanowires in a layer, as deposited by the process described in Example 7, can be controlled by varying the deposition time. Zn-PVP nanowires were deposited on sapphire substrates according to the process of Example 7 followed by calcination at 550° C. for a period of about 1 hour to about 15 hours. The density of the ZnO nanowires was determined using optical microscopy by counting the number of nanowires per linear micrometer of the substrate, the results of which are provided in the following Table.

TABLE

ZnO nanowire density per unit length of substrate as a function of deposition time, and nanowire density per second. Each data point is an average of 3 depositions imaged at a minimum of three locations per sample using a Scanning Electron Microscope.

| Deposition Time (minutes) | ZnO Nanowire Density (NW/µm) | ZnO Density/Time (NW/µm · s$^{-1}$) |
| --- | --- | --- |
| 0.5 | 0.2 ± 0.1 | 0.007 ± 0.003 |
| 1 | 0.5 ± 0.05 | 0.008 ± 0.001 |
| 2 | 0.8 ± 0.25 | 0.007 ± 0.002 |
| 5 | 1.5 ± 0.35 | 0.005 ± 0.001 |
| 10 | 2.3 ± 0.95 | 0.004 ± 0.001 |

As shown in the above Table, for deposition times up to about 2 minutes, there is a linear relationship between deposition time and nanowire density. This can also be seen as a constant nanowire density as a function of deposition time of 0.007-0.008 nanowires per micron per second for deposition times of about two minutes or less. However, for deposition times of 5 and 10 minutes, the density of ZnO nanowires per unit time began to decrease to about 0.004-0.005 nanowires per micron per second. This resulted in an overall non-linear relationship between ZnO nanowire density as a function of deposition time (for deposition times of 30 seconds to 10 minutes).

The data for ZnO nanowire density as a function of deposition time are consistent with the results for other nanowire materials deposited by electrospinning.

Not being bound by any particular theory, the nanowires that collect on the grounded plates can discharge static charge present on the surface of the nanowires. However, nanowires that are deposited on the substrate present between the grounded plates remain charged. This latent charge on the nanowires affects newly deposited nanowires deposited across the grounded plates, and can assist with nanowire alignment, but may also potentially limit the density of nanowires deposited in highly dense layers. Another factor that can determine the maximum surface density of nanowires within a single layer is the degree to which nanowires are aligned relative to one another, as misaligned nanowires can increase the volume of a layer but not necessarily result in an increased surface density of nanowires on the substrate. The effect of latent charge on the density of deposited nanowires can be diminished by removing static charge from the deposited nanowires periodically during the deposition process.

Using the process parameters of Example 7, gradient refractive index ("GRIN") coatings comprising 5 layers of ZnO nanowires, wherein a first layer of ZnO nanowires was deposited for 10 minutes, followed by a second layer of ZnO nanowires deposited for 5 minutes, a third layer that was deposited for 2 minutes, a fourth layer that was deposited for 1 minute, and a fifth layer that was deposited for 30 seconds, and wherein after each deposition, the substrate was rotated about 90°.

Example 9A $ZrO_2$ nanowire-containing coatings comprising 5 layers of aligned composite nanowires (zirconium oxide:polyvinylpyrrolidone nanowires, "$ZrO_2$-PVP nanowires") were deposited from a precursor solution using the following process conditions to provide a coating containing $ZrO_2$-PVP nanowires having an average diameter of about 175 nm.

$ZrO_2$-PVP nanowires having an average diameter of about 175 nm were prepared from a precursor solution comprising 70% zirconium propoxide in n-propanol (5 g), polyvinylpyrrolidone (750 mg), and ethanol (4.25 g). The precursor solution was flowed (0.19 mL/hr) through a 25 gauge needle to which was applied a DC voltage of about 8 kV to about 11 kV.

A collector (two electrically grounded metal blades having a separation distance of about 25 mm) was placed about 20 cm from the needle tip with the substrate placed between the grounded blades about 20 cm from the needle tip, wherein the substrate surface was oriented normal to the needle tip. The relative humidity was maintained at less than about 40% during the deposition of the nanowires.

A first layer of nanowires was deposited for 10 minutes, followed by a second layer of nanowires deposited for 5 minutes, a third layer that was deposited for 2 minutes, a fourth layer that was deposited for 1 minute, and a fifth layer that was deposited for 30 seconds. After each deposition, the substrate was rotated 90°.

Using these process parameters, single layers of aligned $ZrO_2$ nanowires were deposited on various substrates, as well as gradient refractive index ("GRIN") coatings comprising 5 layers of $ZrO_2$ nanowires, wherein a first layer of $ZrO_2$ nanowires was deposited for 10 minutes, followed by a second layer of $ZrO_2$ nanowires deposited for 5 minutes, a third layer that was deposited for 2 minutes, a fourth layer that was deposited for 1 minute, and a fifth layer that was deposited for 30 seconds, and wherein after each deposition, the substrate was rotated about 90°.

Example 9B $ZrO_2$-PVP nanowires having an average diameter of about 500 nm were prepared as described in Example 9A, except that a precursor solution comprising 70% zirconium propoxide in n-propanol (1.42 mL), polyvinylpyrrolidone (1050 mg), and ethanol (7.45 g) was used. The precursor solution was flowed (0.4 mL/hr) through a 25 gauge needle to which was applied a DC voltage of about 10 kV to about 12 kV. The flow rate of the precursor solution was controlled using a syringe pump.

Using these process parameters, single layers of aligned $ZrO_2$ nanowires were deposited on various substrates, as well as gradient refractive index ("GRIN") coatings comprising 5 layers of $ZrO_2$ nanowires, wherein a first layer of $ZrO_2$ nanowires was deposited for 10 minutes, followed by a second layer of $ZrO_2$ nanowires deposited for 5 minutes, a third layer that was deposited for 2 minutes, a fourth layer that was deposited for 1 minute, and a fifth layer that was deposited for 30 seconds, and wherein after each deposition, the substrate was rotated about 90°.

Example 10

Titania-PVP ($TiO_x$-PVP) nanowires were prepared by combining a first solution containing polyvinylpyrrolidone (250 mg) in ethanol (2.75 mL) with a second solution containing titanium isopropoxide (250 mg) in ethanol (1 mL) and glacial acetic acid (1 mL). The resulting solution was mixed for about 12 h or longer until a clear yellow to orange solution resulted.

$TiO_x$-PVP nanowires having an average diameter of about 100 nm or less were prepared by flowing the precursor solution (0.12 mL/hr) through a 27 gauge needle to which was applied a DC voltage of 7-10 kV. The flow rate of the precursor solution was controlled using a syringe pump. A collector (two electrically grounded metal blades having a separation distance of about 25 mm) was placed about 20 cm from the needle tip with the substrate placed between the grounded blades about 20 cm from the needle tip, wherein the substrate surface was oriented normal to the needle tip. The relative humidity was maintained at about 25% to about 35% during the depositing. The relative humidity was maintained at less than about 40% during the deposition of the nanowires.

Using these process parameters, single layers of aligned $TiO_2$ nanowires were deposited on various substrates, as well as gradient refractive index ("GRIN") coatings comprising 5 layers of $TiO_2$ nanowires, wherein a first layer of $TiO_2$ nanowires was deposited for 10 minutes, followed by a second layer of $TiO_2$ nanowires deposited for minutes, a third layer that was deposited for 2 minutes, a fourth layer that was deposited for 1 minute, and a fifth layer that was deposited for 30 seconds, and wherein after each deposition, the substrate was rotated about 90°.

Example 11

Alumina-PVP ($AlO_x$-PVP) nanowires were prepared by combining a first solution containing polyvinylpyrrolidone (250 mg) in ethanol (2.75 mL) with a second solution containing aluminum isopropoxide (250 mg) in iso-propanol (1 mL) and glacial acetic acid (1 mL). Prior to combining, the second solution was typically sonicated and vortex mixed until the aluminum isopropoxide was completely dissolved (i.e., the solution was clear and colorless). The resulting precursor solution was also clear and colorless or clear with a slightly gray color.

$AlO_x$-PVP nanowires having an average diameter of about 100 nm or less were prepared by flowing the precursor solution (0.09 mL/hr) through a 27 gauge needle to which was applied a DC voltage of 7-10 kV. The flow rate of the precursor solution was controlled using a syringe pump. A collector (two electrically grounded metal blades having a separation distance of about 25 mm) was placed about 20 cm from the needle tip with the substrate placed between the grounded blades about 20 cm from the needle tip, wherein the substrate surface was oriented normal to the needle tip. The relative humidity was maintained at less than about 40% during the deposition of the nanowires.

Using these process parameters, single layers of aligned $Al_2O_3$ nanowires were deposited on various substrates, as well as gradient refractive index ("GRIN") coatings comprising 5 layers of $Al_2O_3$ nanowires, wherein a first layer of $Al_2O_3$ nanowires was deposited for 10 minutes, followed by a second layer of $Al_2O_3$ nanowires deposited for 5 minutes, a third layer that was deposited for 2 minutes, a fourth layer that was deposited for 1 minute, and a fifth layer that was deposited for 30 seconds, and wherein after each deposition, the substrate was rotated about 90°.

Example 12

The $ZrO_2$-PVP, $TiO_x$-PVP and $AlO_x$-PVP nanowire coatings prepared in Examples 9B, 10 and 11, respectively, were calcined at 550° C., 750° C., or 950° C., and then cooled to room temperature to provide a multi-layer coating metal oxide nanowire coatings. The nanowire coatings were then removed from the substrates, pulverized, and the structure of the materials was characterized using x-ray powder diffraction. The pulverized samples were applied to a zero-background holder and placed in a PANALYTICAL® X'Pert Pro Deffractometer (PANalytical B.V., Almelo, NL) and irradiated with 45 kV/40 mA radiation from a Cu source. Data was acquired over a range of 10° to 70° with a step size of 0.0158° and a counting time of 500 seconds per step. After diffraction patterns were acquired, phases were determined using Rietveld refinement, or with the aid of the Powder Diffraction File published by the International Centre for Diffraction Data. As shown in the following Table, the calcination temperature was found to significantly affect the structure of the resulting metal oxide nanowires.

TABLE

Nanowire structure as a function of calcination temperature, as determined by powder x-ray diffraction.

| | Calcination Temperature | | |
|---|---|---|---|
| Material | 550° C. | 750° C. | 950° C. |
| Zirconia (Example 9B) | amorphous | amorphous with trace γ-Al2O3 | 100% γ-Al2O3 |
| Titania (Example 10) | 86% anatase; 14% rutile | 6% anatase; 94% rutile | 100% rutile |
| Alumina (Example 11) | 100% tetragonal | 18% tetragonal; 82% monoclinic | 3% tetragonal; 97% monoclinic |

Example 13

GeO-PVP (GeO-PVAC) nanowires were prepared by combining a first solution containing polyvinylacetate (230 mg) in acetone (1.79 mL) with a second solution containing tetra-iso-propoxygermane (0.244 mL) in iso-propanol (1 mL), propionic acid (0.123 mL), and water (0.031 mL). The precursor solution was used immediately after mixing by flowing the precursor solution (0.4 mL/hr) through a 27 gauge needle to which was applied a DC voltage of 11-12 kV. The flow rate of the precursor solution was controlled using a syringe pump. A collector (two electrically grounded metal blades having a separation distance of about 25 mm) was placed about 20 cm from the needle tip with the substrate placed between the grounded blades about 20 cm from the needle tip, wherein the substrate surface was oriented normal to the needle tip. The relative humidity was maintained at less than about 40% during the deposition of the nanowires.

The GeO-PVP nanowires were calcined in air at a temperature of about 550° C. to provide germanium oxide nanowires. Scanning Auger microanalysis of the germanium oxide nanowires indicate a Ge:O stoichiometry of about 1:1 (i.e., GeO).

Using these process parameters, single layers of aligned GeO nanowires were deposited on various substrates, as well as gradient refractive index ("GRIN") coatings comprising 5 layers of GeO nanowires, wherein a first layer of GeO nanowires was deposited for 10 minutes, followed by a second layer of GeO nanowires deposited for 5 minutes, a third layer that was deposited for 2 minutes, a fourth layer that was deposited for 1 minute, and a fifth layer that was deposited for 30 seconds, and wherein after each deposition, the substrate was rotated about 90°.

Example 14

Aligned carbon (C) nanowires were prepared by mixing polyacrylonitrile (PAN) in dimethylformamide (DMF) to provide a 10% by weight mixture of PAN in DMF. The mixture heated in a water bath (~70° C.) until a clear, colorless precursor solution resulted. The precursor solution was flowed (0.1 mL/hr) through a 21 gauge needle to which was applied a DC voltage of 5-7 kV. The flow rate of the precursor solution was controlled using a syringe pump. A collector (two electrically grounded metal blades having a separation distance of about 25 mm) was placed about 20 cm from the needle tip with the substrate placed between the grounded blades about 20 cm from the needle tip, wherein the substrate surface was oriented normal to the needle tip. The relative humidity was maintained at less than about 40% during the deposition of the nanowires.

The C nanowires were immediately placed in a 270° C. furnace for 15 minutes to stabilize the nanowires. After stabilization, the C nanowires were heated in an inert (Ar) atmosphere to a temperature of about 1100° C. for one hour with a ramp rate of 10° C./minute.

Using these process parameters, single layers of aligned C nanowires were deposited on various substrates, as well as gradient refractive index ("GRIN") coatings comprising 5 layers of C nanowires, wherein a first layer of C nanowires was deposited for 10 minutes, followed by a second layer of C nanowires deposited for 5 minutes, a third layer that was deposited for 2 minutes, a fourth layer that was deposited for 1 minute, and a fifth layer that was deposited for 30 seconds, and wherein after each deposition, the substrate was rotated about 90°.

Example 15A

An $ZrO_2$ nanowire coating was deposited on a circular ZnS substrate (1" diameter) by flowing a precursor solution comprising 70% zirconium propoxide in n-propanol (1.42 mL), polyvinylpyrrolidone (1050 mg), and ethanol (7.45 g). The precursor solution was flowed (0.4 mL/hr) through a 25 gauge needle to which was applied a DC voltage of about 10 kV to about 12 kV. The flow rate of the precursor solution was controlled using a syringe pump.

A collector comprising an two negatively biased aluminum plates (5 kV) was placed about 15 cm from the needle tip. The substrate was placed between the plates at a distance about 1 mm or less, closer to the needle tip compared to the collector plates. The $ZrO_2$-PVP composite nanowires were collected for across the substrate on the biased metal plates when the precursor solution was flowed. The depositing (i.e., electrospinning and collecting) was performed for 10 minutes in a humidity-controlled environment having a relative humidity of about 40% or less.

The $ZrO_2$-PVP wires were transferred from the collector to a ZnS substrate that was placed in a furnace pre-heated to 200° C. The furnace was then ramped to 550° C. at a rate of about 2° C. to about 10° C. per minute, and then the furnace temperature was held at 500° C. for 1 hour. The $ZrO_2$ nanowires had an average diameter of about 500 nm, and the layer of $ZrO_2$ nanowires had a thickness of about 1.5 μm to about 2 μm.

Figure 8:
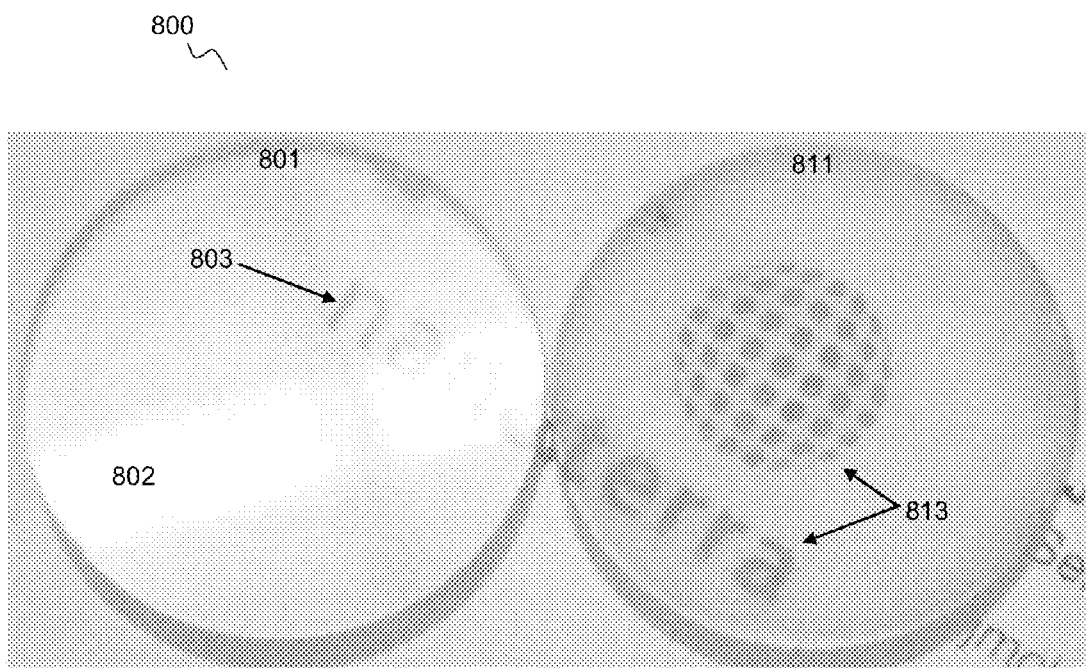
FIG. 8 provides a comparison of the anti-glare properties of a coated substrate of the present invention with an uncoated substrate.

The anti-reflective properties of the $ZrO_2$ nanowire coating was determined qualitatively by comparing the reflection from the nanowire-coated ZnS substrate with an uncoated ZnS substrate. The results are depicted in FIG. 8. Referring to FIG. 8, a photographic image, 800, shows an uncoated ZnS substrate, 801, alongside the $ZrO_2$ nanowire-coated ZnS substrate, 811, which are resting on a sheet of paper having printing thereon. The uncoated ZnS substrate, 801, has significant glare, 802, and it is difficult to read the printing, 803, on the sheet of paper beneath the substrate. Conversely, the printing on the sheet of paper, 813, underneath the ZrO2-nanowire-coated ZnS substrate is readily viewed without glare or other interference.

Example 15B

A ZnS substrate having a $ZrO_2$ nanowire coating thereon (as prepared in Example 15A) was coated with a styrene-ethylene-butylene triblock co-polymer having maleic anhydride groups grafted thereto ("SEBMA"). A solution of the SEBMA polymer in toluene (2% w/v) was applied to the ZnS substrate using a syringe (about 3-5 mL). The excess solution was allowed to drain from the substrate, and the coated substrate was dried in a chemical fume hood for about 5 min, and then placed in a heated furnace for about 2 minutes at about 130° C. The polymer coating thickness was about 200 nm on the substrate, and also coated the nanowires in a thin polymeric layer.

Example 15C

The transmittance of the coated ZnS substrates was determined in the visible and near-IR regions of the spectrum. Between 350 nm and 1.1 μm, a JASCO® V630 UV-Vis spectrophotometer (Jasco Corp., Tokyo, JP) was utilized to determine the percent transmittance of the samples, whereas between 2.5 μm and 14 μm, a JASCO® V4100 FT-IR spectrophotometer (Jasco Corp., Tokyo, JP) was utilized to determine the percent transmittance of the samples. The results are reported in the following Table. Each entry in the Table below is an average of 10 samples.

TABLE

Percent transmittance (% T) for uncoated ZnS, and ZnS substrates having a $ZrO_2$ nanowire coating thereon.

| Sample | % T as a function of Wavelength | | |
|---|---|---|---|
|  | 1.06 μm | 2.5 μm | 8-10 μm |
| ZnS (uncoated) | 66% ± 1 | 81% ± 1 | 81% ± 1 |
| $ZrO_2$ nanowire-coated ZnS (Example 15A) | 61% ± 10 | 83% ± 5 | 82% ± 2 |
| $ZrO_2$ nanowires encapsulated on ZnS (Example 15B) | 53% ± 15 | 88% ± 5 | 83% ± 2 |

The $ZrO_2$ nanowire-coated ZnS substrate (Example 13A) increased the transmittance at 2.5 μm from 81% to 83%, while the encapsulated $ZrO_2$ nanowire-coated ZnS substrate increased the transmittance to 88% at 2.5 μm. In the 8-10 μm region the improvement in transmission was 1% to 2%. At the shorter wavelength (1.06 μm) the nanowire coatings caused a decrease of 5% and 13%, respectively, in the percent transmittance. However, several of the samples exhibited greater than 65% transmittance at 1.06 μm, suggesting that the nanowire coatings can be optimized to provide the required transmittance at the target wavelength.

Not being bound by any particular theory, the decrease in transmittance in the near-IR region of the spectrum (i.e., at 1.06 μm) for the $ZrO_2$ nanowire-coated ZnS substrates was due in part to the large diameter of the $ZrO_2$ nanowires present in the coatings, which was approximately 500 nm.

Example 16

$TiO_x$-PVP nanowire- and $AlO_x$-PVP nanowire-coated ZnS substrates were prepared by the deposition methods described in Examples 11 and 12, respectively, followed by calcination at 550° C. (as described in Example 13). Encapsulated nanowire-coated samples were also prepared using the procedure described in Example 15B. The average diameter of the nanowires used in each sample was less than 100 nm.

The transmittance of $TiO_2$ and $Al_2O_3$ nanowire-coated ZnS substrates was determined in the visible and near-IR regions of the spectrum using the protocol described in Example 15C. The results are reported in the following Table. Each entry in the Table below is an average of 10 samples.

TABLE

Percent transmittance for bare ZnS, and ZnS substrates having a $ZrO_2$ nanowire coating thereon.

| Sample | % T as a function of Wavelength | | |
|---|---|---|---|
|  | 1.06 μm | 2.5 μm | 8-10 μm |
| ZnS (uncoated) | 66% ± 1% | 79% ± 2% | 79% ± 2% |
| $TiO_2$ (anatase) nanowire-coated ZnS | 66% ± 10% | 88% ± 3% | 83% ± 2% |
| $TiO_2$ (anatase) nanowires encapsulated on ZnS | 80% ± 10% | 96% ± 4% | 83% ± 2% |
| $Al_2O_3$ (amorphous) nanowire-coated ZnS | 66% ± 10% | 86% ± 4% | 82% ± 3% |
| $Al_2O_3$ (amorphous) nanowires encapsulated in ZnS | 76% ± 10% | 95% ± 5% | 82% ± 2% |

The transmission properties of the $TiO_2$ nanowire coatings and $Al_2O_3$ nanowire coatings was superior to the transmission properties of coatings prepared using the much larger diameter $ZrO_2$ nanowires. All of the nanowire coatings exhibited a transmittance greater than 65% at 1.06 μm, with the encapsulated coatings exhibiting percent transmittance in excess of 75%. Moreover, the percent transmittance for each sample was greater than 85% at 2.5 µm, and greater than 80% (i.e., 82%-83%) at 8-10 µm. These results show that the transmittance properties of the nanowire coatings can be optimized.

Example 17

The durability and abrasion resistance properties of several of the coated zinc sulfide (ZnS) substrates prepared in the above Examples were measured using standard industry protocols. The substrates and coatings subjected to durability testing were: (a) uncoated ZnS; (b) ZnS having a thin layer (about 200 nm) of zirconium oxide thereon (deposited by a sol-gel process); (c); ZnS having a thin layer (about 200 nm) of styrene-ethylene-butylene triblock copolymer grafted with maleic anhydride ("SEBMA") thereon; (d) ZnS having a layer of aligned $ZrO_2$ nanowires thereon (deposited for 10 minutes, as in Example 15A to provide a thickness of about 1.5 µm to about 2 µm); (e) ZnS having thin layer (about 200 nm) of zirconium oxide thereon followed by a layer of aligned $ZrO_2$ nanowires thereon (as in (d)); and (f) ZnS having a layer of aligned $ZrO_2$ nanowires thereon (as in (d)), followed by a thin layer of SEBMA thereon (as in Example 15B).

The sol-gel zirconia coating was applied by spin-coating a solution of n-propanol containing 70% by weight zirconia propoxide at about 500 rpm for about 10 seconds, followed by spinning at about 1,000 rpm for about 1 minute to dry the layer. Layers of nanowires could be directly deposited onto the spin-coated, dried zirconia layer, or the spin-coated, dried zirconia layer was heated for about 1 hour at about 500° C. in air prior to disposing a layer of nanowires onto the coated substrate.

For these tests the thickness of the nanowire coatings was about 1.5 µm to about 2 µm, the thickness of the zirconium oxide contact layer was about 200 nm, and the thickness of the SEBMA was about 200 nm on the substrate, and also coated the nanowires in a thin polymeric layer. The ZnS substrates were 1" in diameter and had a thickness of 0.07".

The samples were tested using a "water jet impact test" in which an aerosol jet of water impinges upon the sample. The samples were tested using jets of water at velocity intervals of about 100 meters per second (m/sec). Uncoated ZnS samples began to show damage at about 200 m/sec (which was determined to be the damage on-set velocity, "DOV," for ZnS). The ZnS having a thin, sol-gel-derived $ZrO_2$ coating thereon increased the damage onset velocity of the ZnS by about 100 m/sec relative to the uncoated ZnS substrate (i.e., a DOV of about 300 m/sec). However, the thin layer of $ZrO_2$ provided little anti-reflection properties to the ZnS substrate. The SEBMA-coated ZnS substrate also exhibited a damage onset velocity that was about 100 m/sec greater than the uncoated ZnS substrate (i.e., a DOV of about 300 m/sec). However, the impact testing caused significant damage to the polymer coating at the DOV. The ZnS substrates coated with a layer of aligned $ZrO_2$ nanowires also exhibited a damage onset velocity of about 300 msec. The addition of a thin layer of $ZrO_2$ between the nanowire layer and the ZnS substrate resulted in a small increase in the damage onset velocity relative to the nanowire coating alone. Finally, the composite coatings comprising a layer of aligned $ZrO_2$ nanowires and a thin layer of SEBMA polymer thereon increased the damage onset velocity by about 200 msec (i.e., a DOV of about 400 m/sec), and thus provided the best durability in the water jet impact tests. However, at a water velocity of about 400 msec and higher, samples having the thin layer of $ZrO_2$ began to delaminate from the ZnS substrate, whereas the samples having a SEBMA polymer layer deposited thereon did not suffer from delamination.

Figure 9A:
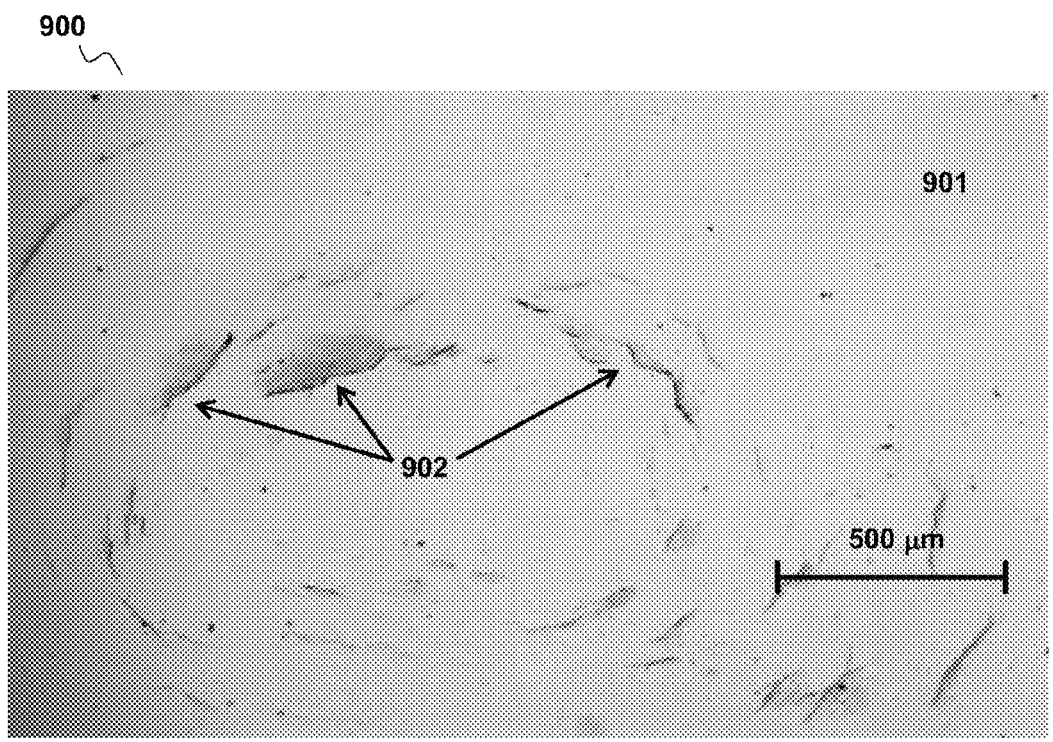
FIGS. 9A-9F provide optical microscope images of uncoated ZnS substrates and ZnS substrates comprising aligned $ZrO_2$ nanowire coatings according to the present invention after being subjected to water-jet impact durability testing.
Figure 9B:
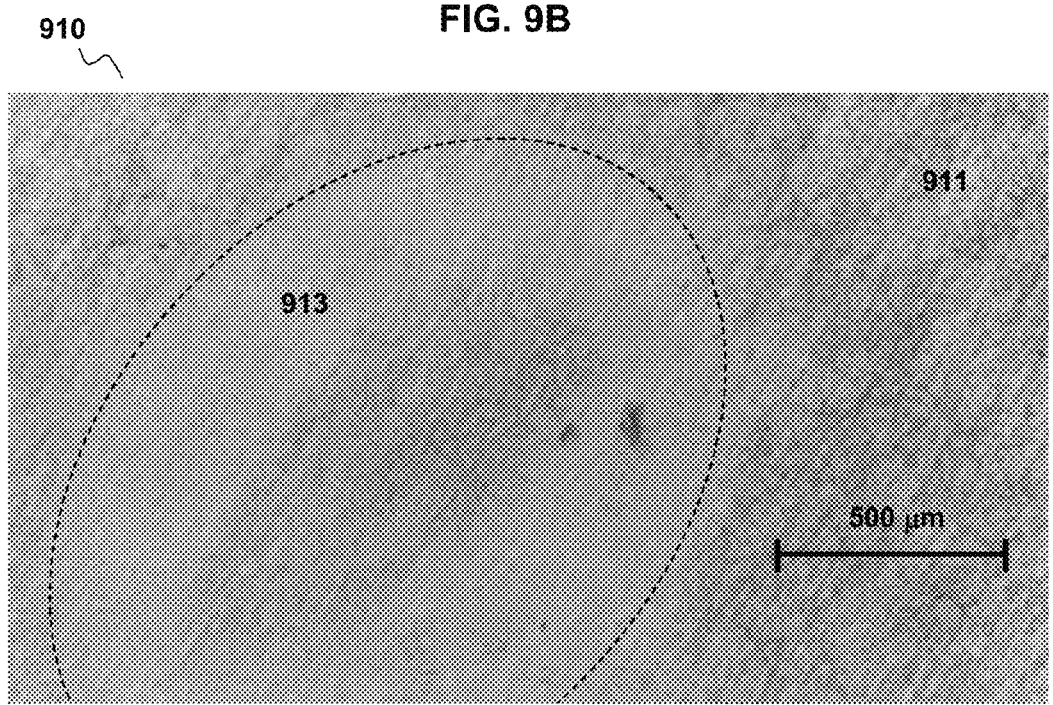

FIGS. 9A-9B provide optical microscope images of an uncoated ZnS substrate and a ZnS substrate having a layer of aligned $ZrO_2$ nanowires thereon, respectively, after water jet impact testing at a water velocity of about 200 msec. Referring to FIG. 9A, the image, 900, of the uncoated multispectral ZnS substrate, 901, shows extensive damage, 902, after exposure to a water jet at a velocity of about 200 msec. Referring to FIG. 9B, the image, 910, of the ZnS substrate coated with a layer of aligned $ZrO_2$ nanowires thereon (see (d) above), 911, was undamaged by the water jet at a velocity of 200 msec. Damage induced by the water jet was limited to superficial damage to the nanowire coating itself, 913, while the underlying ZnS substrate remained intact.

Figure 9C:
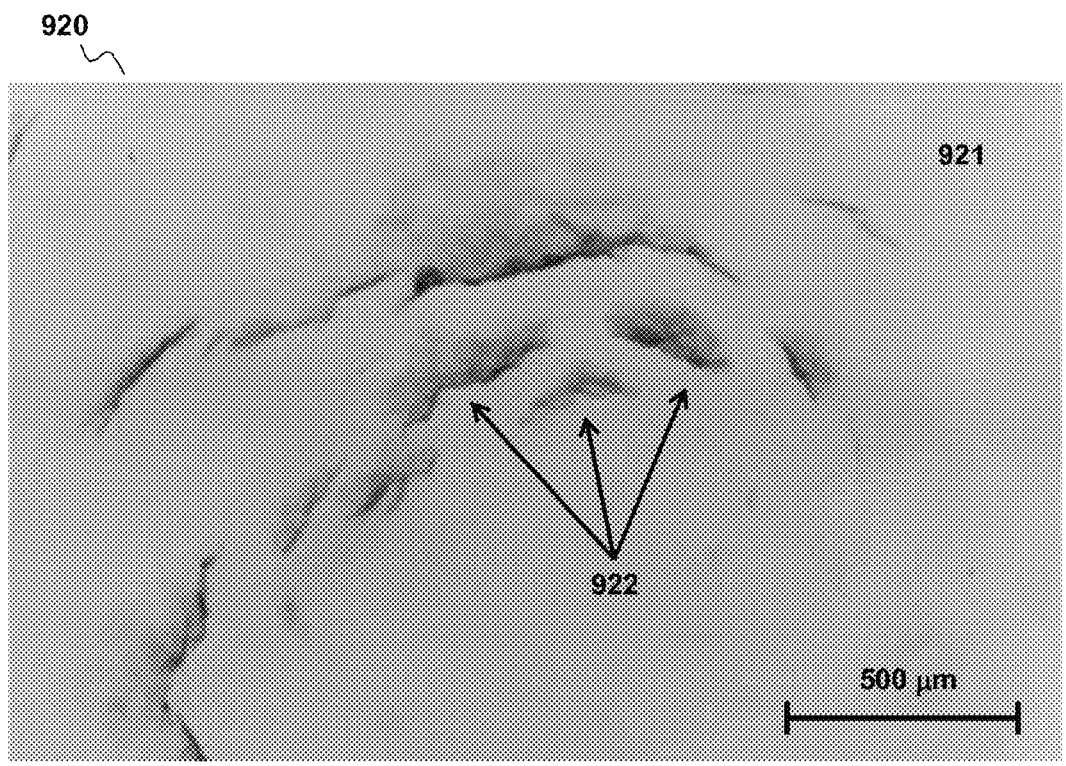
Figure 9D:
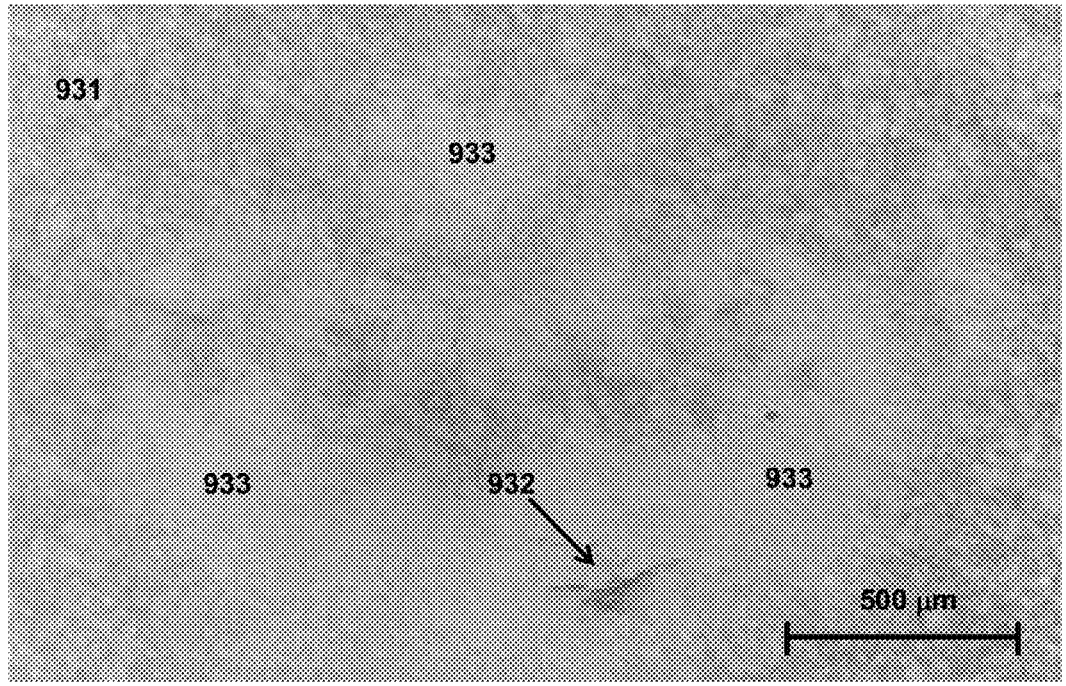

As the velocity of the water jet was increased to about 300 msec, the uncoated ZnS substrate underwent even more extensive damage. FIGS. 9C-9D provide optical microscope images of an uncoated ZnS substrate and a ZnS substrate having a layer of aligned $ZrO_2$ nanowires thereon, respectively, after water jet impact testing at a water velocity of about 300 msec. Referring to FIG. 9C, the image, 920, of the uncoated multispectral ZnS substrate, 921, shows more extensive damage, 922, after exposure to a water jet at a velocity of about 300 msec. Referring to FIG. 9D, the image, 930, of the ZnS substrate coated with a layer of aligned $ZrO_2$ nanowires thereon (see (d) above), 931, was largely undamaged by the water jet at a velocity of 300 msec. Damage induced by the water jet was mainly limited to superficial damage to the nanowire coating itself, 933, while only a small area of the underlying ZnS substrate suffered damage, 932.

Figure 9E:
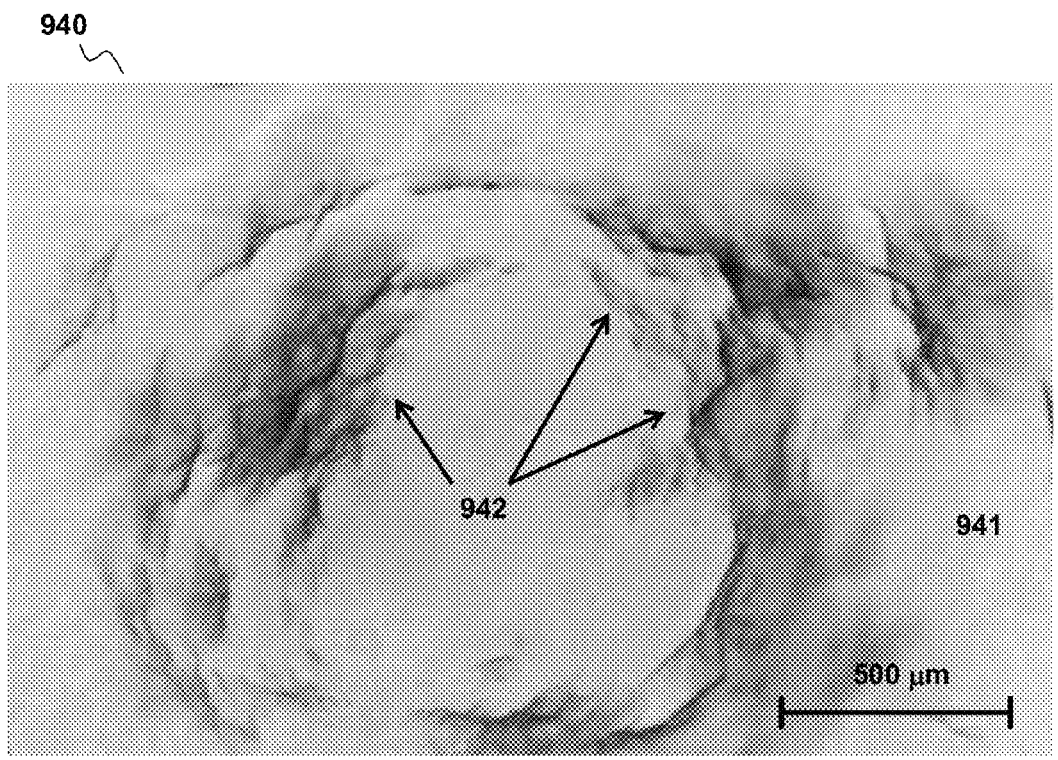
Figure 9F:
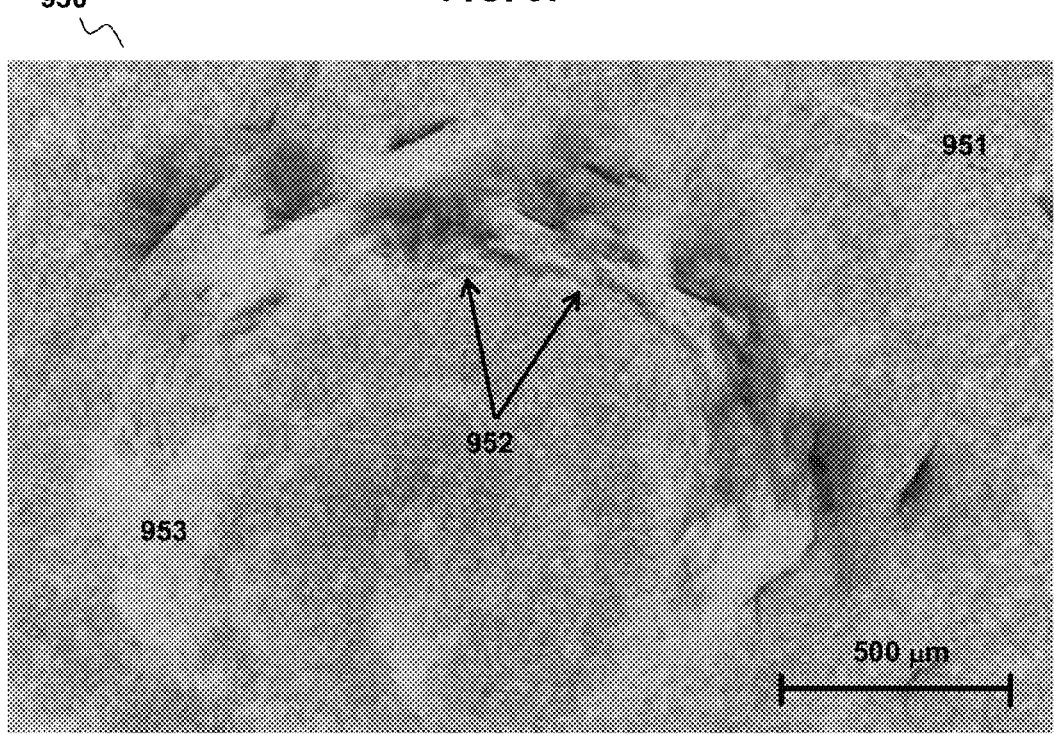

At a water jet velocity of about 400 msec, both the uncoated and nanowire-coated ZnS substrates underwent damage, but again, the damage to the uncoated ZnS substrate was much more significant. FIGS. 9E-9F provide optical microscope images of an uncoated ZnS substrate and a ZnS substrate having a layer of aligned $ZrO_2$ nanowires thereon, respectively, after water jet impact testing at a water velocity of about 300 msec. Referring to FIG. 9E, the image, 940, of the uncoated multispectral ZnS substrate, 941, shows significant damage, 942, after exposure to a water jet at a velocity of about 400 msec. Referring to FIG. 9R, the image, 950, of the ZnS substrate coated with a layer of aligned $ZrO_2$ nanowires thereon (see (d) above), 951, also shows damage to the underlying ZnS substrate, 952, as well as areas where only the $ZrO_2$ coating was removed from the substrate, 953.

As shown above, even a single layer of $ZrO_2$ nanowires can provide abrasion and water-jet resistance for a ZnS substrate. The data shows that the damage resistance of the coatings can be enhanced through the use of a zirconium oxide contact layer and/or an encapsulant layer that partially encloses the nanowires.

The durability of the coated ZnS substrates was also tested using a "falling sand" test, under which conditions the composite nanowire GRIN coatings of the present invention showed a linear decrease in transmittance with sand dose. A 1 liter dose of sand resulted in about a 5% reduction in transmittance, and a 2 liter dose of sand resulted in about a 10% reduction in transmittance of the ZnS substrates.

Example 18

Figure 10:
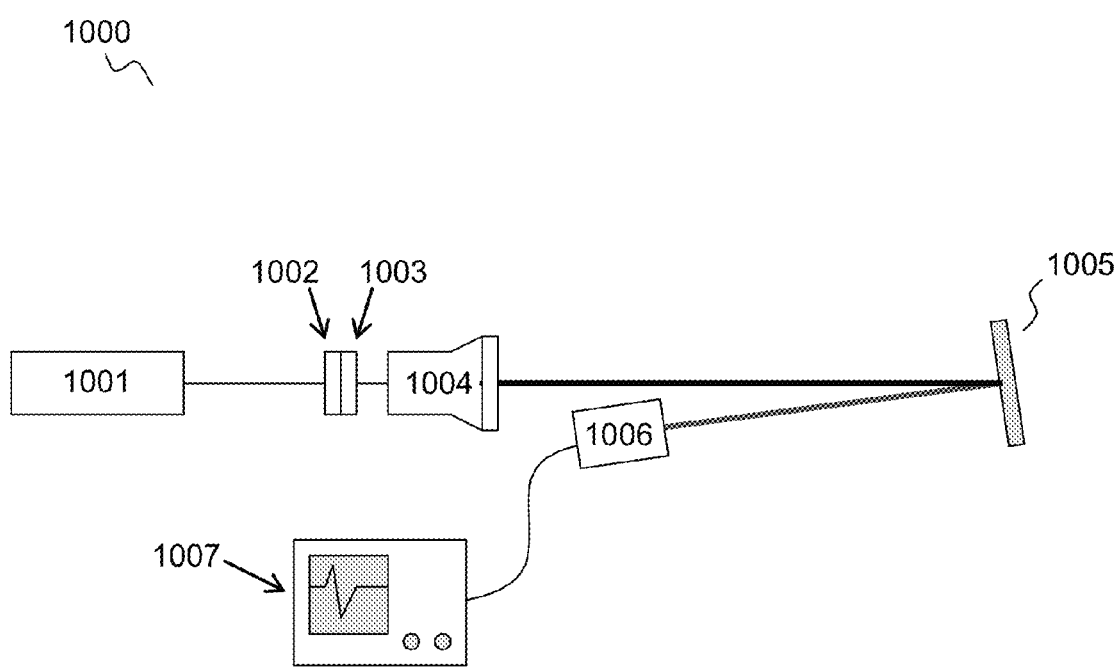
FIG. 10 provides a schematic representation of an experimental apparatus suitable for measuring the retro-reflectance of the coated substrates of the present invention.

The retro-reflectance properties of several of the coated substrates prepared in the above Examples were measured using the experimental arrangement diagrammed schematically in FIG. 10. Referring to FIG. 10, the apparatus, 1000, included a helium-neon (He—Ne) laser, 1001 (and 1201-1 power supply, not shown, both from JDS Uniphase Corp., Milpitas, Calif.), the continuous 633 nm output (about 4 mW) from which was transmitted through a pinhole, 1002, a neutral density filter, 1003, a beam expander, 1004, and onto the sample, 1005. The retro-reflectance intensity was measured using a photodiode, 1006 (DET10A, Thorlabs, Inc., North Newton, N.J.), interfaced with an oscilloscope, 1007 (TDS 2002B, Tektronix, Inc., Beaverton, Oreg.). The retro-reflection data is summarized in the following Table.

TABLE

Retro-reflection data for substrates comprising a nanowire coating of the present invention thereon.

| Substrate | Coating | Intensity (mV) | Relative Intensity |
|---|---|---|---|
| Silicon | None (Reference) | 880 | — |
| | Carbon GRIN (5 layers, Example 14) | 210 | 21% |
| | ZnO GRIN (5 layers, Example 8) | 400 | 40% |
| | $ZrO_2$ nanowires (single layer, 10 min., Example 15A) | 68 | 8% |
| | $ZrO_2$ nanowires, encapsulated (single layer, 10 min., Example 15B) | 82 | 9% |
| | GeO GRIN (5 layers, Example 13) | 88 | 10% |
| Sapphire | None (Reference) | 700 | — |
| | $ZrO_2$ nanowires (single layer, 10 min., Example 15A) | 61 | 9% |
| | $Al_2O_3$ GRIN (5 layers, Example 11) | 120 | 17% |
| | GeO GRIN (5 layers, Example 13) | 72 | 10% |
| ZnS | None (Reference) | 635 | — |
| | $ZrO_2$ GRIN (5 layers, Example 9A) | 140 | 22% |
| | $ZrO_2$ nanowires (single layer, 10 min., Example 15A) | 54 | 9% |
| | $ZrO_2$ nanowires, encapsulated (single layer, 5 min., Example 9A) | 170 | 27% |
| | $ZrO_2$ nanowires, encapsulated (single layer, 10 min., Example 15B) | 27 | 4% |
| | $TiO_2$ GRIN encapsulated (5 layers, Example 10) | 130 | 21% |
| | $Al_2O_3$ GRIN encapsulated (5 layers, Example 11) | 120 | 19% |
| | GeO GRIN encapsulated (5 layers, Example 13) | 105 | 17% |
| | $Al_2O_3$ encapsulated (1 layer, 16 min, Example 11). | 150 | 24% |
| Germanium | None (Reference) | 870 | — |
| | $ZrO_2$ nanowires (single layer, 10 min., Example 15A) | 450 | 52% |
| | GeO GRIN (5 layers, Example 13) | 62 | 7% |

As shown above, all of the nanowire coatings reduce retro-reflection by at least about 50%. In particular, the multi-layer GRIN coatings of the present invention reduce retro-reflectance for silicon, sapphire, zinc sulfide and germanium substrates by at least about 60% or more. For silicon and sapphire substrates, GRIN coatings comprising five layers of either $ZrO_2$ or GeO nanowires reduced retro-reflectance by about 90% or more. For a zinc sulfide substrate, a GRIN coating comprising five layers of ZrO2 nanowires reduced the retro-reflectance by about 96%. For a germanium substrate, a GRIN coating comprising five layers of GeO nanowires reduced the retro-reflectance by about 93%. The data shows that the nanowire coatings of the present invention are suitable for significantly reducing the retro-reflection for a wide variety of optical materials.

CONCLUSION

These examples illustrate possible embodiments of the present invention. While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A composition, comprising:
a substrate including a surface; and
a multi-layer coating of nanowires positioned on at least a portion of the surface, the coating comprising three or more laminar layers of nanowires, including a bottom layer of nanowires affixed to the surface, and a top-most layer of nanowires, wherein a nanowire within a laminar layer is oriented substantially parallel to another nanowire within the same laminar layer, nanowires within adjacent laminar layers are not substantially parallel to one another, the top-most layer of nanowires has a refractive index of about 5% to about 70% of a refractive index of the bottom layer of nanowires, and the refractive index of the three or more laminar layers of nanowires decreases by about 10% or more per laminar layer from the bottom layer of nanowires to the top-most layer of nanowires.

2. The composition of claim 1, wherein the bottom layer of nanowires has a refractive index of about 30% to about 100% of a refractive index of the substrate, wherein the top-most layer of nanowires has a refractive index of about 1% to about 40% of the refractive index of the substrate, and wherein the refractive index of the three or more laminar layers decreases by about 15% or more per layer from the bottom layer of nanowires to the top-most layer of nanowires.

3. The composition of claim 1, wherein the refractive index of the three or more laminar layers of nanowires decreases alinearly from the bottom layer of nanowires to the top-most layer of nanowires.

4. The composition of claim 1, wherein the refractive index of the three or more laminar layers of nanowires decreases linearly from the bottom layer of nanowires to the top-most layer of nanowires.

5. The composition of claim 1, wherein a thickness of a laminar layer within the multi-layer coating of nanowires is approximately the diameter of one of the nanowires present within the laminar layer.

6. The composition of claim 1, wherein nanowires within adjacent laminar layers of the multi-layer coating are substantially orthogonal to one another.

7. The composition of claim 1, wherein adjacent nanowires within a laminar layer are spaced about evenly apart relative to one another, and wherein a spacing separating adjacent nanowires within a laminar layer is about 30% or less than an average length of the nanowires.

8. The composition of claim 1, wherein the nanowires have an average length of about 200 nm to about 5 mm and an average diameter of about 1 nm to about 10 μm.

9. The composition of claim 1, wherein the nanowires have an average length of about 200 nm to about 5 mm and an average diameter of about 5 nm to about 1 μm.

10. The composition of claim 1, wherein the nanowires of at least the bottom layer of the coating have substantially the same composition as the substrate.

11. The composition of claim 1, wherein all of the nanowires present within the multi-layer coating have approximately the same composition.

12. The composition of claim 1, wherein the nanowires within the multi-layer coating are not functionalized or derivatized.

13. The composition of claim 1, further comprising a molecular or polymeric matrix surrounding the multi-layer coating of nanowires, wherein at least a portion of the top-most layer of nanowires is exposed.

14. The composition of claim 1, wherein a portion of the surface having the multi-layer coating of nanowires thereon reflects about 50% or less of an electromagnetic radiation having at least one wavelength of about 180 nm to about 30 μm compared to an uncoated portion of the surface.

15. The composition of claim 1, wherein a portion of the substrate having the multi-layer coating of nanowires thereon has a resistance to crack propagation that is about 3 times or more than a portion of the substrate surface that lacks the multi-layer coating of nanowires.

16. The composition of claim 1, wherein the substrate having the multi-layer coating of nanowires thereon has a retro-reflectance at 633 nm that is at least 50% less than a retro-reflectance at 633 nm from an uncoated substrate that lacks the multi-layer coating of nanowires.

17. The composition of claim 1, wherein the substrate having the multi-layer coating of nanowires thereon has a retro-reflectance at one or more wavelengths from about 400 nm to about 12 μm that is at least 50% less than a retro-reflectance from an uncoated substrate that lacks the multi-layer coating of nanowires at the same one or more wavelengths.

18. A device, comprising:
    a substrate including a surface; and
    an anti-reflective multi-layer coating of nanowires positioned on the surface, the coating comprising three or more laminar layers of nanowires and including a bottom layer of nanowires affixed to the surface, wherein a nanowire within a laminar layer is oriented substantially parallel to another nanowire within the same laminar layer; wherein nanowires within different-adjacent laminar layers are not parallel to one another; and the bottom layer of nanowires has a refractive index of about 30% or more than a refractive index of a top-most layer of nanowires.

19. The device of claim 18, wherein the device is chosen from: a display device, an optical device, a solar cell, a sensor, a cellular device, an avionic device, a nautical device, a projectile device, and combinations thereof.

* * * * *

UNITED STATES PATENT AND TRADEMARK OFFICE
CERTIFICATE OF CORRECTION

PATENT NO. : 8,574,710 B2  Page 1 of 1
APPLICATION NO. : 12/578219
DATED : November 5, 2013
INVENTOR(S) : Coffey et al.

It is certified that error appears in the above-identified patent and that said Letters Patent is hereby corrected as shown below:

In the Claims

Claim 18, Column 52, Line 37:
"layer; wherein nanowires within different-adjacent" should read "layer; wherein nanowires within adjacent".

Signed and Sealed this
Twenty-eighth Day of January, 2014

Michelle K. Lee
*Deputy Director of the United States Patent and Trademark Office*